(12) United States Patent
Sridharan et al.

(10) Patent No.: US 11,270,201 B2
(45) Date of Patent: Mar. 8, 2022

(54) COMMUNICATION OPTIMIZATIONS FOR DISTRIBUTED MACHINE LEARNING

(71) Applicant: Intel Corporation, Santa Clara, CA (US)

(72) Inventors: Srinivas Sridharan, Bangalore (IN); Karthikeyan Vaidyanathan, Bangalore (IN); Dipankar Das, Pune (IN); Chandrasekaran Sakthivel, Sunnyvale, CA (US); Mikhail E. Smorkalov, Nizhniy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1083 days.

(21) Appl. No.: 15/859,180

(22) Filed: Dec. 29, 2017

(65) Prior Publication Data
US 2019/0205745 A1    Jul. 4, 2019

(51) Int. Cl.
*G06N 3/08* (2006.01)
*G06F 9/50* (2006.01)
(Continued)

(52) U.S. Cl.
CPC ............... *G06N 3/08* (2013.01); *G06F 9/50* (2013.01); *G06F 9/5061* (2013.01);
(Continued)

(58) Field of Classification Search
CPC ...... G06N 3/04; G06N 3/0454; G06N 3/0445; G06N 3/0481; G06N 3/063; G06N 3/08;
(Continued)

(56) References Cited

U.S. PATENT DOCUMENTS 7,873,812 B1   1/2011   Mimar
9,164,807 B2   10/2015   Blanc et al.
(Continued)

FOREIGN PATENT DOCUMENTS

CN   102708404 B   8/2016
CN   106297774 A   1/2017
(Continued)

OTHER PUBLICATIONS

Zhang, H. (Jul. 12, 2017). Poseidon | Proceedings of the 2017 USENIX conference on Usenix annual technical conference. ACM Digital Library. https://dl.acm.org/doi/10.5555/3154690.3154708 (Year: 2017).*
(Continued)

*Primary Examiner* — Shane D Woolwine
(74) *Attorney, Agent, or Firm* — Jaffery Watson Mendonsa & Hamilton LLP

(57) ABSTRACT

Embodiments described herein provide a system to configure distributed training of a neural network, the system comprising memory to store a library to facilitate data transmission during distributed training of the neural network; a network interface to enable transmission and receipt of configuration data associated with a set of worker nodes, the worker nodes configured to perform distributed training of the neural network; and a processor to execute instructions provided by the library, the instructions to cause the processor to create one or more groups of the worker nodes, the one or more groups of worker nodes to be created based on a communication pattern for messages to be transmitted between the worker nodes during distributed training of the neural network.

19 Claims, 58 Drawing Sheets

(51) Int. Cl.
    *G06N 3/04*     (2006.01)
    *G06N 3/063*     (2006.01)
    *G06N 7/00*     (2006.01)

(52) U.S. Cl.
    CPC .............. *G06F 9/5077* (2013.01); *G06N 3/04* (2013.01); *G06N 3/0445* (2013.01); *G06N 3/0454* (2013.01); *G06N 3/063* (2013.01); *G06N 3/084* (2013.01); *G06N 3/088* (2013.01); *G06N 3/0481* (2013.01); *G06N 7/005* (2013.01)

(58) Field of Classification Search
    CPC ........ G06N 3/084; G06N 3/088; G06N 7/005; G06F 9/50; G06F 9/5061; G06F 9/5077
    See application file for complete search history.

(56) References Cited

U.S. PATENT DOCUMENTS

| | | | |
|---|---|---|---|
| 10,528,864 | B2 | 1/2020 | Dally et al. |
| 10,860,922 | B2 | 12/2020 | Dally et al. |
| 10,891,538 | B2 | 1/2021 | Dally et al. |
| 2009/0031070 | A1* | 1/2009 | Purcell ................... H04L 45/00 710/316 |
| 2009/0089078 | A1* | 4/2009 | Bursey ................... H04W 4/70 705/300 |
| 2016/0062947 | A1 | 3/2016 | Chetlur et al. |
| 2016/0313984 | A1 | 10/2016 | Meixner |
| 2016/0352598 | A1* | 12/2016 | Reinhardt ............. H04L 47/365 |
| 2017/0153914 | A1* | 6/2017 | Rausch ............. G06F 16/24532 |
| 2018/0005074 | A1 | 1/2018 | Shacham et al. |
| 2018/0046906 | A1 | 2/2018 | Dally et al. |

FOREIGN PATENT DOCUMENTS

| | | |
|---|---|---|
| DE | 10353532 | 6/2005 |
| EP | 35060995 A2 | 7/2019 |
| WO | 2015192812 A1 | 12/2015 |

OTHER PUBLICATIONS

Gibiansky, A. (Feb. 21, 2017). Bringing HPC techniques to deep learning—Andrew Gibiansky. Andrew Gibiansky's Blog. https://andrew.gibiansky.com/blog/machine-learning/baidu-allreduce/ (Year: 2017).*

Sergeev, A. (Oct. 17, 2017). Meet Horovod: Uber's open source distributed deep learning framework for TensorFlow. Uber Engineering Blog. https://eng.uber.com/horovod/ (Year: 2017).*

Chun, B. (Jun. 22, 2016). Dolphin: Runtime optimization for distributed machine learning. Markus Weimer. https://www.markusweimer.com/publication/2016/06/22/Dophin/ (Year: 2016).*

Delimitrou, C. (Aug. 2015). Christina Delimitrou. Computer Systems Laboratory—Cornell University. https://www.csl.cornell.edu/~delimitrou/Publications.html (Year: 2015).*

Shafik, R. (Jun. 2016). Learning transfer-based adaptive energy minimization in embedded systems. IEEE Xplore. https://ieeexplore.ieee.org/document/7308001 (Year: 2016).*

Das, R. (Feb. 27, 2013). Application-to-core mapping policies to reduce memory system interference in multi-core systems. IEEE Xplore. https://ieeexplore.ieee.org/document/6522311 (Year: 2013).*

Intel. (Apr. 2015). Improving Real-Time Performance by Utilizing Cache Allocation Technology. Intel | Data Center Solutions, IoT, and PC Innovation. https://www.intel.com/content/dam/www/public/us/en/documents/white-papers/cache-allocation-technology-white-paper.pdf (Year: 2015).*

Awan, A. (Jul. 28, 2017). Optimized broadcast for deep learning workloads on Dense-GPU InfiniBand clusters: MPI or NCCL? arXiv.org. https://arxiv.org/abs/1707.09414 (Year: 2017).*

STMicroelectronics. (2016). ST25 NFC guide. https://www.st.com/resource/en/technical_note/dm00190233-st25-nfc-guide-stmicroelectronics.pdf (Year: 2016).*

Afsahi, A. (May 27, 2016). Topology-aware rank reordering for MPI collectives. IEEE Xplore. https://ieeexplore.ieee.org/abstract/document/7530080 (Year: 2016).*

Fairhurst, G. (Oct. 1, 2001). Non-Return to Zero (NRZ) Encoding. https://erg.abdn.ac.uk/users/gorry/eg3567/phy-pages/nrz.html (Year: 2001).*

Partial European Search Report for EP Application No. 18209320.3, dated May 22, 2019, 15 pages.

Notification of CN Publication for CN Application No. 201811549383.2, Pub No. CN110135575A, 5 pages, dated Aug. 29, 2019.

Extended European Search Report for EP Application No. 18209320.3, dated Aug. 22, 2019, 14 pages.

Goodfellow, et al. "Adaptive Computation and Machine Learning Series", Book, Nov. 18, 2016, pp. 98-165, Chapter 5, The MIT Press, Cambridge, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming". Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junkins, "The Compute Architecture of Intel Processor Graphics Gen9", paper, Aug. 14, 2015, 22 pages, Version 1.0, Intel Corporation, Santa Clara, CA.

Office Action from U.S. Appl. No. 15/869,551, dated Jun. 4, 2021, 12 pages.

Parashar et al., "SCNN: Accelerator for Compressed Convolution Neural Networks", 12 pages, May 23, 2017.

* cited by examiner

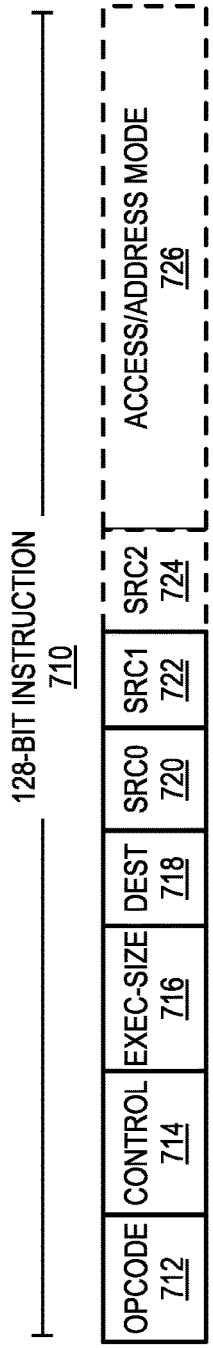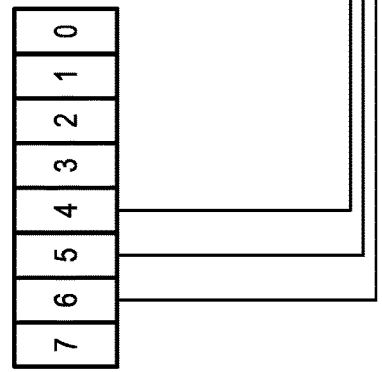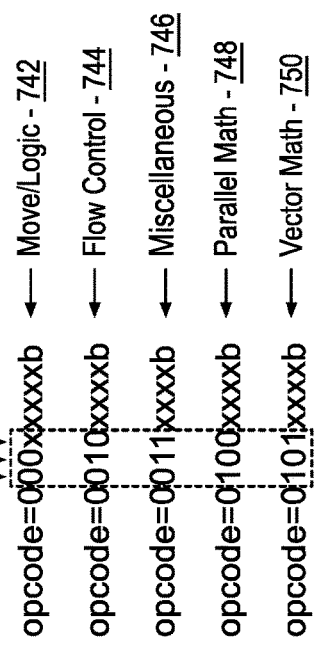
FIG. 7

FIG. 9A  GRAPHICS PROCESSOR COMMAND FORMAT
900

| CLIENT 902 | OPCODE 904 | SUB-OPCODE 905 | DATA 906 | COMMAND SIZE 908 |

FIG. 9B  GRAPHICS PROCESSOR COMMAND SEQUENCE
910

COMMUNICATION OPTIMIZATIONS FOR DISTRIBUTED MACHINE LEARNING

TECHNICAL FIELD

Embodiments generally relate to logic to perform processing operations using general purpose graphics processing units. More particularly, embodiments relate to communication optimizations for distributed machine learning.

BACKGROUND

A neural network model can be implemented as collections of nodes (neurons) that are connected in an acyclic graph. One type of neural network, a "feedforward network", can receive an input (a single vector) at its input layer of nodes, and, through a series of hidden layers, map the input to values in an output layer of nodes. Each layer in the network is made up of a set of neurons, where each neuron is fully connected to all neurons in the adjacent layer(s), and where neurons within a layer do not share any connections. If the network is modeling a classification, each of the nodes in the output layer may represent one of the possible classes to which an entity belongs, and the value of each output node may represent the probability that the input entity belongs to that class. A convolutional neural network (CNN) is another type of neural network model that can model feature detection by performing convolution operations on input data. For example, in image processing, a CNN may receive raw image data input and then output a set of feature maps representing abstractions of the raw data.

Current parallel graphics data processing includes systems and methods developed to perform specific operations on graphics data such as, for example, linear interpolation, tessellation, rasterization, texture mapping, depth testing, etc. Additionally, programmable, general-purpose graphics processors can be configured to perform a wide variety of operations for processing vertex and fragment data, as well as for performing general purpose parallel processing operations. For example, parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming*, Chapter 3, pages 37-51 (2013) and/or Nicholas Wilt, CUDA Handbook, *A Comprehensive Guide to GPU Programming*, Sections 2.6.2 to 3.1.2 (June 2013).

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

FIG. 7 is a block diagram illustrating a graphics processor instruction formats according to some embodiments;

DESCRIPTION OF EMBODIMENTS

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 15-35 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data.

System Overview

Figure 1:
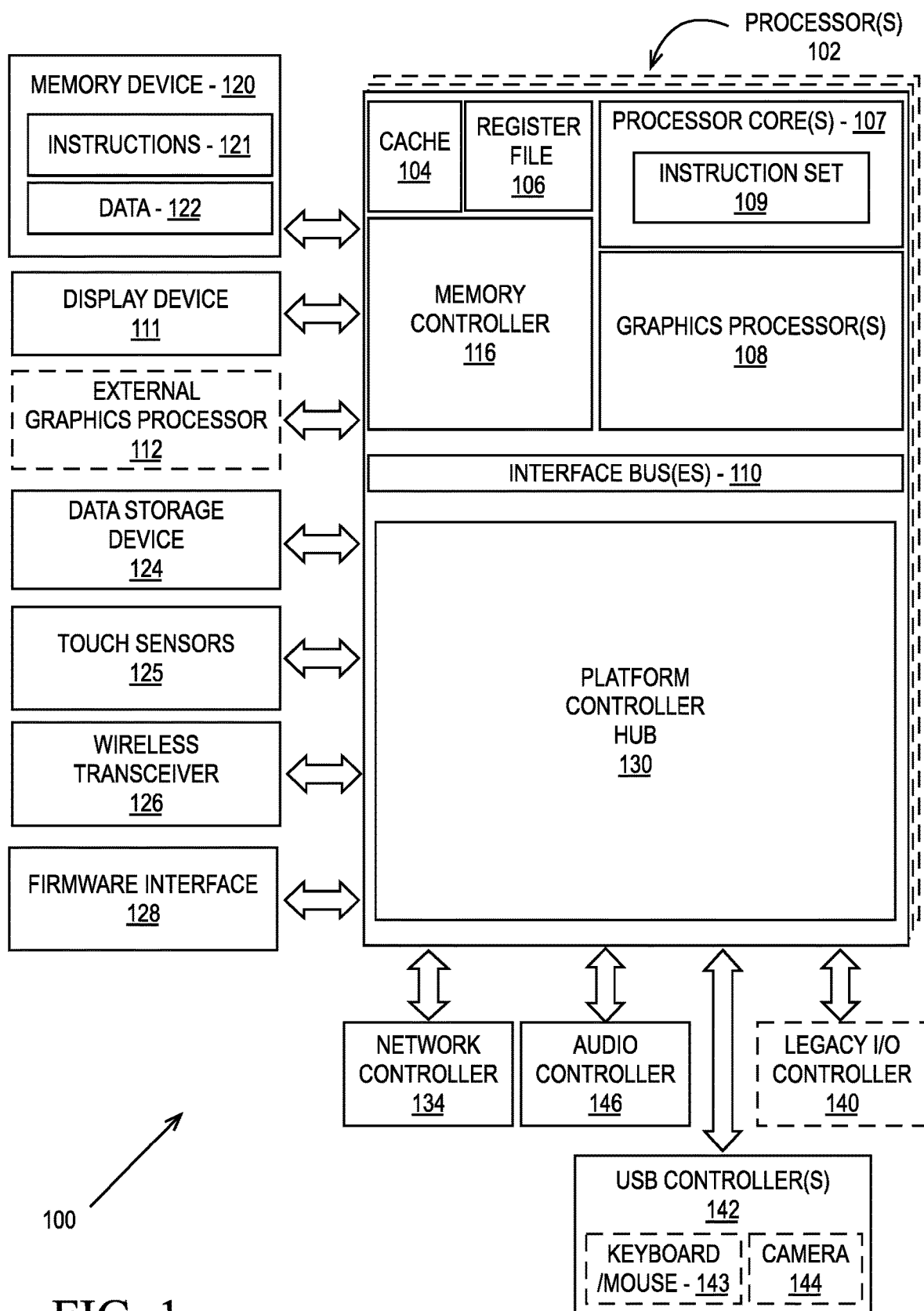
FIG. 1 is a block diagram of a processing system, according to an embodiment.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating-point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller and platform controller hub, which may be configured as a memory controller hub and peripheral controller hub within a system chipset that is in communication with the processor(s) 102.

Figure 2:
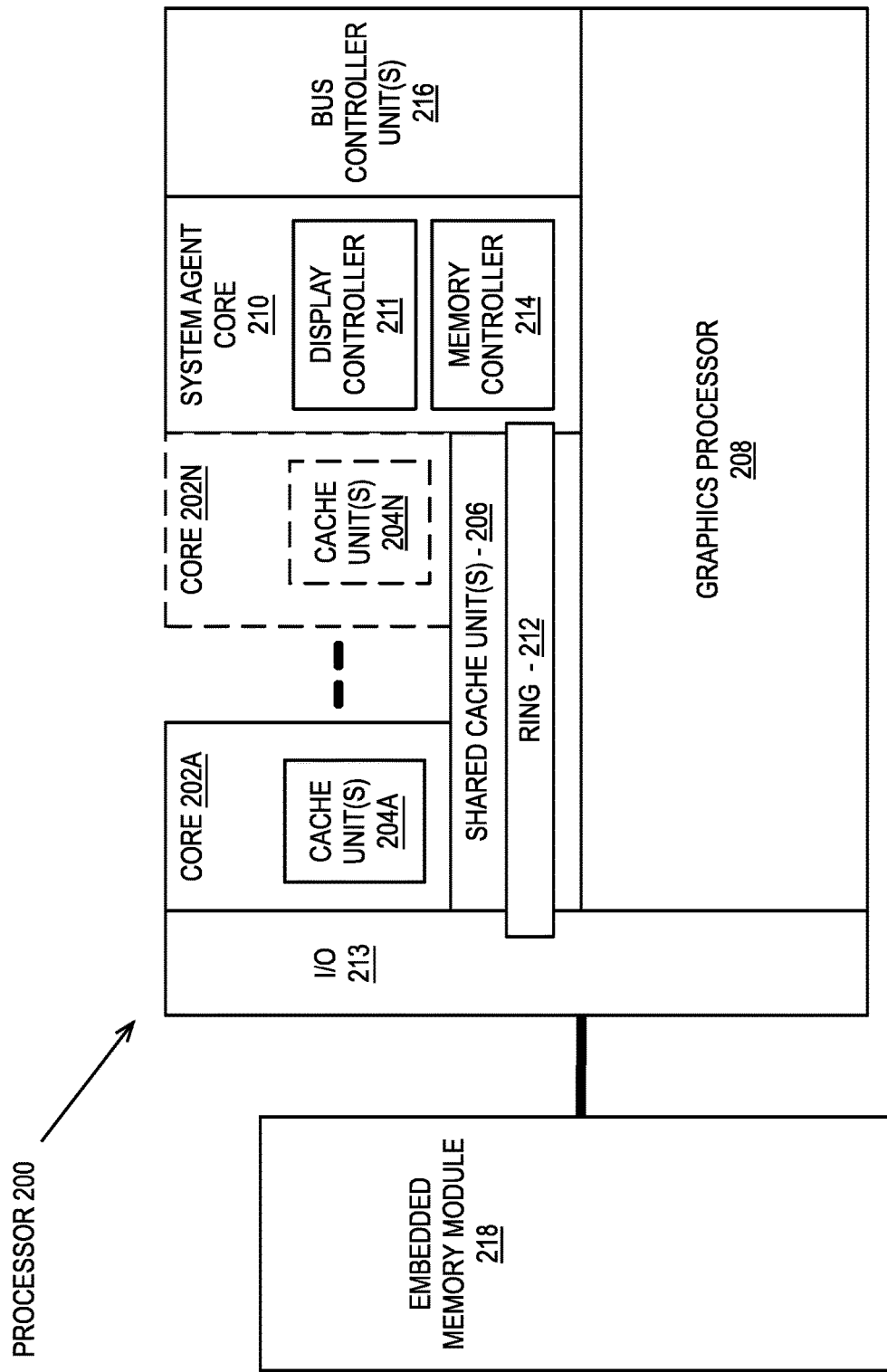
FIG. 2 is a block diagram of a processor according to an embodiment.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect 212 is used to couple the internal components of the processor 200. However, an alternative interconnect unit may be used, such as a point to point interconnect, a switched interconnect, or other techniques, including techniques well known in the art. In some embodiments, graphics processor 208 couples with the ring based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
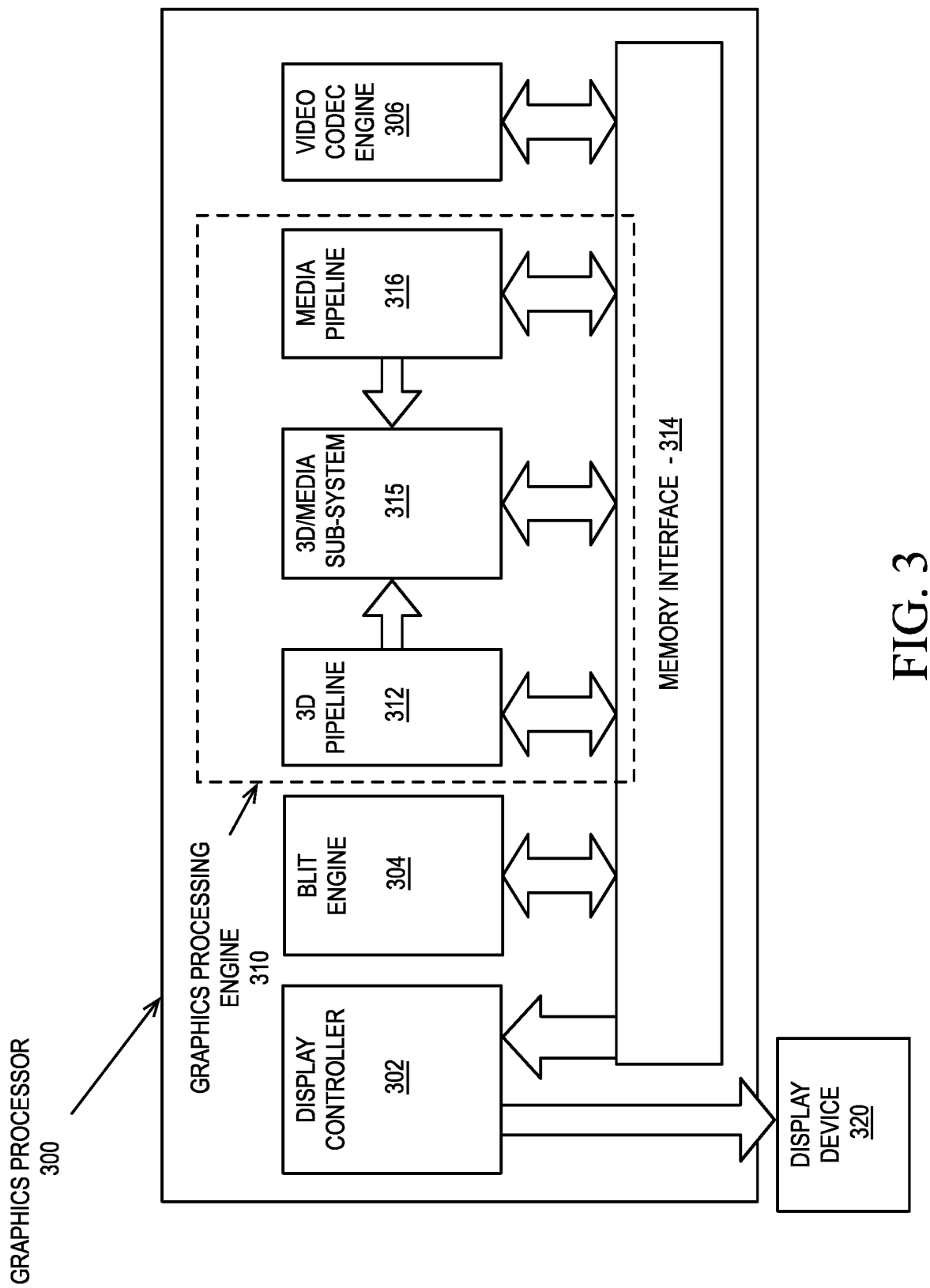
FIG. 3 is a block diagram of a graphics processor, according to an embodiment.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media sub-system 315 includes logic for executing threads spawned by 3D pipeline 312 and media pipeline 316. In one embodiment, the pipelines send thread execution requests to 3D/Media sub-system 315, which includes thread dispatch logic for arbitrating and dispatching the various requests to available thread execution resources. The execution resources include an array of graphics execution units to process the 3D and media threads. In some embodiments, 3D/Media sub-system 315 includes one or more internal caches for thread instructions and data. In some embodiments, the sub-system also includes shared memory, including registers and addressable memory, to share data between threads and to store output data.

Graphics Processing Engine

Figure 4:
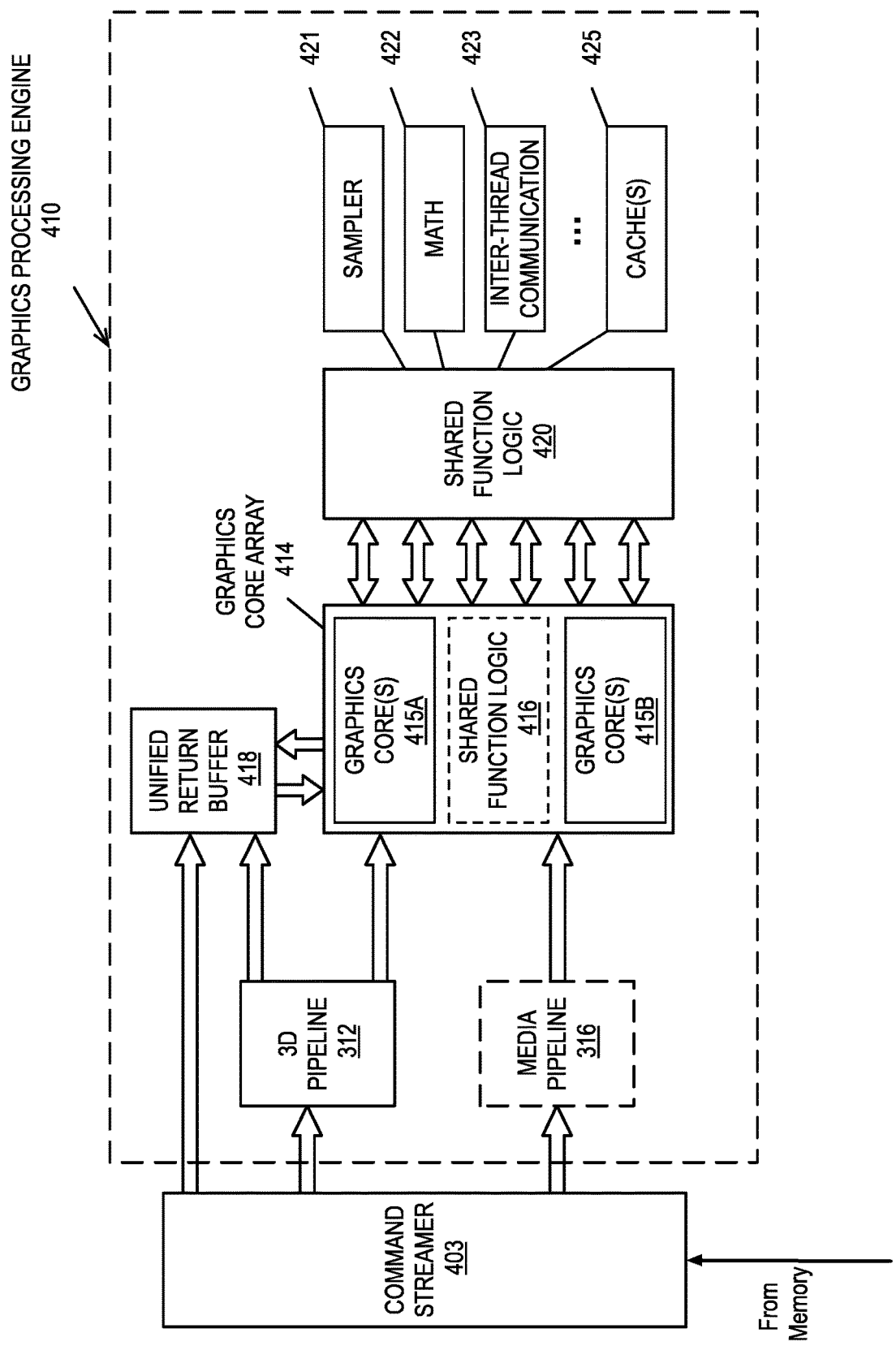
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphics core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
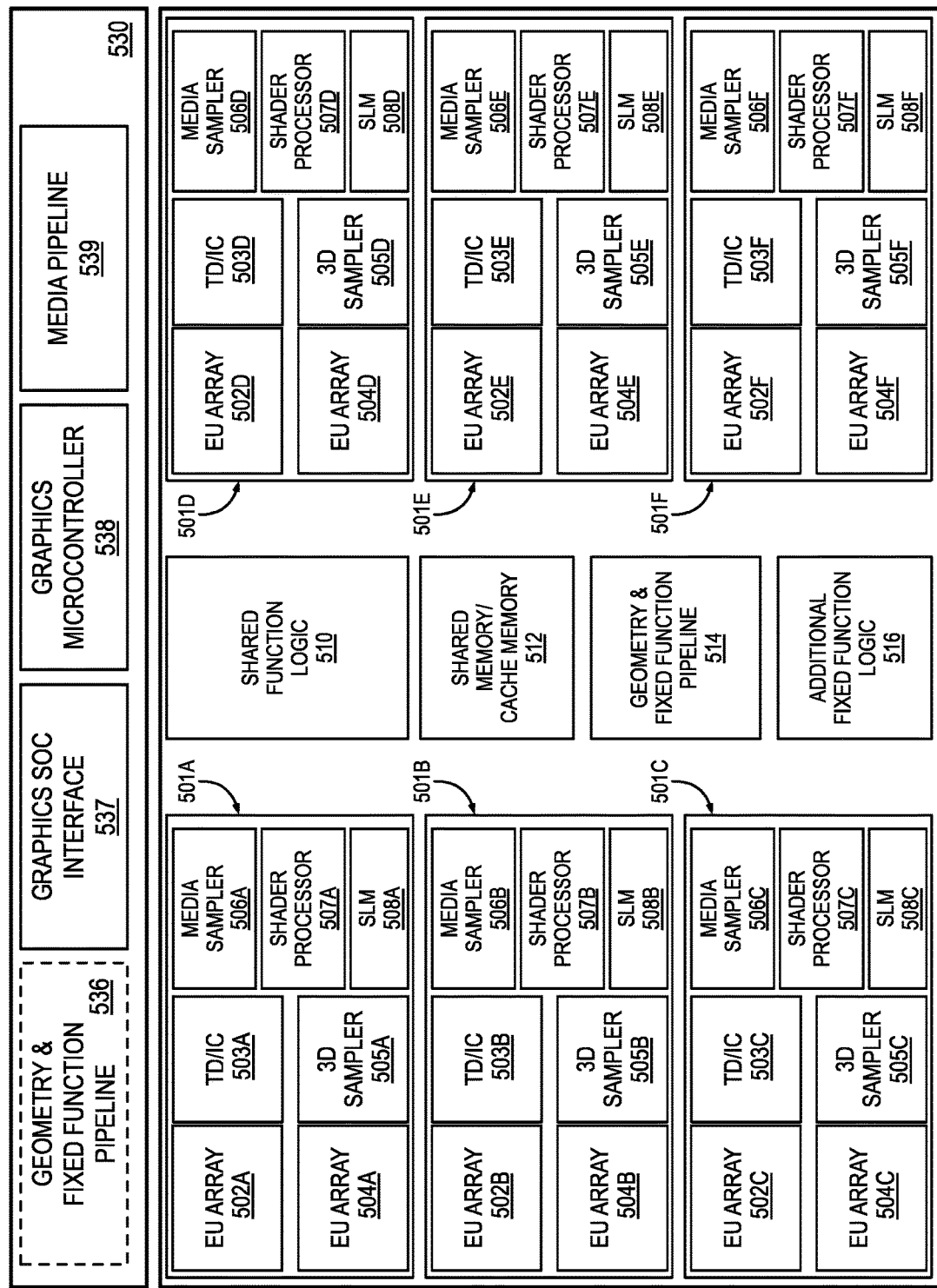
FIG. 5 is a block diagram of hardware logic of a graphics processor core, according to some embodiments described herein.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general purpose and fixed function logic. It will be understood that, as descried herein, references to "logic" may include, by way of example, software, hardware, firmware, or any combination thereof that is configured to perform the described operations.

In some embodiments, the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphics processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
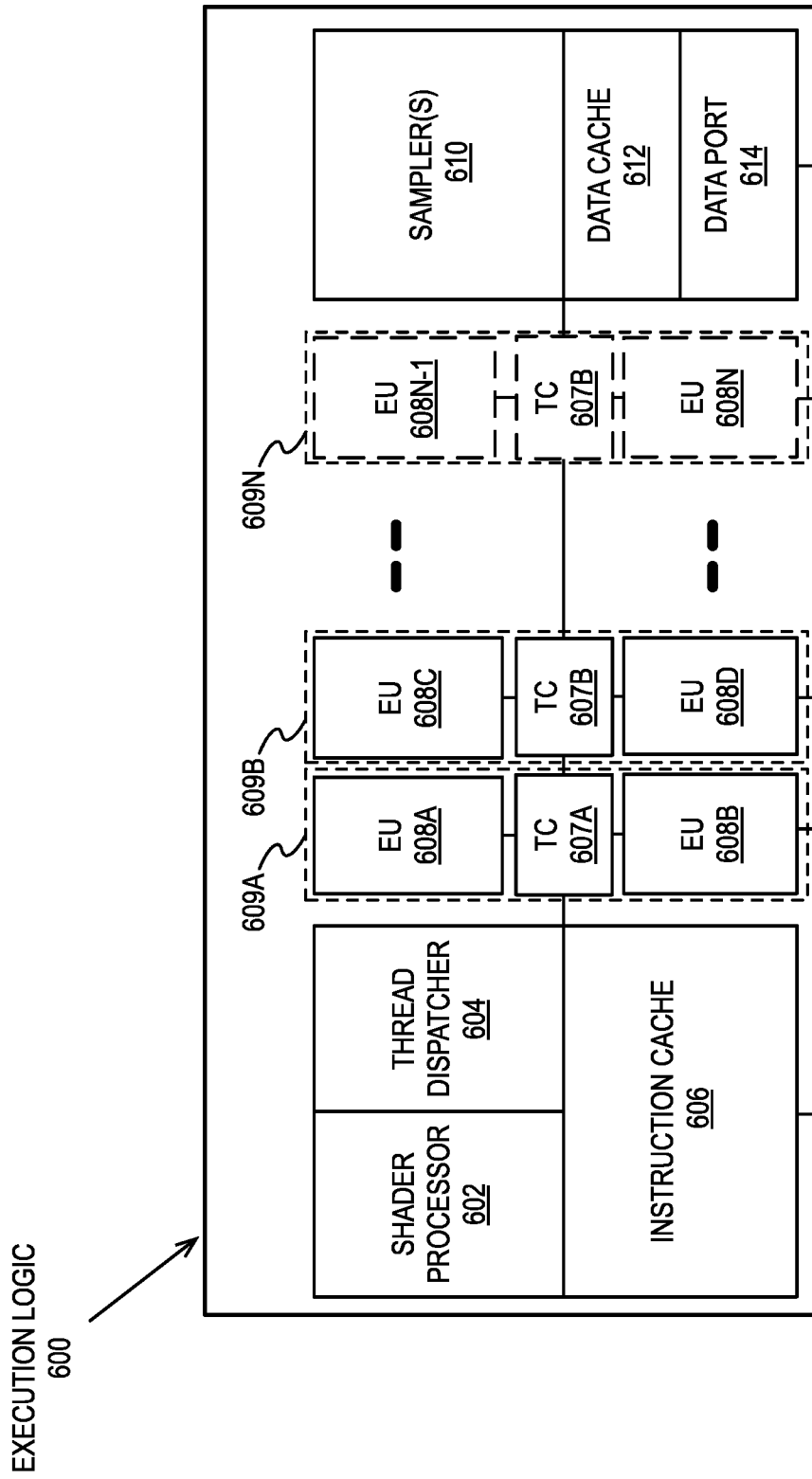
FIGS. 6A-6B illustrate thread execution logic including an array of processing elements employed in a graphics processor core according to embodiments described herein.
Figure 6B:
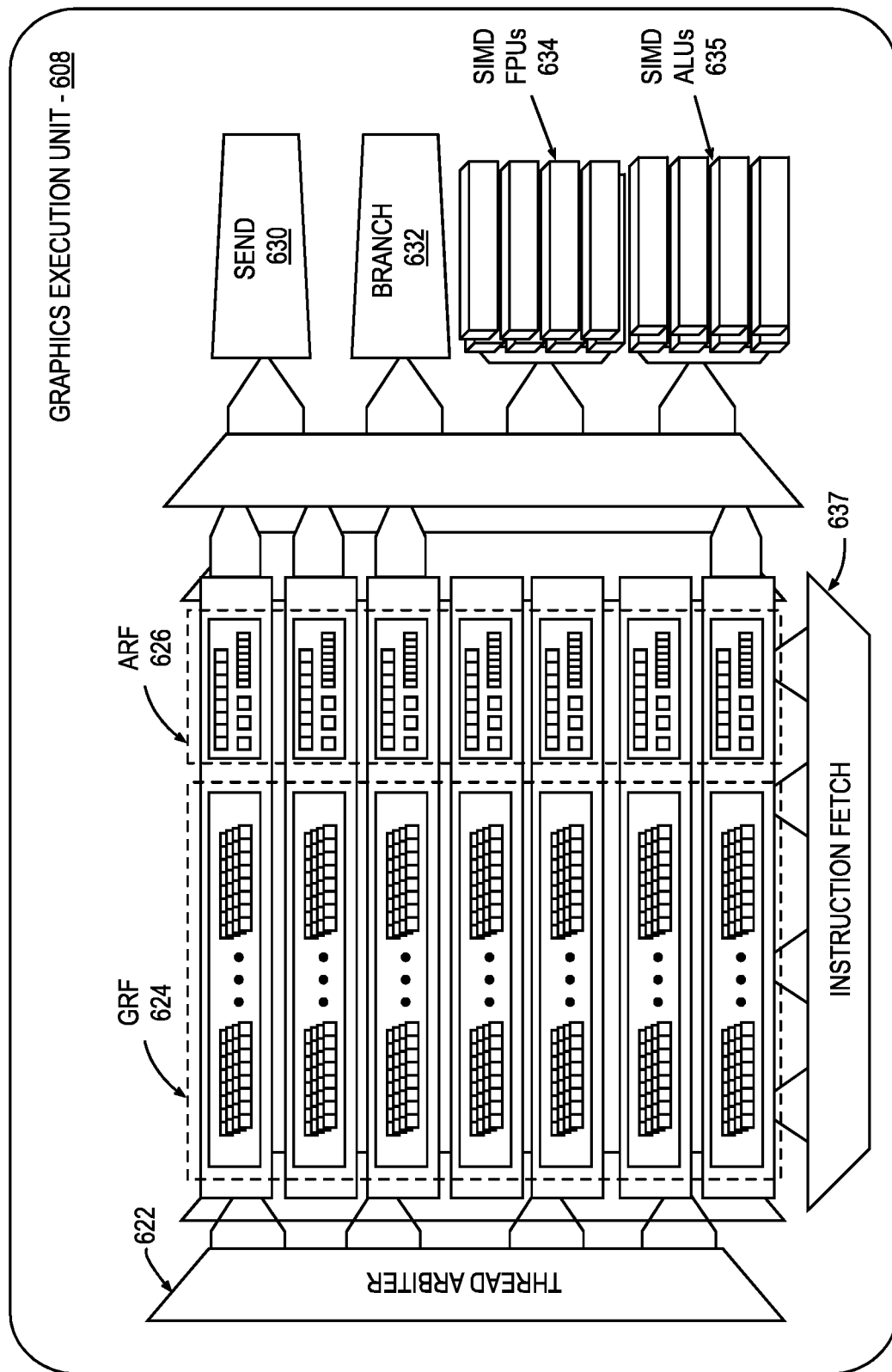

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g., 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating-point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating-point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating-point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating-point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel.

In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
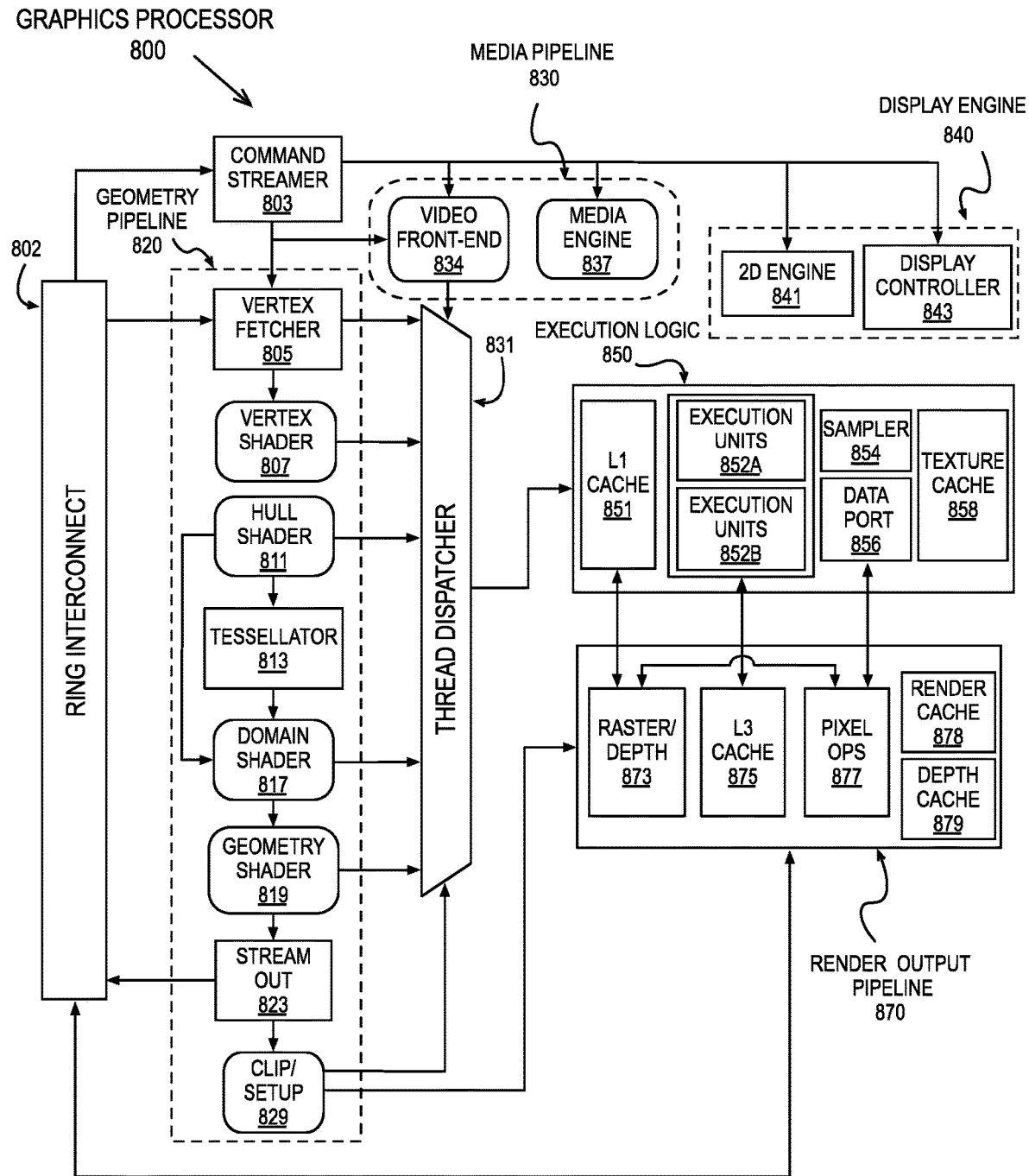
FIG. 8 is a block diagram of a graphics processor according to another embodiment.
Figure 9:
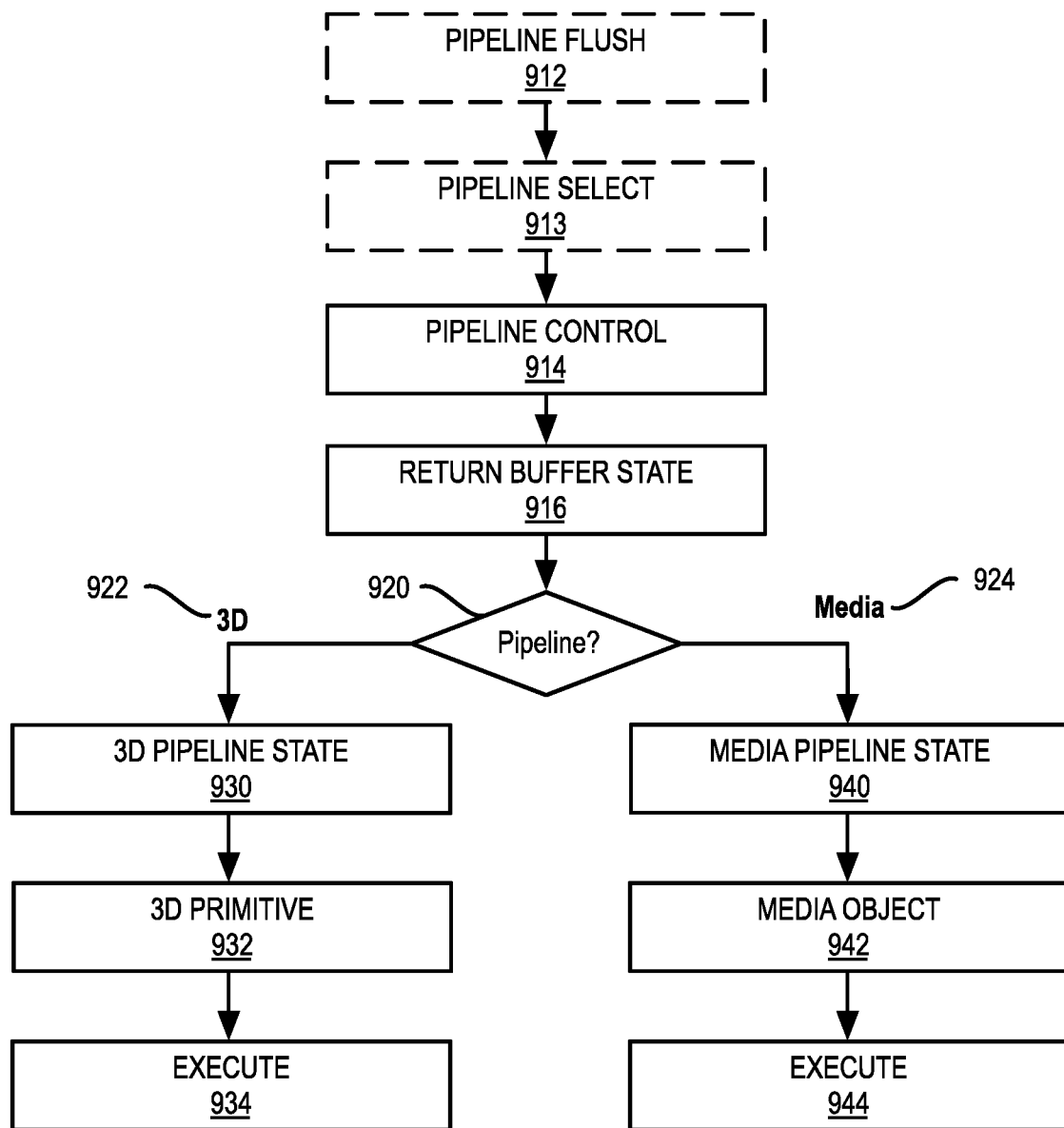
FIG. 9A-9B illustrate a graphics processor command format and command sequence, according to some embodiments.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 can process vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
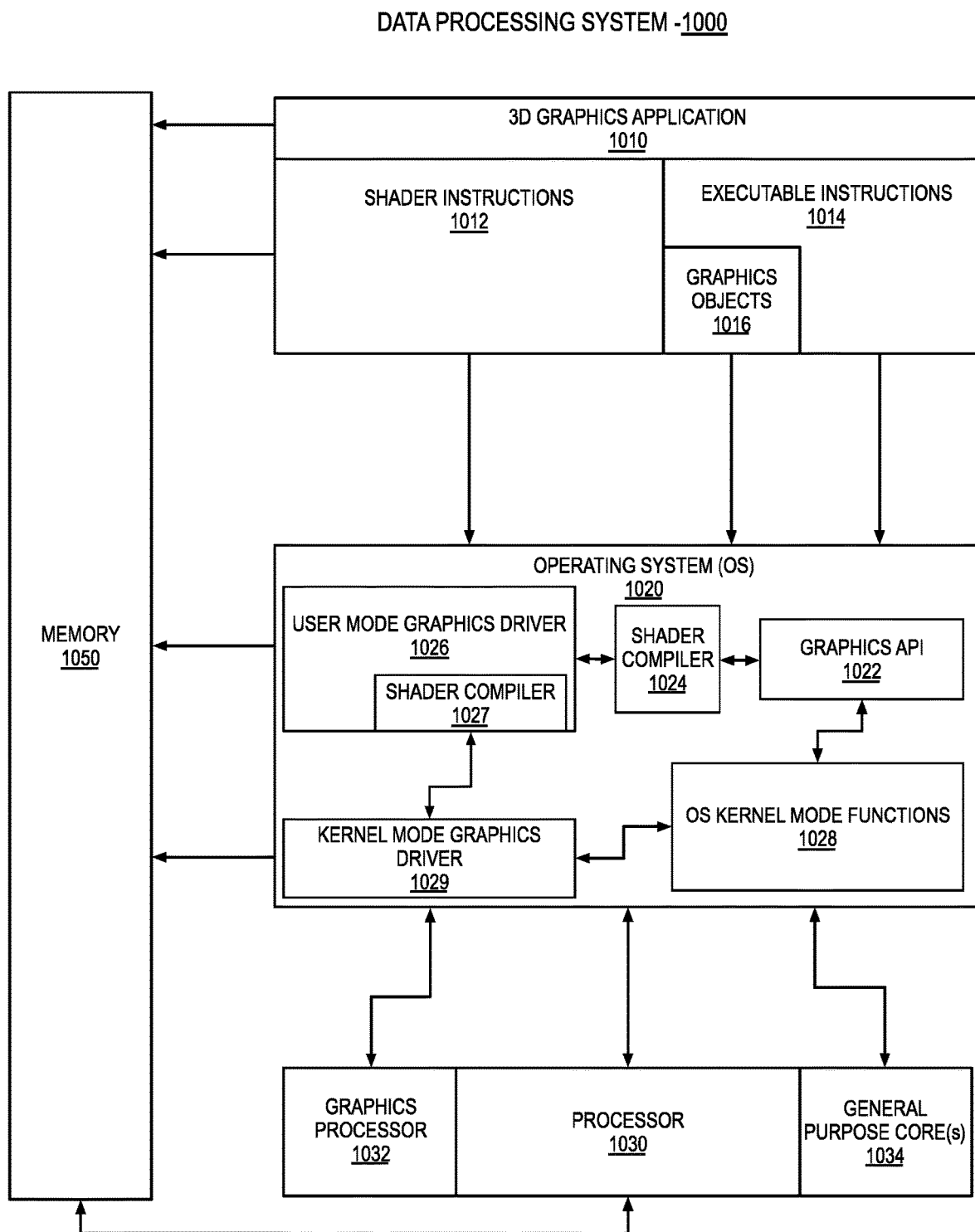
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
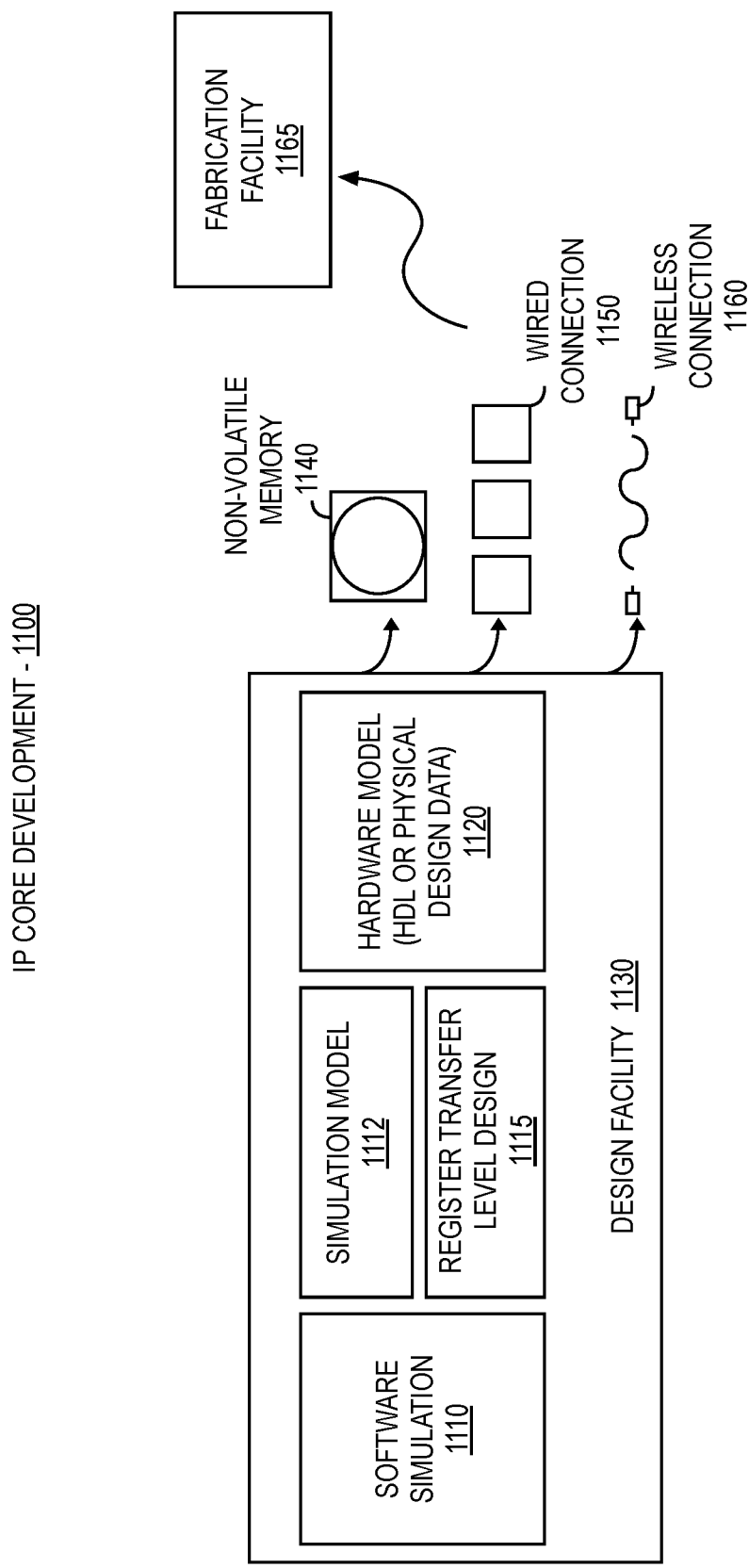
FIG. 11A is a block diagram illustrating an IP core development system, according to an embodiment.

FIG. 11A is a block diagram illustrating an IP core development system 1100 that may be used to manufacture an integrated circuit to perform operations according to an embodiment. The IP core development system 1100 may be used to generate modular, reusable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
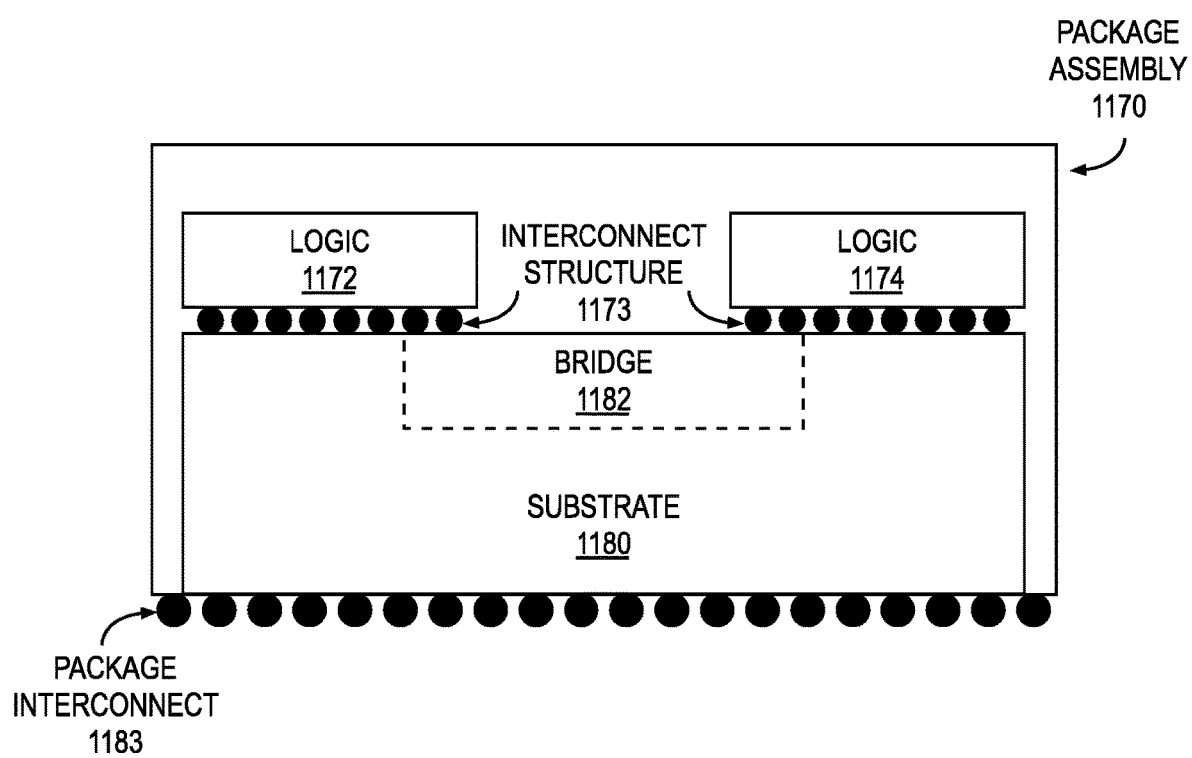
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
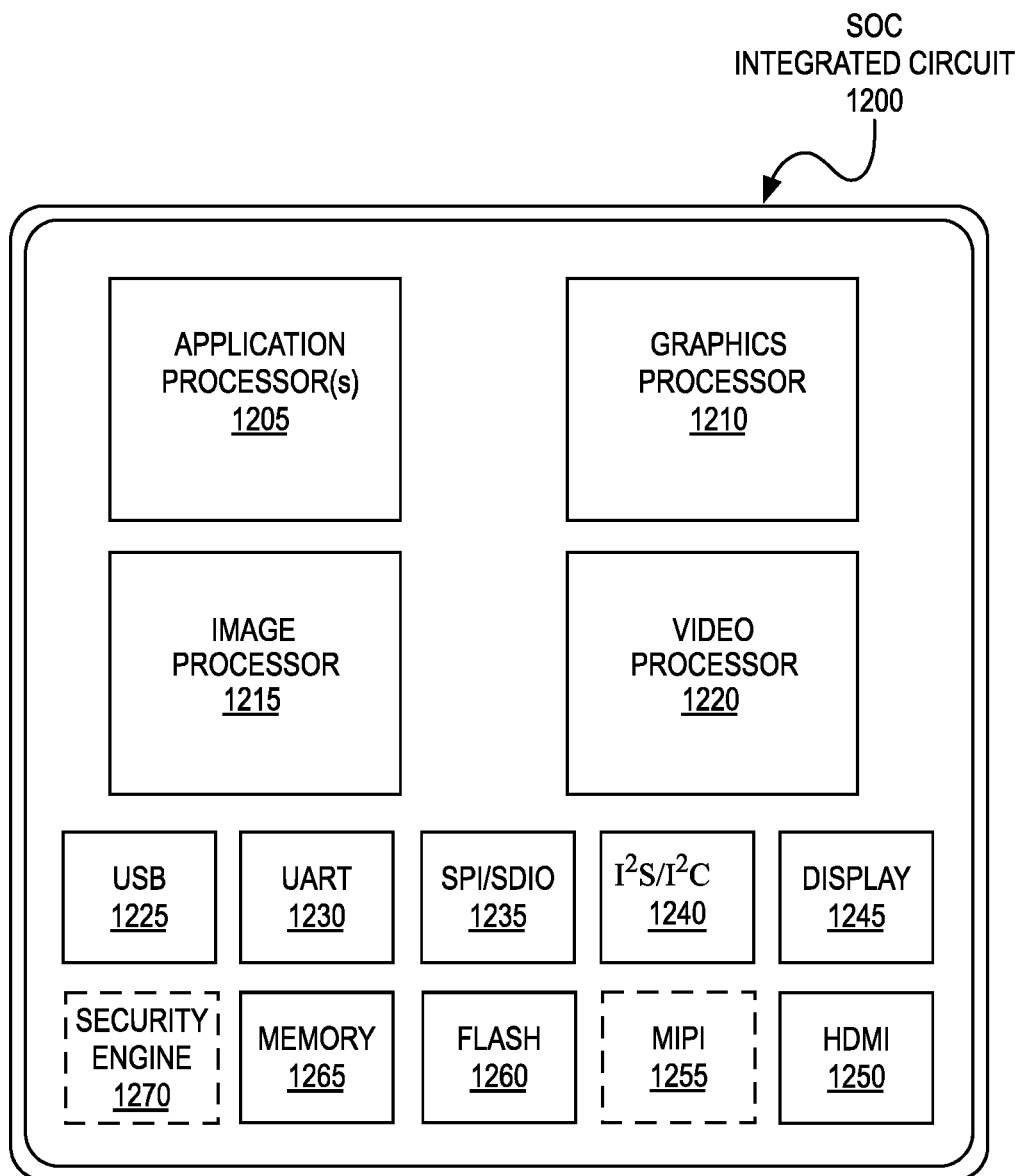
FIG. 12 is a block diagram illustrating an exemplary system on a chip integrated circuit, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
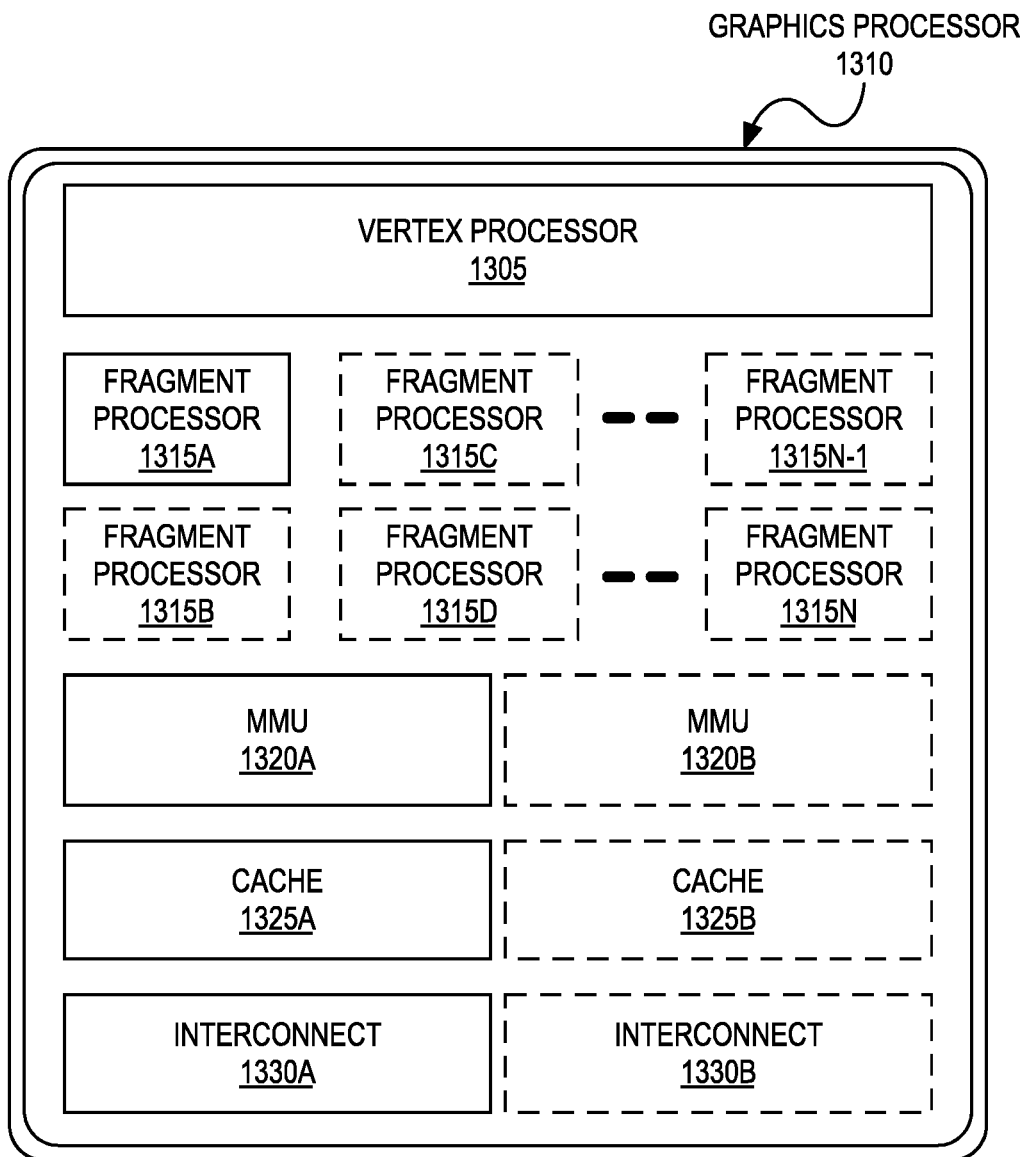
FIGS. 13A-13B are block diagrams illustrating exemplary graphics processors for use within an SoC, according to embodiments described herein.
Figure 13B:
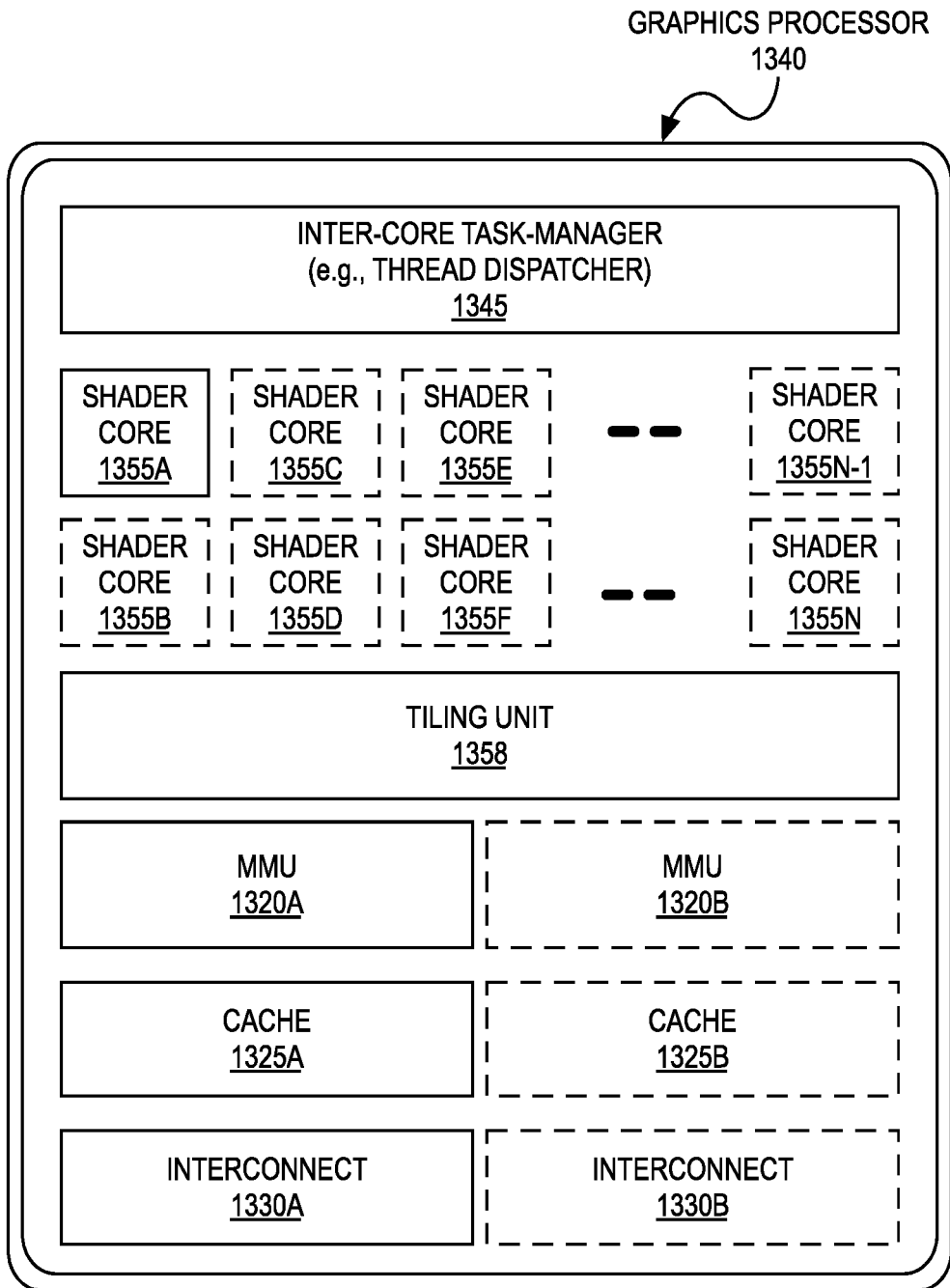

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment, the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
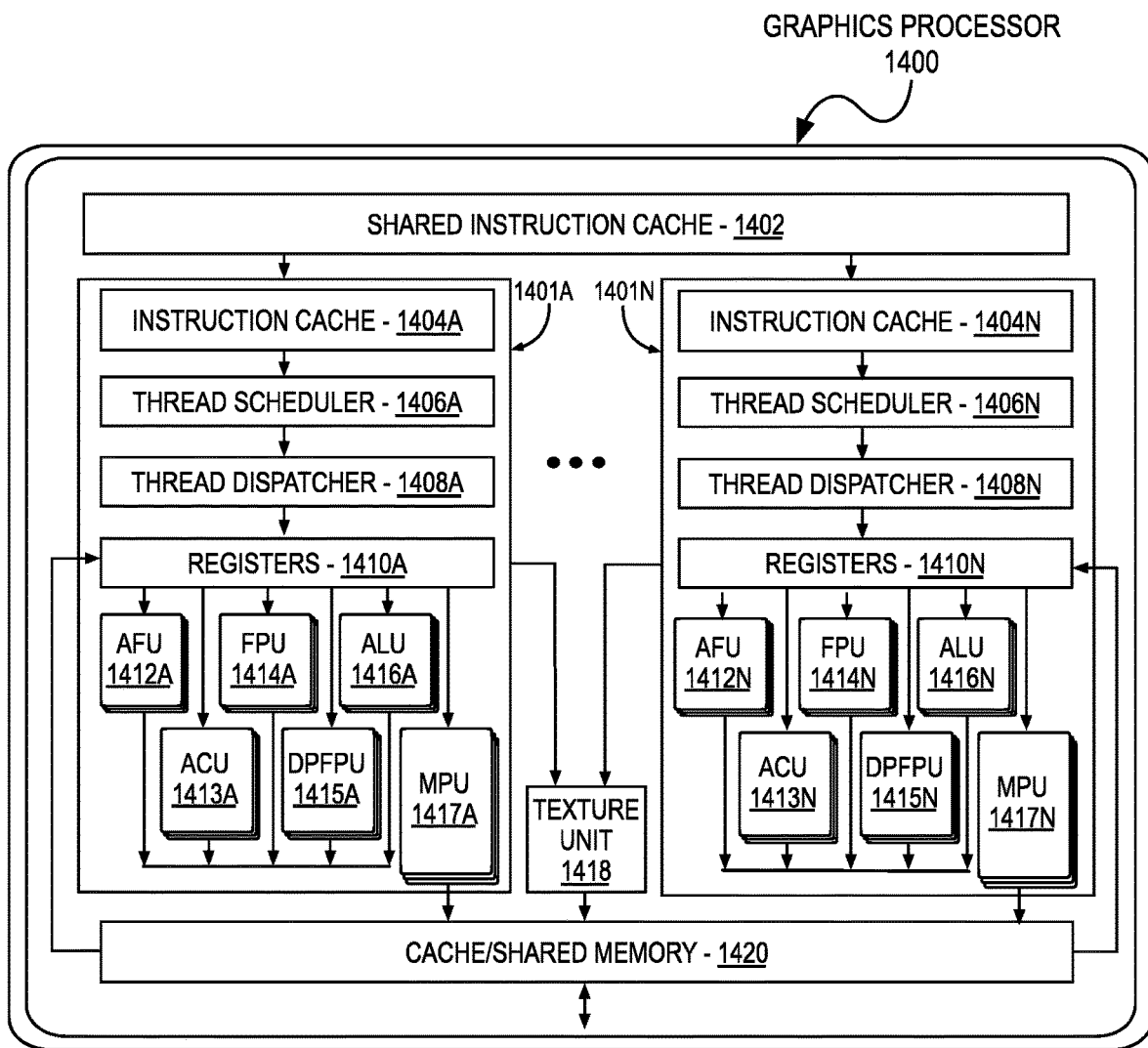
FIGS. 14A-14B illustrate additional exemplary graphics processor logic according to embodiments described herein.
Figure 14B:
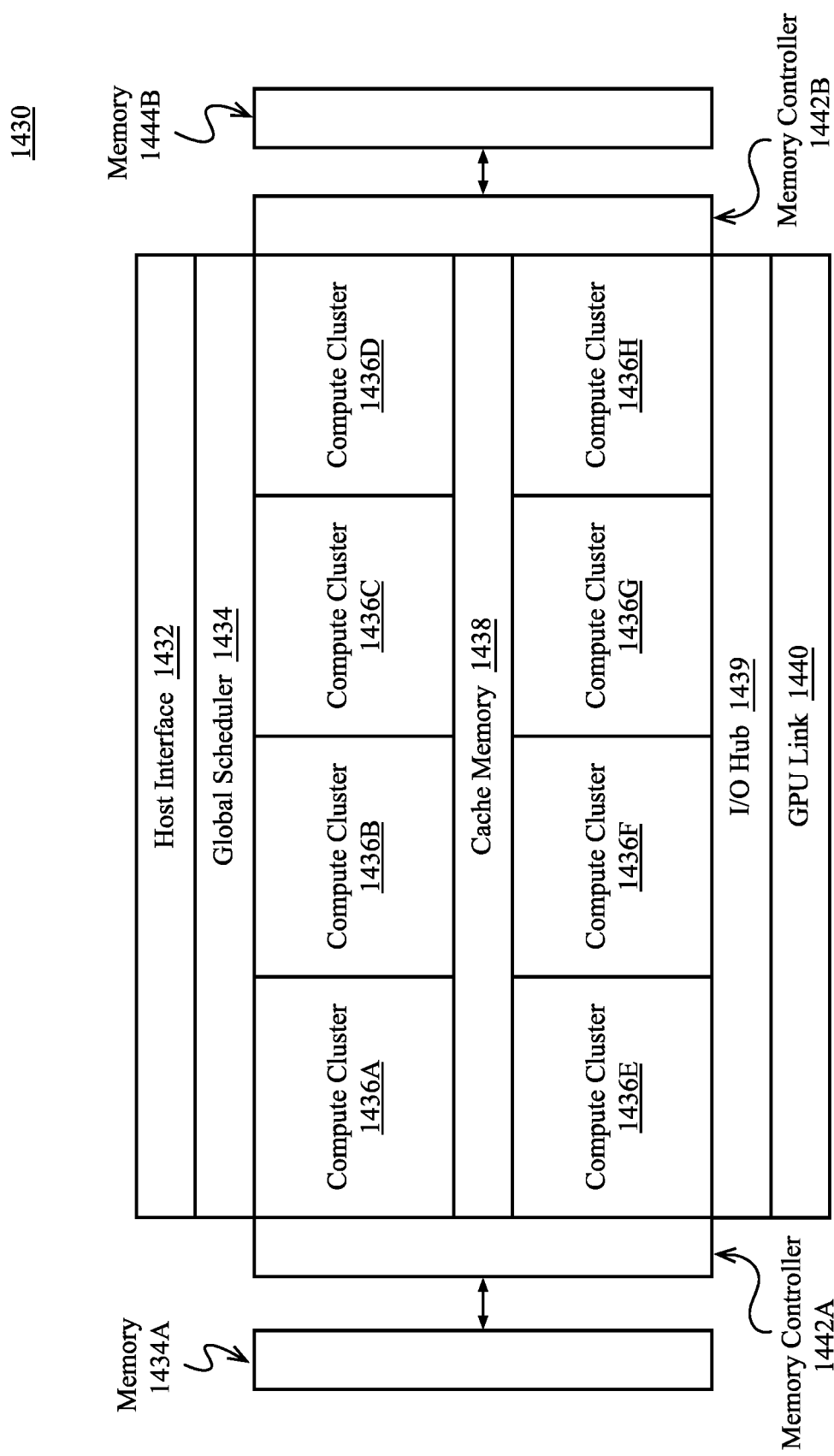

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates a highly-parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating-point operations, while the DPFPUs 1415A-1415N perform double precision (64-bit) floating-point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating-point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment, the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random-access memory (DRAM) or graphics random access memory, such as synchronous graphics random access memory (SGRAM), including graphics double data rate (GDDR) memory.

In one embodiment, the compute clusters 1436A-1436H each include a set of graphics cores, such as the graphics core 1400 of FIG. 14A, which can include multiple types of integer and floating-point logic units that can perform computational operations at a range of precisions including suited for machine learning computations. For example and in one embodiment at least a subset of the floating-point units in each of the compute clusters 1436A-1436H can be configured to perform 16-bit or 32-bit floating-point operations, while a different subset of the floating-point units can be configured to perform 64-bit floating-point operations.

Multiple instances of the GPGPU 1430 can be configured to operate as a compute cluster. The communication mechanism used by the compute cluster for synchronization and data exchange varies across embodiments. In one embodiment, the multiple instances of the GPGPU 1430 communicate over the host interface 1432. In one embodiment, the GPGPU 1430 includes an I/O hub 1439 that couples the GPGPU 1430 with a GPU link 1440 that enables a direct connection to other instances of the GPGPU. In one embodiment, the GPU link 1440 is coupled to a dedicated GPU-to-GPU bridge that enables communication and synchronization between multiple instances of the GPGPU 1430. In one embodiment, the GPU link 1440 couples with a high-speed interconnect to transmit and receive data to other GPGPUs or parallel processors. In one embodiment, the multiple instances of the GPGPU 1430 are located in separate data processing systems and communicate via a network device that is accessible via the host interface 1432. In one embodiment, the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration, the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment, the inferencing configuration of the GPGPU 1430 can support inferencing specific instructions. For example, an inferencing configuration can provide support for one or more 8-bit integer dot product instructions, which are commonly used during inferencing operations for deployed neural networks.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 15:
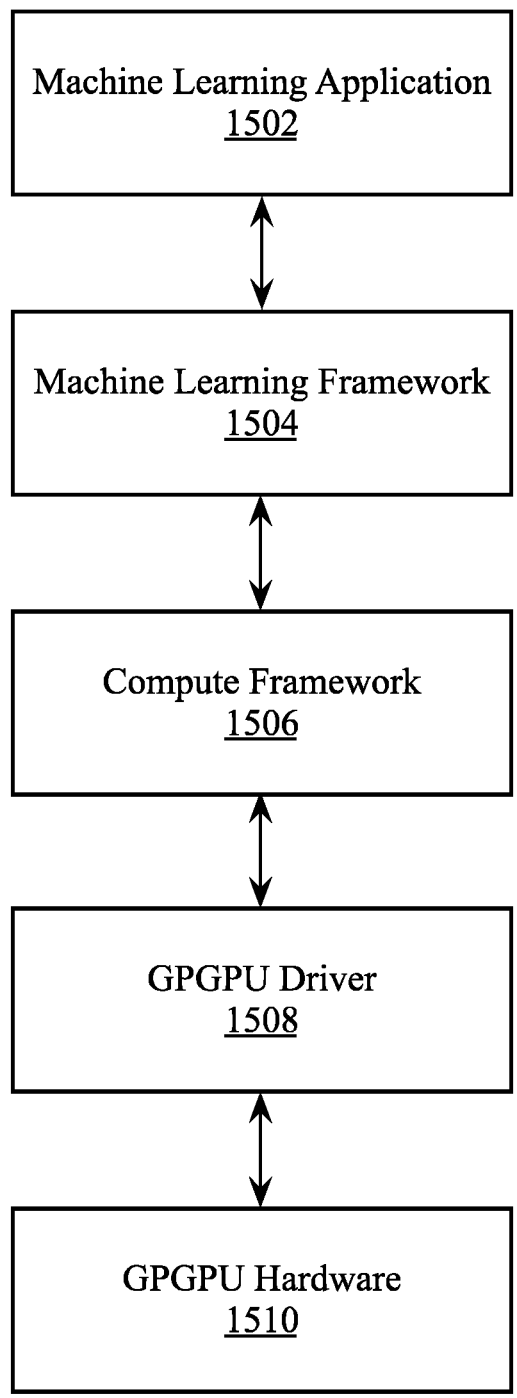
FIG. 15 illustrates a machine learning software stack, according to an embodiment.

FIG. 15 is a generalized diagram of a machine learning software stack 1500. A machine learning application 1502 can be configured to train a neural network using a training dataset or to use a trained deep neural network to implement machine intelligence. The machine learning application 1502 can include training and inference functionality for a neural network and/or specialized software that can be used to train a neural network before deployment. The machine learning application 1502 can implement any type of machine intelligence including but not limited to image recognition, mapping and localization, autonomous navigation, speech synthesis, medical imaging, or language translation.

Hardware acceleration for the machine learning application 1502 can be enabled via a machine learning framework 1504. The machine learning framework 1504 can provide a library of machine learning primitives. Machine learning primitives are basic operations that are commonly performed by machine learning algorithms. Without the machine learning framework 1504, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1504. Exemplary primitives include tensor convolutions, activation functions, and pooling, which are computational operations that are performed while training a convolutional neural network (CNN). The machine learning framework 1504 can also provide primitives to implement basic linear algebra subprograms performed by many machine-learning algorithms, such as matrix and vector operations.

The machine learning framework 1504 can process input data received from the machine learning application 1502 and generate the appropriate input to a compute framework 1506. The compute framework 1506 can abstract the underlying instructions provided to the GPGPU driver 1508 to enable the machine learning framework 1504 to take advantage of hardware acceleration via the GPGPU hardware 1510 without requiring the machine learning framework 1504 to have intimate knowledge of the architecture of the GPGPU hardware 1510. Additionally, the compute framework 1506 can enable hardware acceleration for the machine learning framework 1504 across a variety of types and generations of the GPGPU hardware 1510.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 16A:
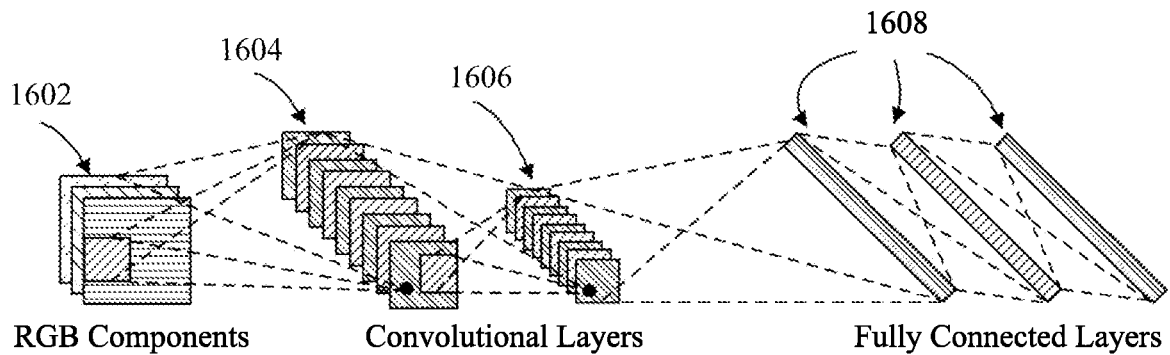
FIG. 16A-16B illustrate layers of exemplary deep neural networks.
Figure 16B:
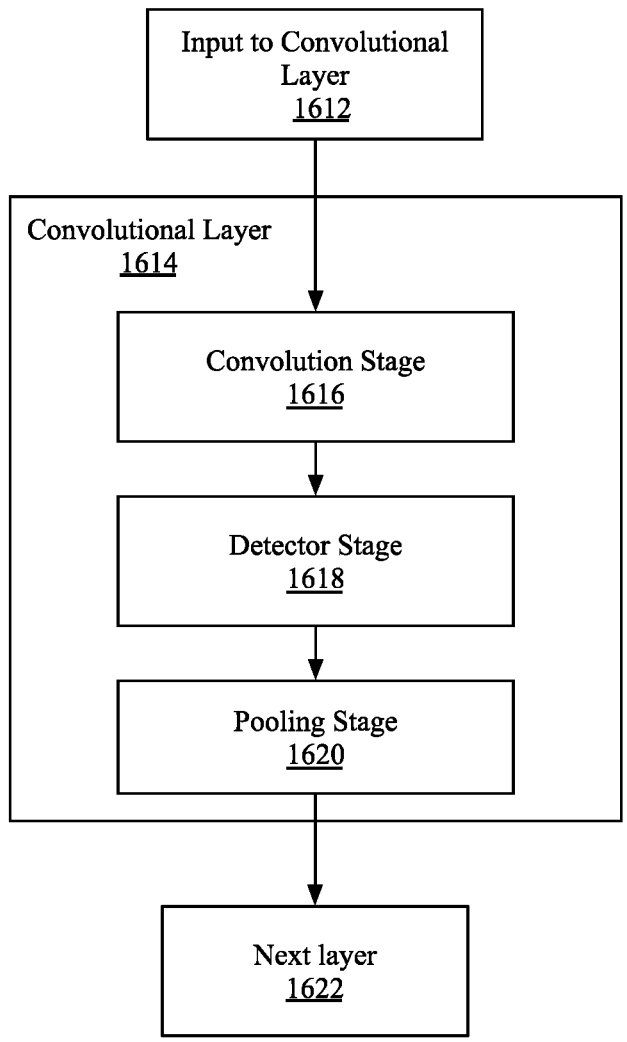

FIG. 16A-16B illustrate an exemplary convolutional neural network. FIG. 16A illustrates various layers within a CNN. As shown in FIG. 16A, an exemplary CNN used to model image processing can receive input 1602 describing the red, green, and blue (RGB) components of an input image. The input 1602 can be processed by multiple convolutional layers (e.g., first convolutional layer 1604, second convolutional layer 1606). The output from the multiple convolutional layers may optionally be processed by a set of fully connected layers 1608. Neurons in a fully connected layer have full connections to all activations in the previous layer, as previously described for a feedforward network. The output from the fully connected layers 1608 can be used to generate an output result from the network. The activations within the fully connected layers 1608 can be computed using matrix multiplication instead of convolution. Not all CNN implementations are make use of fully connected layers 1608. For example, in some implementations the second convolutional layer 1606 can generate output for the CNN.

The convolutional layers are sparsely connected, which differs from traditional neural network configuration found in the fully connected layers 1608. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 16B illustrates exemplary computation stages within a convolutional layer of a CNN. Input to a convolutional layer 1612 of a CNN can be processed in three stages of a convolutional layer 1614. The three stages can include a convolution stage 1616, a detector stage 1618, and a pooling stage 1620. The convolution layer 1614 can then output data to a successive convolutional layer. The final convolutional layer of the network can generate output feature map data or provide input to a fully connected layer, for example, to generate a classification value for the input to the CNN.

In the convolution stage 1616 performs several convolutions in parallel to produce a set of linear activations. The convolution stage 1616 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 1616 defines a set of linear activations that are processed by successive stages of the convolutional layer 1614.

The linear activations can be processed by a detector stage 1618. In the detector stage 1618, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 1620 uses a pooling function that replaces the output of the second convolutional layer 1606 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 1620, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 1614 can then be processed by the next layer 1622. The next layer 1622 can be an additional convolutional layer or one of the fully connected layers 1608. For example, the first convolutional layer 1604 of FIG. 16A can output to the second convolutional layer 1606, while the second convolutional layer can output to a first layer of the fully connected layers 1608.

Figure 17:
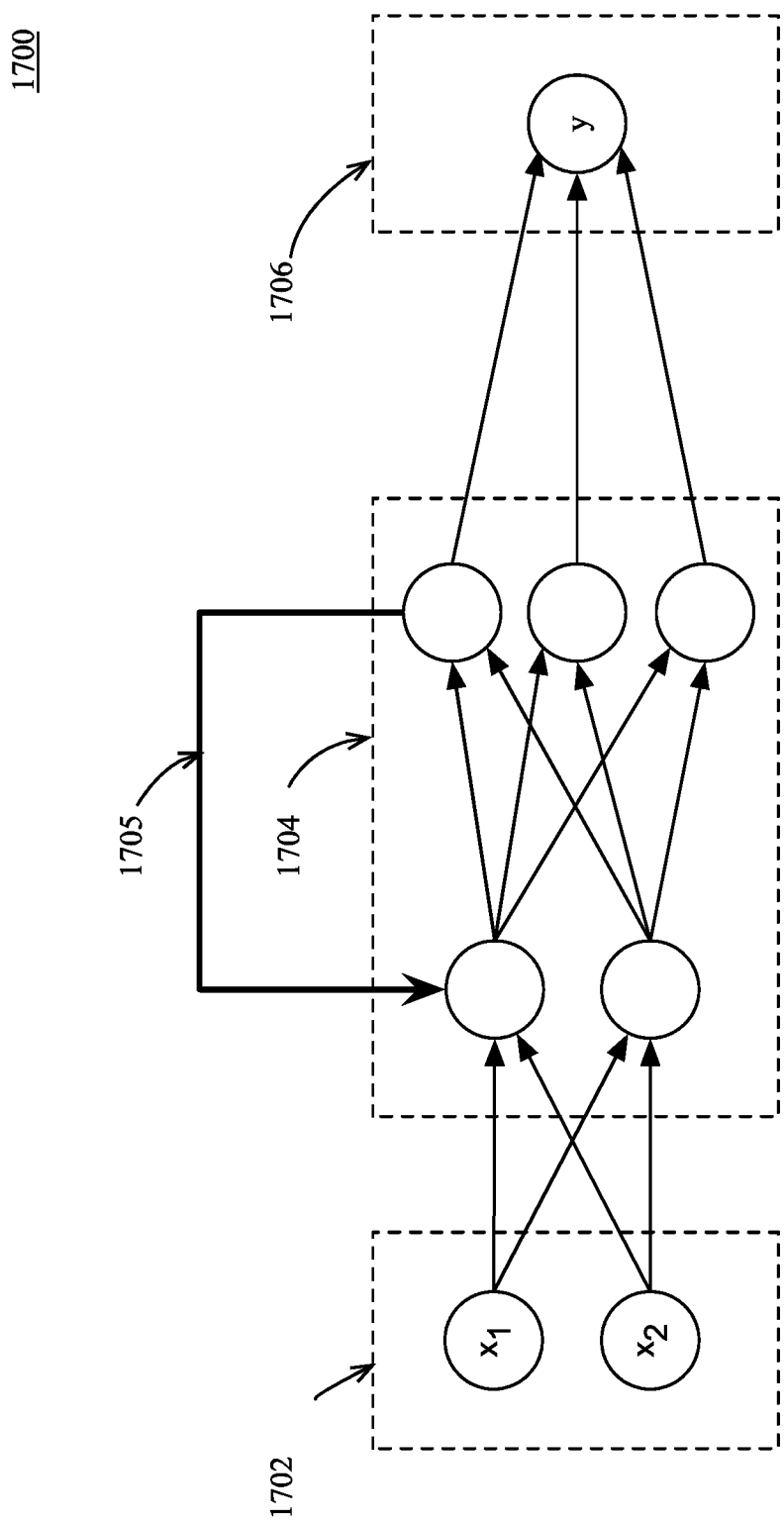
FIG. 17 illustrates an exemplary recurrent neural network.

FIG. 17 illustrates an exemplary recurrent neural network. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1700 can be described as having an input layer 1702 that receives an input vector, hidden layers 1704 to implement a recurrent function, a feedback mechanism 1705 to enable a 'memory' of previous states, and an output layer 1706 to output a result. The RNN 1700 operates based on time-steps. The state of the RNN at a given time step is influenced based on the previous time step via the feedback mechanism 1705. For a given time step, the state of the hidden layers 1704 is defined by the previous state and the input at the current time step. An initial input ($x_1$) at a first time step can be processed by the hidden layer 1704. A second input ($x_2$) can be processed by the hidden layer 1704 using state information that is determined during the processing of the initial input ($x_1$). A given state can be computed as $s_t = f(Ux_t + Ws_{t-1})$, where U and W are parameter matrices. The function $f$ is generally a nonlinearity, such as the hyperbolic tangent function (Tan h) or a variant of the rectifier function $f(x) = \max(0, x)$. However, the specific mathematical function used in the hidden layers 1704 can vary depending on the specific implementation details of the RNN 1700.

In addition to the basic CNN and RNN networks described, variations on those networks may be enabled. One example RNN variant is the long short-term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 18:
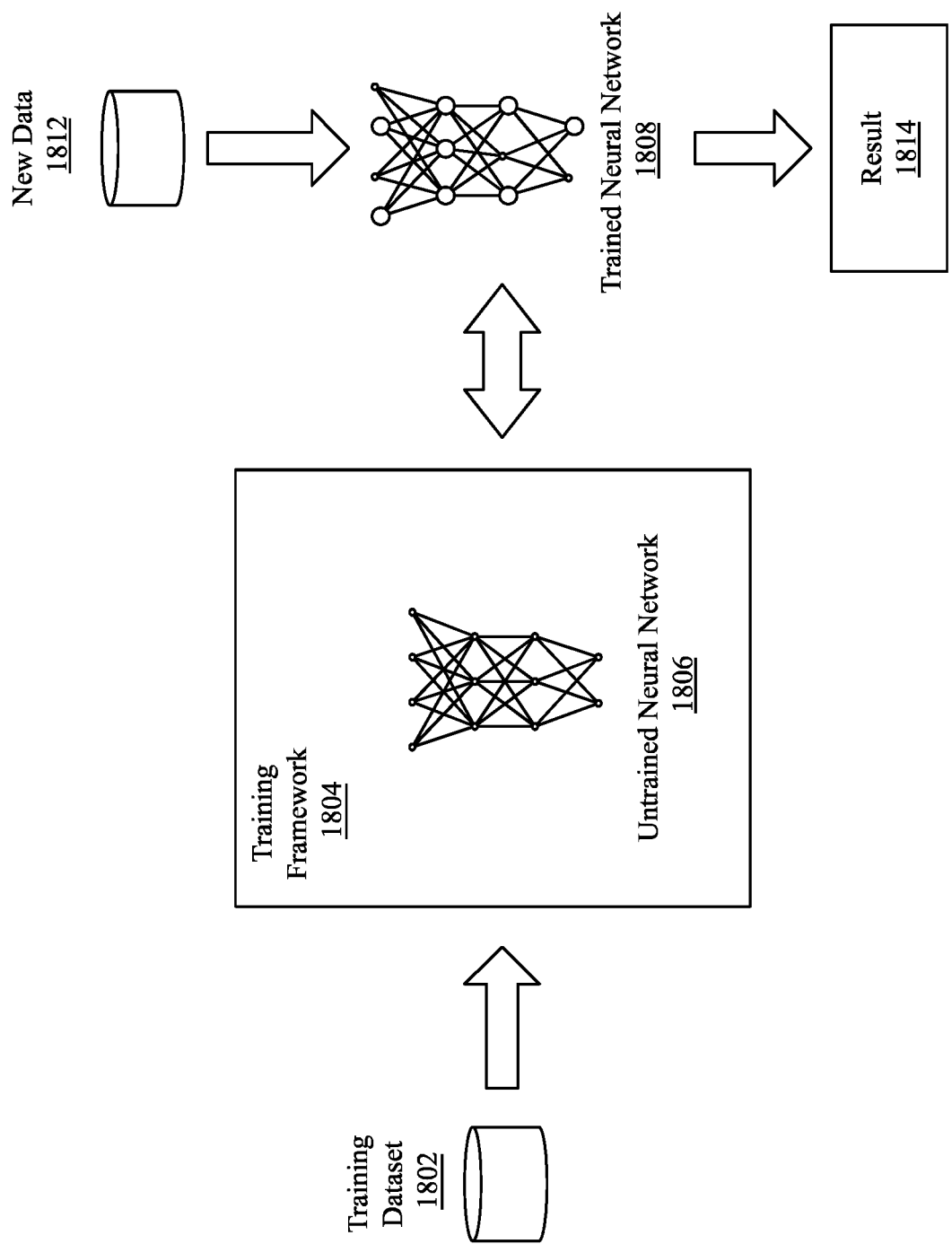
FIG. 18 illustrates training and deployment of a deep neural network.

FIG. 18 illustrates training and deployment of a deep neural network. Once a given network has been structured for a task the neural network is trained using a training dataset 1802. Various training frameworks have been developed to enable hardware acceleration of the training process. For example, the machine learning framework 1504 of FIG. 15 may be configured as a training framework 1804. The training framework 1804 can hook into an untrained neural network 1806 and enable the untrained neural net to be trained using the parallel processing resources described herein to generate a trained neural network 1808. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1802 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1804 can adjust to adjust the weights that control the untrained neural network 1806. The training framework 1804 can provide tools to monitor how well the untrained neural network 1806 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1808. The trained neural network 1808 can then be deployed to implement any number of machine learning operations to generate a result 1814 based on input of new data 1812.

Unsupervised learning is a learning method in which the network attempts to train itself using unlabeled data. Thus, for unsupervised learning the training dataset 1802 will include input data without any associated output data. The untrained neural network 1806 can learn groupings within the unlabeled input and can determine how individual inputs are related to the overall dataset. Unsupervised training can be used to generate a self-organizing map, which is a type of trained neural network 1807 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1802 includes a mix of labeled and unlabeled data of the same distribution. Incremental learning is a variant of supervised learning in which input data is continuously used to further train the model. Incremental learning enables the trained neural network 1808 to adapt to the new data 1812 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 19:
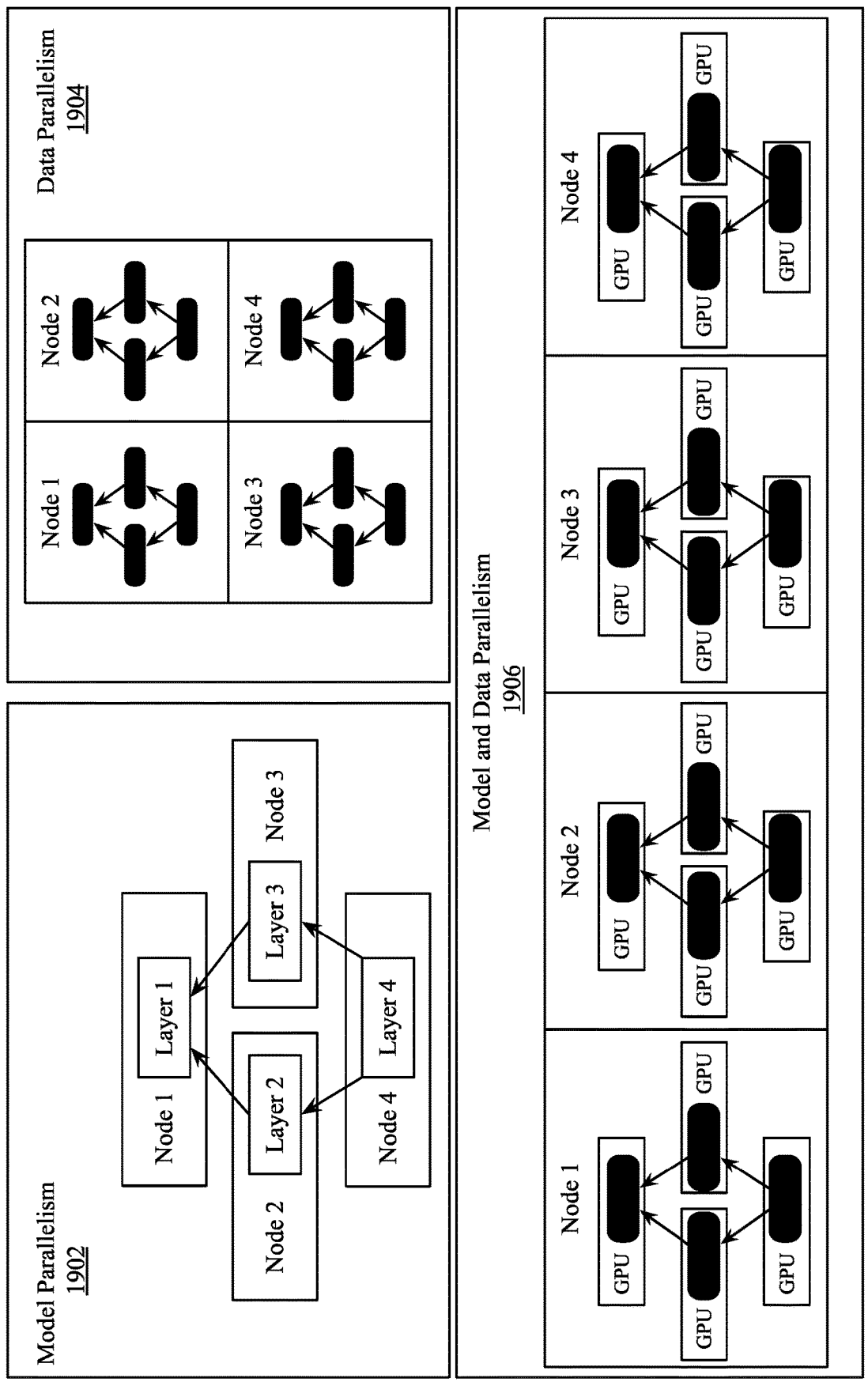
FIG. 19 is a block diagram illustrating distributed learning.

FIG. 19 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes. As illustrated, distributed learning can be performed model parallelism 1902, data parallelism 1904, or a combination of model and data parallelism 1904.

In model parallelism 1902, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1904, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1906 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.

Abstraction Layers for Scalable Distributed Machine Learning

Currently, data scientists that develop applications that make use of distributed deep learning are required to explicitly implement the communication system between the compute nodes. Implementing the underlying communications system for distributed deep learning requires some knowledge of distributed or networked compute node communication techniques, including the libraries required to implement such techniques. For example, to implement distributed deep learning models such as data parallelism, model parallelism, or hybrid parallelism (mixed data and model parallelism), the application developer may be required to explicitly construct the communication infrastructure using low level communication libraries, such as the message passing interface (MPI) library. The application developer will then be required to determine the specific units of data to transfer and the specific nodes that will be transmitting and receiving such information. As deep learning application developers may not be domain specific experts in the construction of distributed compute infrastructure, many best practices and optimizations may not be included in the communication implementation developed for a given deep learning application.

Distributed machine learning can be implemented using a variety of parallelism patterns, such as data parallelism, model parallelism, or a hybrid of data and model parallelism, as illustrated in FIG. 19. As described with respect to FIG. 19, data parallelism uses the same model for each compute node, with each node processing different portions of the data. Model parallelism uses the same data for each compute node, with the model split among compute nodes.

To enable communication, multiple types of low-level communication patterns are used to transfer data between nodes. The low-level communication patterns used are illustrated in Table 1 below.

TABLE 1

Low Level Communication Operation

| Communication Operation | Description |
| --- | --- |
| GATHER | Gathers data from multiple processes in a group into a specified array in a single process |
| SCATTER | Distribute data from a single array into multiple segments, where different segments are sent to different processes |
| ALLGATHER | Gather operation in which all processes receive the gather result |
| ALLTOALL | Each process in the group sends distinct data to each receiver |
| REDUCE | A global reduction operation in which the outcome from applying some desired function across all processes in a group is collected in one specified process |
| REDUCE_SCATTER | Element-wise reduction on vector of element, with the resulting vector split into disjoint segments, with different segments sent to each process in a group |
| ALLREDUCE | A reduce combined with a broadcast, where the outcome of the reduce operation is broadcast to all processes within a group. |

Figure 20A:
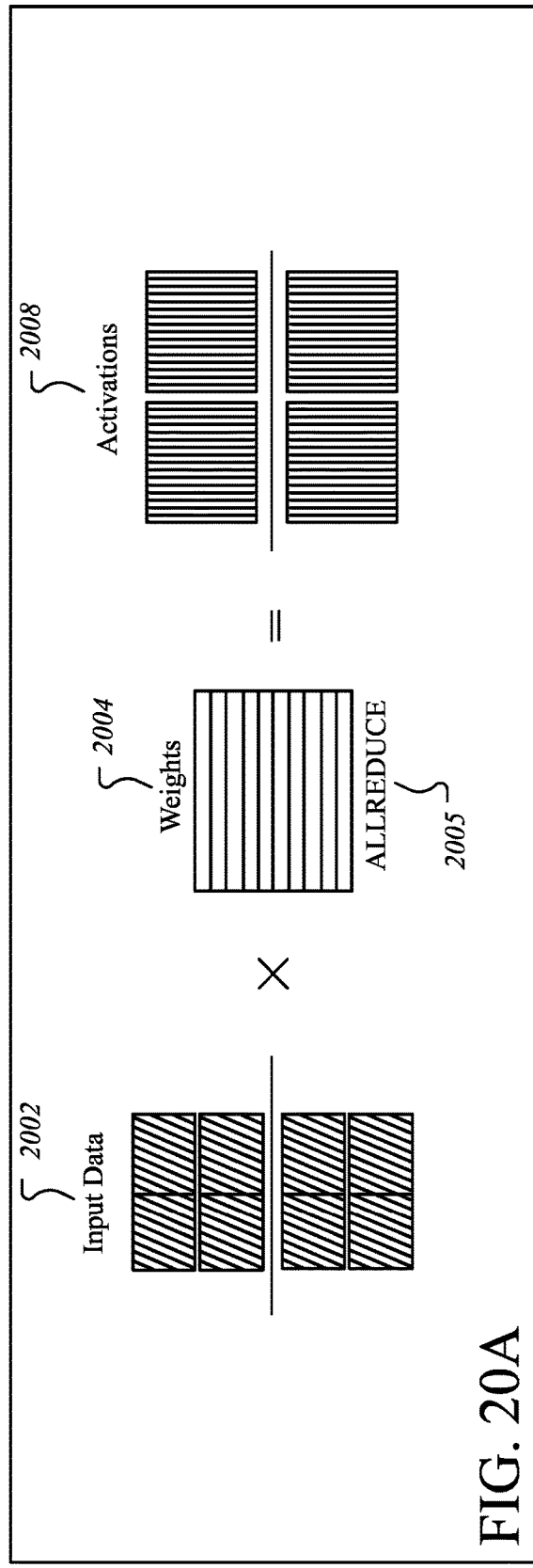
FIGS. 20A-20E illustrate communication patterns used during distributed machine learning compute operations performed across multiple compute nodes, according to embodiments described herein.
Figure 20B:
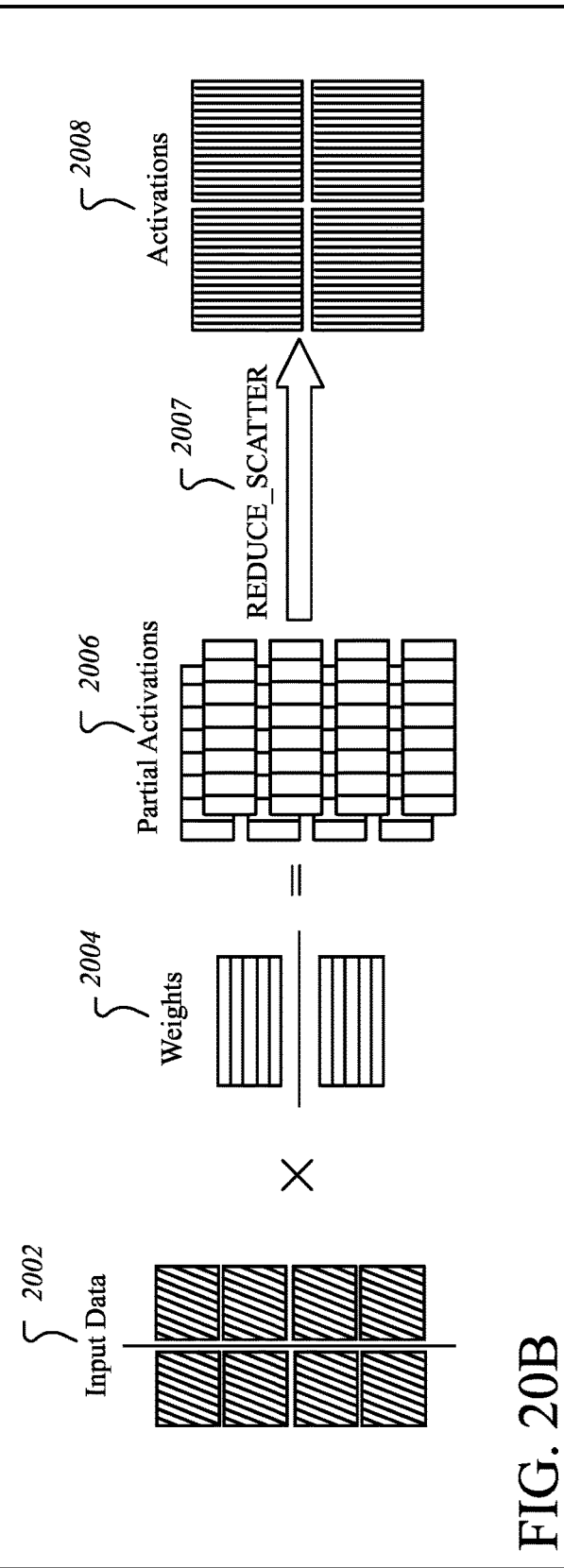
Figure 20C:
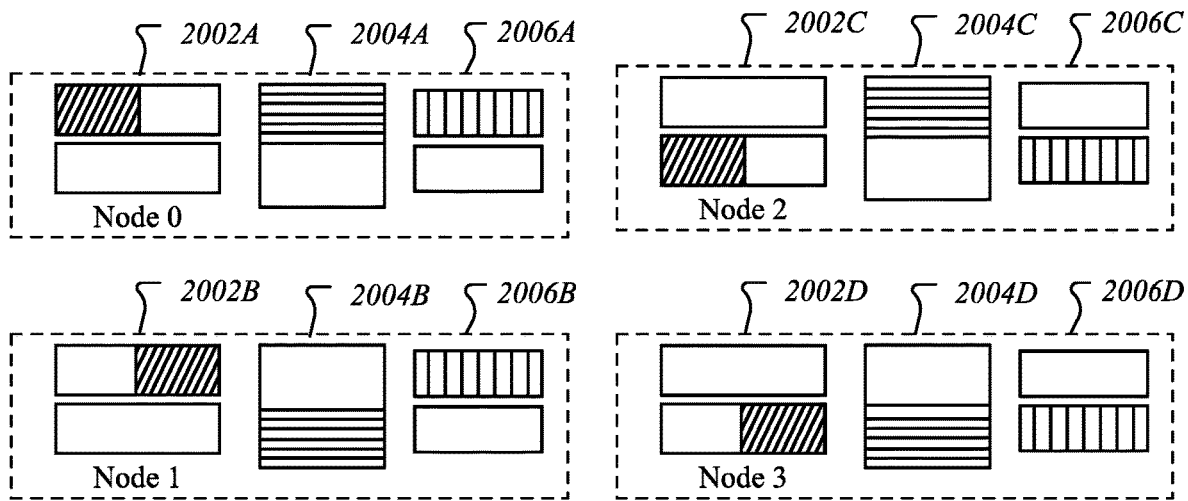
Figure 20D:
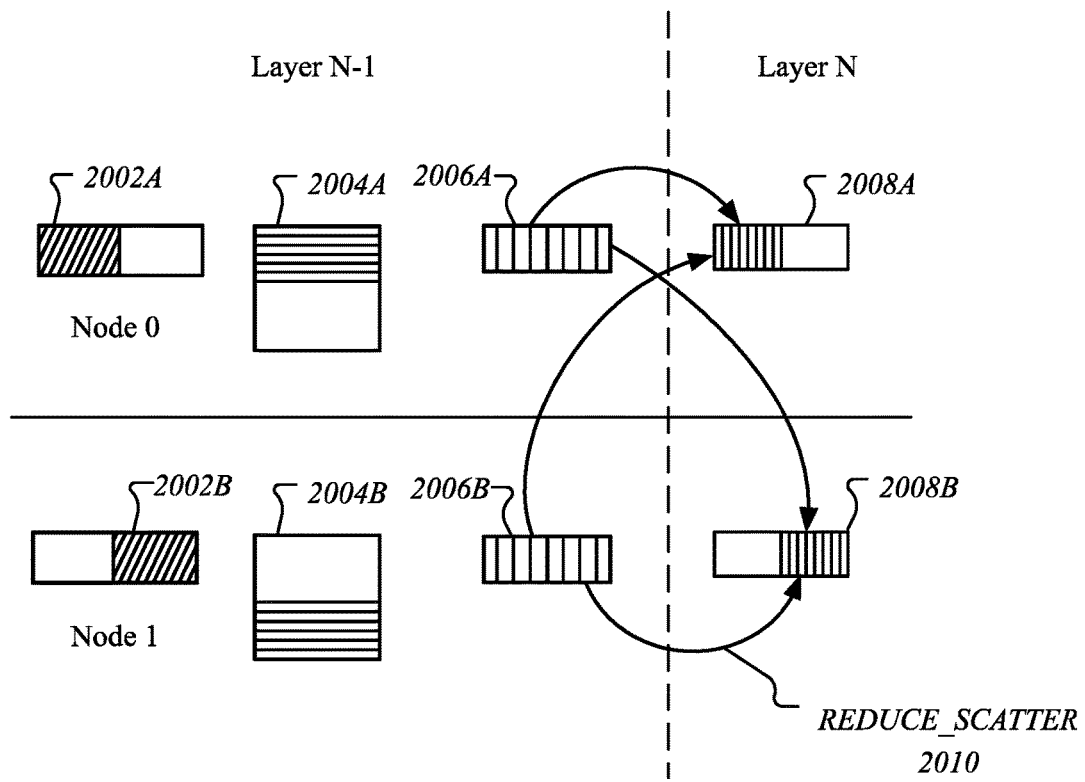
Figure 20E:
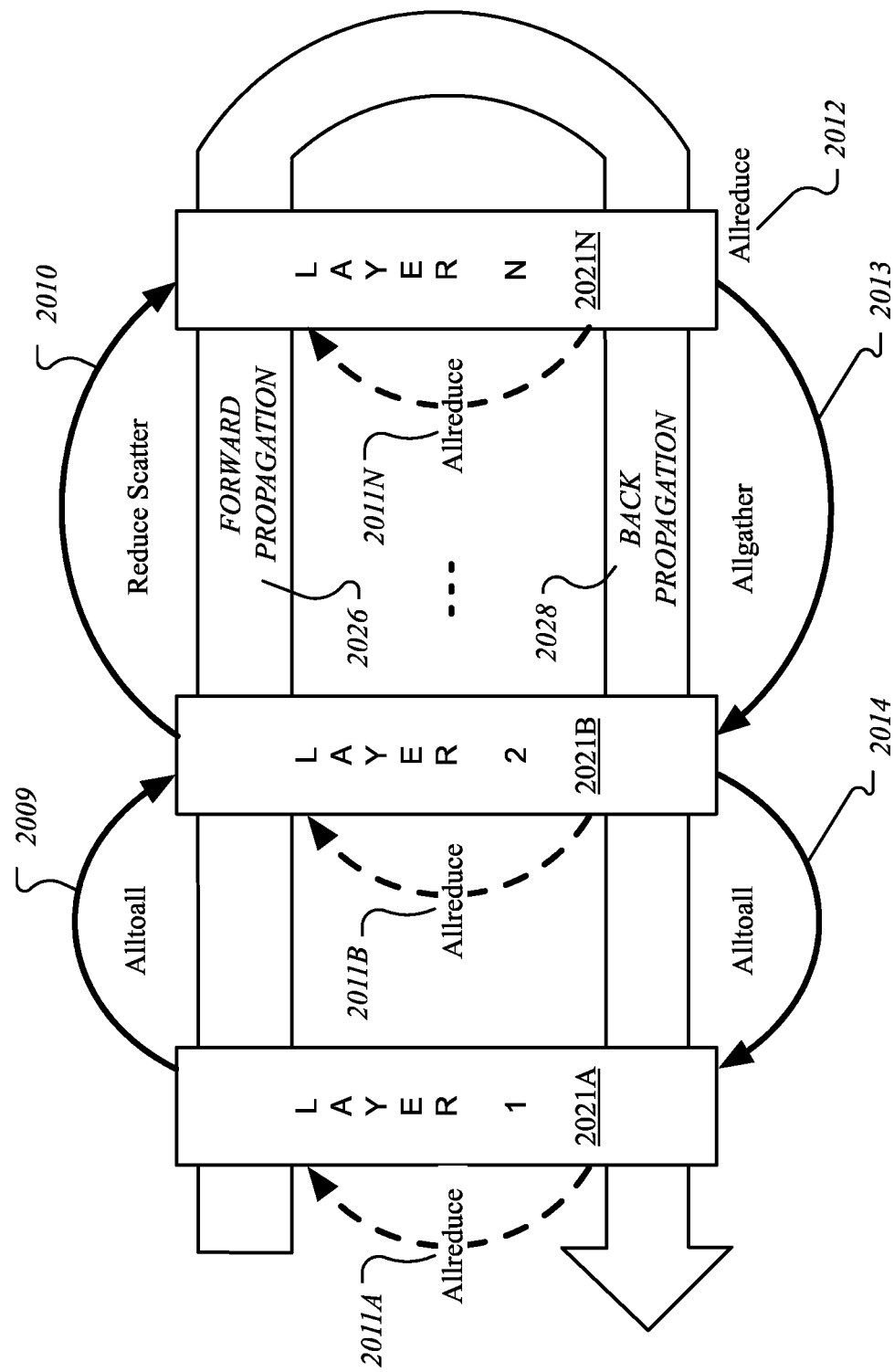

FIGS. 20A-20E illustrate communication patterns used during distributed machine learning compute operations performed across multiple compute nodes, according to embodiments described herein. FIG. 20A illustrates data transfer for machine learning computation using data parallelism. FIG. 20B illustrates data transfer for distributed machine learning computation using model parallelism. FIG. 20C illustrates partitioning of machine learning computation across multiple nodes using hybrid parallelism. FIG. 20D illustrates distributed machine learning computation using hybrid parallelism across multiple nodes and across multiple layers. FIG. 20E illustrates a set of exemplary messaging patterns operations that may be used for distributed machine learning. In each of FIG. 20A-20E, input data 2002 is processed by a machine learning model having a set of weights 2004 to generate a set of activations 2008 or partial activations 2006.

As shown in FIG. 20A, data parallelism can be implemented in which input data 2002 is split along a mini-batch dimension and the same model is replicated across the nodes. The mini-batch is split across several compute nodes, with each node responsible for computing gradients with respect to all model parameters using a subset of the samples in the mini-batch. Forward propagation is performed independently on each node. In one embodiment only one communication is performed during the backward pass to calculate an average for the gradients with respect to learnable parameters. An allreduce operation 2005 is used to update the weights of each layer for the next forward pass. In one embodiment, distributed weight update can be enabled in which a reduce_scatter is used calculate an average for gradients before stochastic gradient descent is performed and an allgather operation is used after stochastic gradient descent to synchronize weights across nodes.

As shown in FIG. 20B, model parallelism can be implemented in which the model or set of weights is split across multiple nodes. Generally, model parallelism performs different portions of a model's computation are performed simultaneous on different nodes for the same batch of examples. For model parallelism, the input data is also split (e.g., along the channel dimension), as shown in FIG. 20B. Using the illustrated approach, a reduce operation is performed to sum up the activations to obtain the actual output and then scatter the activations for use in computing activations for the next layer. A reduce_scatter 2007 operation can be performed to transfer the data in a single communication operation. In the backward pass an allgather operation is performed to combine strips of gradients computed on each node.

As shown in FIG. 20C, hybrid parallelism can be performed in which a partitioning is performed across activations and weights to minimize skewed matrices. For a layer of a neural network, the input data 2002, weight data 2004, and/or activation data 2006 is partitioned and distributed across multiple compute nodes (e.g., Node 0-Node 3). Node 0 receives a first block of input data 2002A and weight data 2004A. Compute operations are performed at Node 0 to generate a first partial activation 2006A. Likewise, Node 1 receives a second block of input data 2002B and weight data 2004B. Compute operations are performed at Node 1 to generate a second partial activation 2006B. Node 2 can perform compute operations on third input data 2002C and weight data 2004C to generate a third partial activation 2006C. Node 3 can perform compute operations on fourth input data 2002D and weight data 2004D to generate a fourth partial activation 2006D.

FIG. 20D illustrates the transfer of partial activation data 2006A-2006B for a given layer of a neural network (Layer N-1) to a successive layer of the neural network (Layer N). Via multiple nodes (Node 0, Node 1), a set of partial activations 2006A-2006B is generated by based on the application of a mathematical operation (e.g., convolution) to the input data 2002A-2002B and weight data 2004A-2004B. For example, in one embodiment a reduce_scatter operation 2010 is used which performs a reduce operation on the partial activations 2006A-2006B of layer N-1 from the multiple nodes and scatters the result to the multiple nodes as activations for use in Layer N of the neural network.

FIG. 20E illustrates the exemplary communication operations used to transfer data for distributed training of a neural network for machine learning operations. The low-level messaging libraries are used to enable data transfers for weight and activation data during distributed training of a neural network. An exemplary neural network having N layers 2021A, 2021B, 2021N (e.g., Layer 1, Layer 2, through Layer N) can be trained in a distributed manner by performing successive forward compute operations on the successive layers to enable forward propagation 2026 of activation data through the neural network. During forward propagation 2026, an Alltoall 2009 communication operation is used to transfer activation data from a first layer 2021A to a successive layer 2021B, for example, where the first layer and the successive layer are hidden layers or non-output layers. The Alltoall 2009 operation transfers distinct data from the compute nodes that generate the activation or partial activation data to all available receivers, which use the activation data as input data for operations on successive layers. When transferring data final layers (e.g., layer N), the reduce scatter operation 2010 is performed, which is described with respect to FIG. 20B. During back propagation 2028, distributed stochastic gradient descent is performed to generate updated weight data. An initial Allreduce operation 2012 is performed for Layer N and a set of Allreduce operations 2011A, 2011B, 2011N are performed to update the weights of each layer for the next forward pass. The Allreduce operations are reduce operations for which the results are broadcast or transferred to the receive buffers of all processes in the communication group. The back propagation 2028 can also include Allgather 2013 and Alltoall 2014 communication operations. For the Allgather operation 2013 data is gathered from all tasks and the combined data is distributed to all tasks. For the Alltoall operation 2014 data from all processes is transferred to all processes.

The data transfers required to perform distributed compute operations for machine learning can be implemented using any low-level messaging library, such as MPI, gRPC, or zeroMQ. However, implementing the exemplary communication operations may be difficult without domain level expertise of multiprocessor communications libraries. Furthermore, scaling these operations to a very large number of nodes can be difficult. Without domain specific knowledge of distributed computing techniques, implementing a scalable communication system for machine learning that can handle communication between hundreds or thousands of nodes may significantly extend development time for machine learning applications.

Embodiments described herein provide various techniques to abstract the distributed communication system detail for a deep learning application. In one embodiment, a machine learning scaling library (MLSL) is provided that enables deep learning application developers to develop distributed deep learning applications without requiring knowledge of the specific communication details required to enable multi-node deep learning. An application developer for a deep learning application can specify, using deep learning domain specific terminology, the type of distributed compute system that is used by an application and library techniques provided by embodiments described herein can implement the specific underlying communication methods required to enable the requested distributed compute system.

Figure 21A:
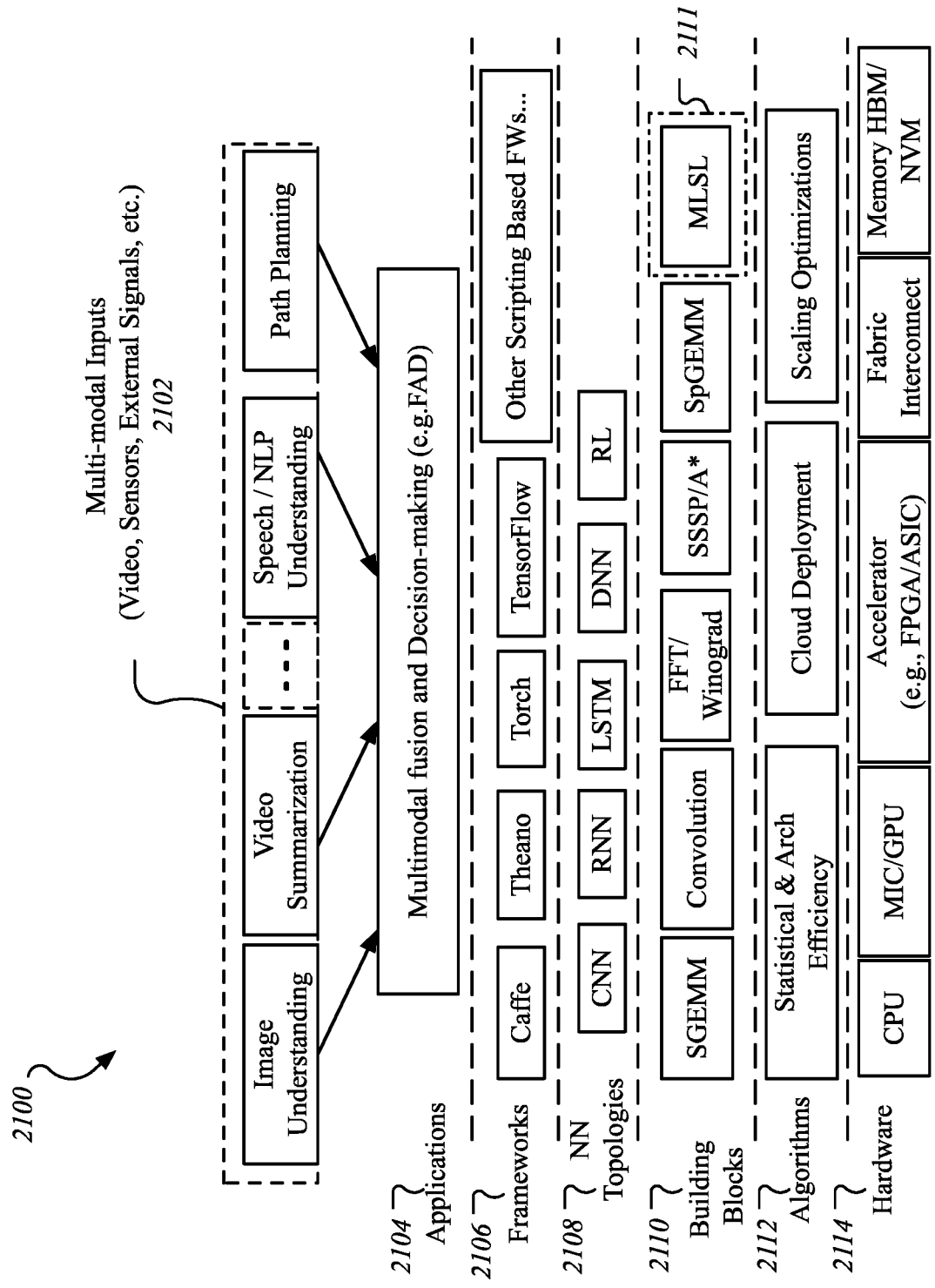
FIG. 21A-21B illustrate architectural details of the machine learning scaling library provided by embodiments described herein.
Figure 21B:
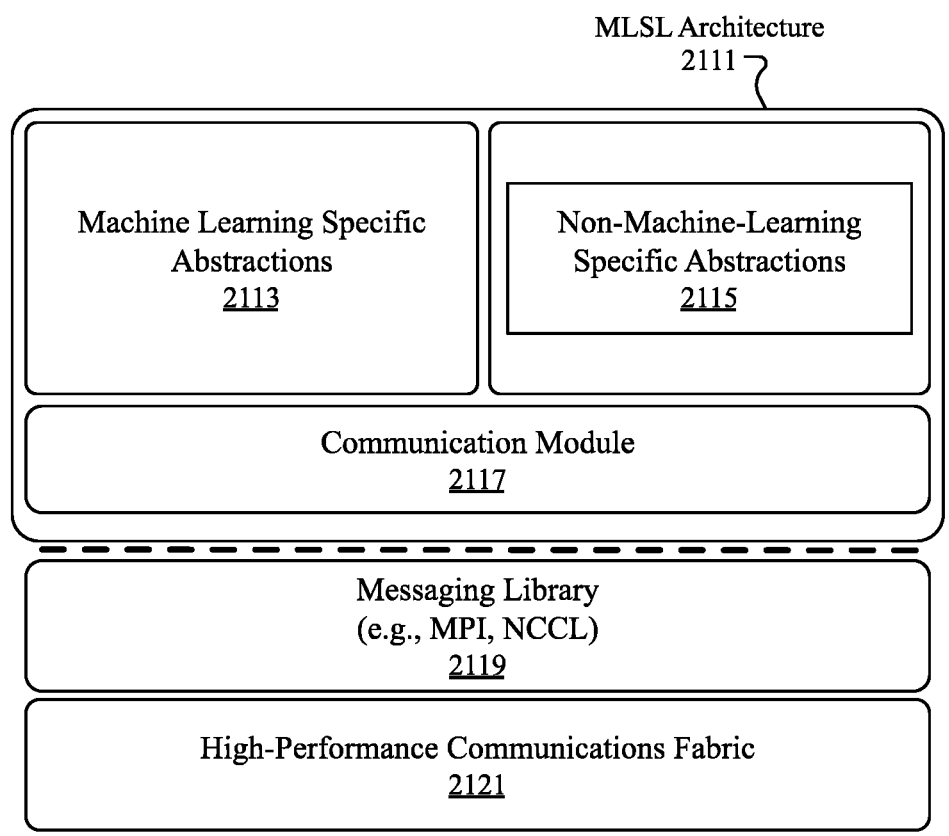

FIG. 21A-21B illustrate architectural details of the machine learning scaling library provided by embodiments described herein. FIG. 21A illustrates an exemplary machine learning architecture stack 2100. FIG. 21B illustrates details of the MLSL architecture 2111.

FIG. 21A illustrates an exemplary machine learning architecture stack 2100, which may be a variant of the machine learning software stack 1500 of FIG. 15. The machine learning architecture stack 2100 includes multiple software and hardware layers that range from input data 2102 provided by an array of sensors to hardware 2114 elements that perform various compute, storage, or communication operations. Each layer of the exemplary machine learning architecture stack 2100 may be an opaque abstraction layer that hides implementation details from higher layers, while using functionality provided by lower layers to implement the functions required by the higher layers.

Input data 2102 is provided to a layer of applications 2104. In one embodiment, the input data 2102 is multi-modal input including but not limited to video and/or image data, data from multiple sensors, and external signal data. The applications 2104 include multi-modal fusion and decision-making applications that can process the input to enable machine learning tasks such as image understanding, video summarization, speech and natural language processing, path planning, navigation, or any other machine learning implementation described herein. The applications 2104 communicate with one or more machine learning frameworks 2106, such as but not limited to Caffe, Theano, Torch, TensorFlow, or any other scripting based machine learning framework, to implement machine learning specific operations. The machine learning frameworks 2106 can enable machine learning operations to be performed using one of any number of neural network topologies 2108, including but not limited to a CNN, RNN, LSTM, Generic Deep Neural Networks, and Reinforcement Learning Networks. Machine learning frameworks 2106 implement the neural network topologies 2108 via one or more building blocks 2110. Exemplary building blocks 2110 include the single precision floating general matrix multiply (SGEMM) block, convolution building blocks, Fast Fourier transform/Winograd blocks, single-source shortest-path (SSSP) computation blocks, sparse matrix-matrix multiplication (SpGEMM) blocks, and the machine learning scaling library (MLSL) 2111 provided by embodiments described herein. The building blocks 2110 can each implement multiple algorithms 2112 to enable the compute operations requested by the machine learning frameworks 2106 to implement the neural network topologies 2108. The algorithms 2112 include optimizations to enhance statistical and architectural efficiency, enable cloud deployment, and enable scaling to a large number of nodes. In one embodiment the MLSL 2111 includes algorithms 2112 to enable scaling of machine learning operations to a large number of nodes. In one embodiment the building blocks 2110 can be implemented via software libraries that may be accelerated by one or more elements of the hardware 2114. In one embodiment at least a portion of the building blocks 2110 may be implemented within hardware 2114. For example, FPGA or ASIC based accelerators can include custom logic to enable portions of the MLSL 2111 or one or more GEMM libraries.

Various components of the hardware 2114 can be used to implement functionality of higher layers of the machine learning architecture stack 2100. Components of the hardware 2114 include, but are not limited to a CPU or another general-purpose processor tasked with performing computational and/or operating system related computations. The hardware 2114 also includes a many integrated core (MIC) or general-purpose GPU based parallel processing system. In some embodiments the hardware 2114 includes FPGA or ASIC based deep learning accelerators. A fabric interconnect component of the hardware 2114 is used to enable high-speed communication between the various components and high-bandwidth volatile or non-volatile memory. The volatile memory technologies can include any of the graphics memory technologies described herein, including HBM and GDDR memory. The non-volatile memory technologies can include flash memory, including 3D NAND flash, or other memory technologies such as 3D Xpoint memory.

FIG. 21B illustrates details of the MLSL architecture 2111, according to embodiments. The MLSL architecture 2111 includes an abstraction layer having machine-learning-specific abstractions 2113 as well as non-machine-learning specific abstractions 2115. The abstractions interface with a communication module 2117 that drives an underlying messaging library 2119. The messaging library 2119 uses optimized low-level communication routines to transmit data over a high-performance communications fabric 2121.

The MLSL architecture 2111 enables developers of machine learning software to develop scalable machine learning applications using machine learning specific abstractions 2113. In one embodiment, the machine learning specific abstractions 2113 enable an application developer to use machine learning domain specific knowledge to drive scalable performance for compute operations for neural network layers. The machine learning specific abstractions 2113 enable applications to be developed in a manner that is transparent to the underlying architecture, enabling machine learning applications to automatically adapt to any number of the hardware 2114 elements, including multiple types of compute and fabric elements. In addition to the machine learning specific abstractions 2113, a set of non-machine-learning specific abstractions 2115 can also be provided by the MLSL architecture 2111. The non-machine-learning specific abstractions 2115 enable a developer of a machine learning application to define, at a higher level of abstraction, one or more non-machine-learning details of the application, such as one or more implementation specific details or operating system details that are unrelated to machine learning.

In one embodiment, the machine learning specific abstractions 2113 enable neural network layer appropriate support for multiple types of parallelism (e.g., data, machine, hybrid). The machine learning specific abstractions 2113 also enable Layer-to-Layer communication abstractions to allow developers to easily implement communication patterns for different layer types and parallelisms. The different layer types and parallelism are defined using machine learning specific terminology using the machine learning specific abstractions 2113 and communication for those layer types are enabled via the communication module 2117, the messaging library 2119, and the high-performance communications fabric 2121. The machine learning specific abstractions 2113 also enable intelligent message scheduling across the defined neural network layers, while abstracting the data layouts and transformations required to implement machine learning techniques at the application level.

In one embodiment, the communication module 2117 includes logic to drive the underlying messaging library 2119. The communication module 2117 includes various optimizations to enable the network to be driven efficiently while transmitting machine learning data between the various compute nodes used to perform distributed machine learning. The communication module 2117 includes logic to optimize network bandwidth and to enable the low latency communications. The machine learning specific abstractions 2113 and/or the non-machine-learning specific abstractions 2115 can specify or prove interfaces to enable the application developer to specify the processor resources tasked with managing distributed communication. In one embodiment specific processors can be specified. In one embodiment, the number of processor associated with communication are specified. In one embodiment, a mix between compute and communication resources can be specified. In one embodiment, the communication module 2117 includes logic to adaptively assign processor cores for use in driving and performing operations for the communication module 2117 and/or the messaging library 2119. In one embodiment the communication module 2117 can adaptively assign processing resources for communication without explicit direction from the machine learning specific abstractions 2113 or the non-machine-learning specific abstractions 2115. In one embodiment the communication module 2117 can adaptively adjust or assign processing resources to attempt to fully saturate available network resources to attempt to minimize the latency impact of communication within the distributed system. For example, should the communication module 2117 determine that the high-performance communication fabric 2121 is not fully saturated with data, additional processors or processor cores can be assigned to perform network tasks if overall throughput of the distributed compute system would be increased. In one embodiment the amount of compute resources assigned to drive the messaging library 2119 can vary based on the bandwidth of the high-performance communications fabric. For higher-bandwidth fabric, greater computational resources may be required to saturate the network. The high-performance communications fabric 2121 can be implemented via any number of high-speed network connection technologies, including but not limited to Ethernet, InfiniBand, Omni-Path Interconnect, or via a mesh of point to point interconnects, such as NVLink.

In one embodiment the communication module 2117 includes logic to ensure forward progress of distributed compute operations by enabling asynchronous communication between processing nodes. The asynchronous communication enabled by the communication module 2117 allows overlapping compute and communication operations that efficiently interleave to optimize both compute and communication efficiency and throughput. In one embodiment the communication module 2117 also supports prioritized communication channels to enable prioritized resolution of contending communication requests.

The messaging library 2119 uses optimized low-level communication routines to transmit data over a high-performance communications fabric 2121. The MLSL architecture 2111 is agnostic with respect to the underlying messaging library 2119 and high-performance communications fabric 2121. In one embodiment the messaging library is an MPI-based library. In such embodiment the communication patterns used by a machine learning application are implemented using MPI functions (e.g., MPI_Alltoall, MPI_Allreduce, MPI_Allgather, etc.). In some embodiments the gRPC or zeroMQ libraries and associated functions are used for messaging. In one embodiment, routines from the Nvidia collective communications library (NCCL) may also be used. NCCL provides communication routines such as all-gather, reduce, and broadcast to accelerate multi-GPU machine learning training across multiple GPGPUs and can enable multi-GPU and multi-GPU/multi-node communication.

Topology-Aware Algorithm for Flexible Node Grouping

DL neural networks may have large number of convolutional layers. Training such networks within a reasonable period of time may require the use of multi-node training. Multi-node training may experience bottlenecks in the form of communication latency. The large number of parallel processor nodes operating simultaneously can result in the performance of a large number of simultaneous communication operations. The large volume of communication can cause congestion in certain areas of the network.

Existing techniques for multi-node training include the use of purely distributed training in which all each node can interact directly with each other node on the network. Alternatively, one or more parameter servers can be used to distribute updated parameters to each node. The parameter server based approach allows topology flexibility, as the nodes are directly communicating with the parameter server instead of each other. Resiliency is also introduced by the use of the parameter server. If the parameter server were to fail, the system can easily instantiate a different node as a parameter server. The remaining nodes can then begin communicating with the new parameter server.

However, purely distributed training has advantages over a parameter server in that greater performance may be realized if the network topology is constructed with purely distributed training in mind. In other words, the types of network topologies that can be used is limited to those in which each node in the system can easily communicate with each and every other node within the system. Otherwise, bottlenecks in the network can form, reducing overall performance. For example, when performing an all-reduce operation with a group of nodes, the performance of the operation may become sensitive to latency spikes within the network.

Described herein is a communication system that makes use of a topology-aware algorithm for flexible node grouping. In one embodiment, a distributed training system can be constructed in a manner that is sensitive to the existing network topology of the worker nodes, such that local nodes can be assembled into compute groups based on network topology. Nodes within a compute group communicate with each other using operations such as all-reduce, while distant nodes are bridged via synchronization operations performed with a parameter server. In one embodiment, a communication framework associated with the distributed training network can makes use of a topology-aware algorithm to flexibly and transparently adjust node grouping based on the current set of communication operations to be performed. Depending on the type of communication operation being performed, different node groupings can be utilized. For example, when the communication framework that facilitates messaging between nodes (e.g., communication module 2117 as in FIG. 21B) determines that a series of latency sensitive communication operations are to be performed, the communication framework can adjust node grouping accordingly.

Figure 22:
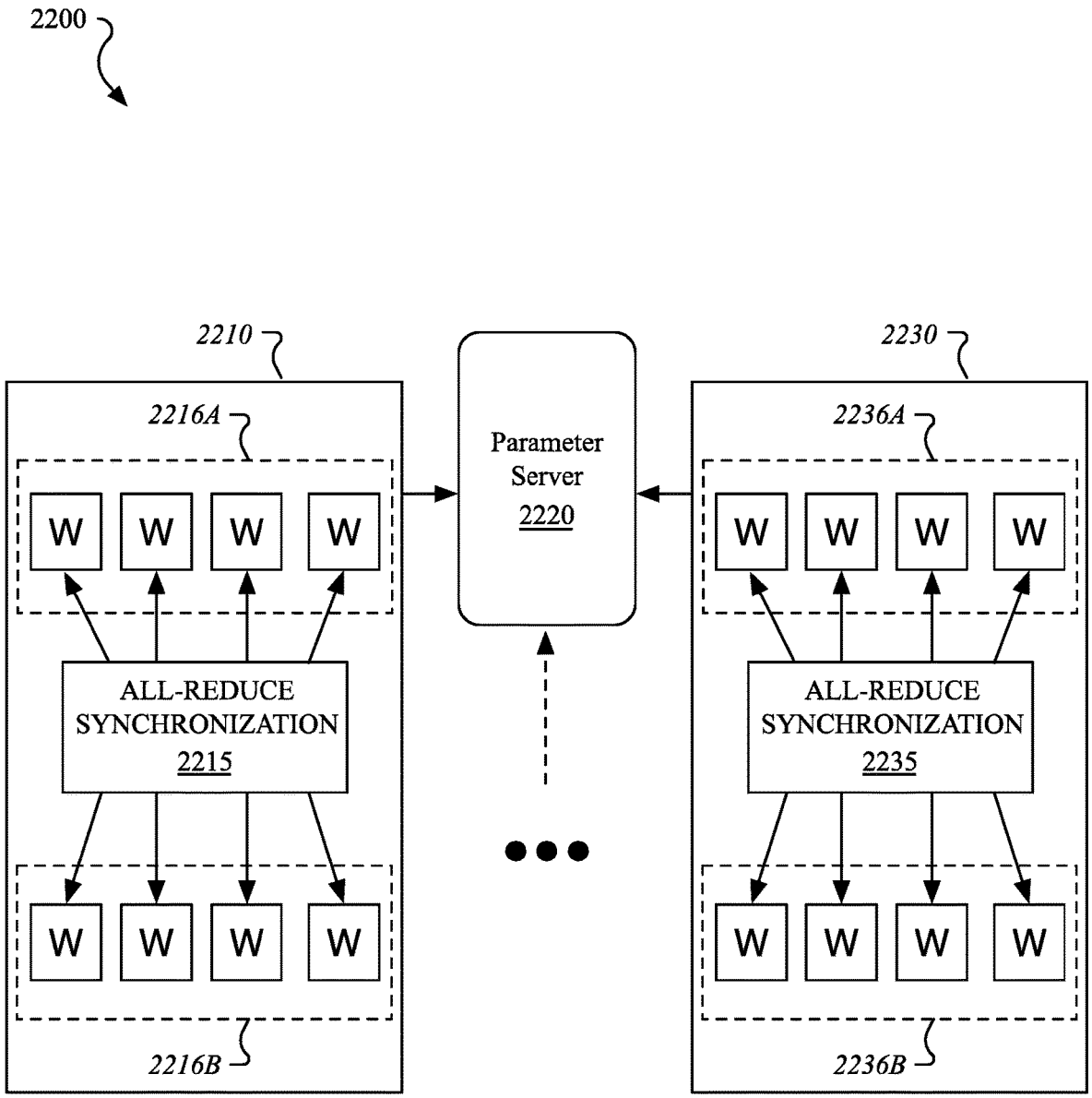
FIG. 22 illustrates a multi-node training network, according to an embodiment.

FIG. 22 illustrates a multi-node training network 2200, according to an embodiment. The multi-node training network 2200 can include multiple sets of worker nodes 2216A-2216B, 2236A-2236B. When a latency sensitive communication operation, such as an all-reduce operation, is to be performed on the multi-mode training network 2200, the communications framework can dynamically adjust node grouping based on network topology. In the illustrated multi-node training network 2200, the communication framework can determine the sets of worker nodes 2216A-2216B that experience relatively lower communication latency when exchanging data in comparison to the communication latency observed when communicating with other sets of workers nodes 2236A-2236B. To exchange model data parameters, such as gradient updates, between the worker nodes, the communications framework can establish multiple groups of worker nodes. For example, the communications framework can create a first group 2210 of worker nodes can include sets of worker nodes 2216A-2216B having low mutual latency. The communications framework can then create a second group 2230 of worker nodes can includes additional sets of worker nodes 2236A-2236B having low mutual latency. The specific number of groups that are created can vary based on the topology of the network. One or more parameter servers 2220 can then be instantiated. The parameter servers can then be configured to enable efficient inter-group communication between the various groups 2210, 2230.

Figure 23:
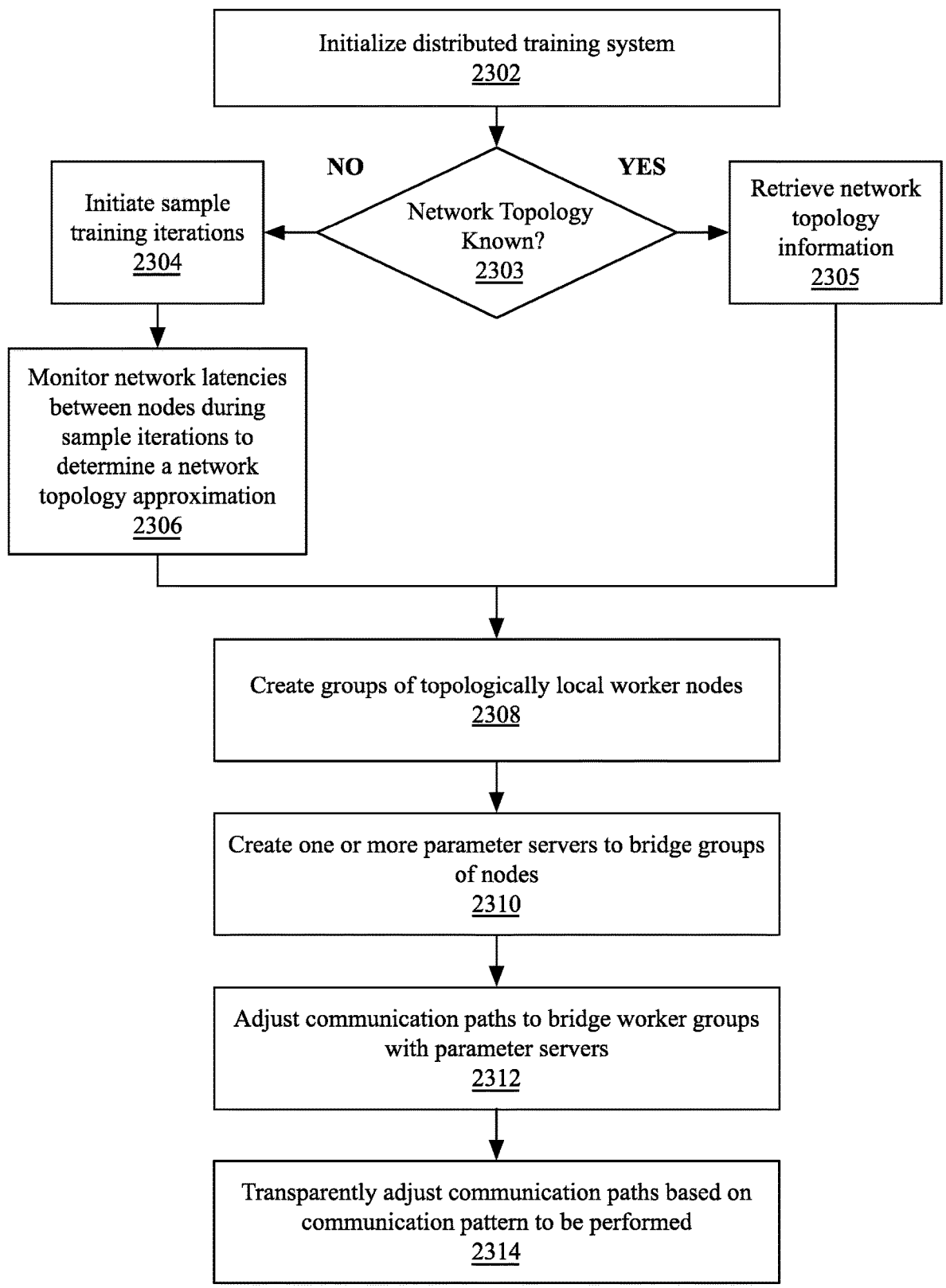
FIG. 23 illustrates a process to enable a topology-aware algorithm for flexible node grouping, according to an embodiment.

FIG. 23 illustrates a process 2300 to enable a topology-aware algorithm for flexible node grouping, according to an embodiment. The process 2300 can be performed by a communication framework as described herein, such as but not limited to the communication module 2117 as in FIG. 21B. In one embodiment, the process 2300 includes to initialize a distributed training system, as shown at block 2302. The process 2300 additionally includes an operation, as shown at block 2303, to determine if the current network topology that interlinks the nodes is known. If the network topology is known, a communication framework, or another logic element configured to perform the process, 2300, can retrieve network topology information, as shown at block 2305. The network topology information can be retrieved, in one embodiment, from a network topology unit 2808 as in FIG. 28 below. If the current network topology is not known, as determined at block 2303, an operation can be performed to initiate a set of sample training iterations, as shown at block 2304. During the sample training iterations, the communication logic can monitor the network latencies between nodes to determine a network topology approximation, as shown at block 2306.

The process 2300 additionally includes to create groups of topologically local worker nodes, as shown at block 2308. For example, a communications framework can create groups at block 2308 based on the network topology retrieved at block 2305, or the approximated network topology determined at block 2306. Where the network topology is known, the local worker nodes are grouped under the assumption that topologically local worker nodes experience relatively lower communication latency, although in one embodiment, objectively latency measurements can be performed to verify such assumption even when the network topology is known at network initialization time.

The process 2300 additionally includes to create one or more parameter servers to bridge groups of nodes, as shown at block 2310. The one or more parameter servers can be created by repurposing one or more worker nodes and reinitializing the repurposed nodes as parameter servers. The process 2300 additionally includes to adjust the communication paths to bridge worker node groups with parameter servers, as shown at block 2312. In one embodiment, the process 2300 additionally includes to transparently adjust communication paths between the worker nodes based on the communication pattern to be performed, as shown at block 2314.

Optimizing Intra-Chassis and Inter-Chassis Communication

Some embodiments described herein provide systems and methods to enable quality of service (QoS) for intra-chassis and inter-chassis communication between GPUs within a distributed training cluster. One embodiment provides for standardized platform QoS counters that grant software visibility into hardware level performance details. Exposing such QoS counters enables the software to make better decisions regarding the communication of data within a chassis relative to communication between chassis. A higher share of existing bandwidth can be dedicated to higher priority applications or latency sensitive applications. Less latency sensitive applications can be throttled or adjusted during period of resource contention. In one embodiment, based on platform QoS counter data, a communication module of machine learning framework can adjust bandwidth allocation between applications at a scheduler, granting higher scheduler priority to higher-priority applications. In one embodiment, processor cache QoS functionality can be leveraged to manage communication latency for inter-chassis and intra-chassis communication, such that data associated with high priority applications can be prioritized within CPU, GPU, and fabric processor caches. To prioritize data within the CPU, GPU, and fabric processor caches can include to flag the data in the cache and to lower the probability of eviction for flagged data.

Figures 24A, 24B:
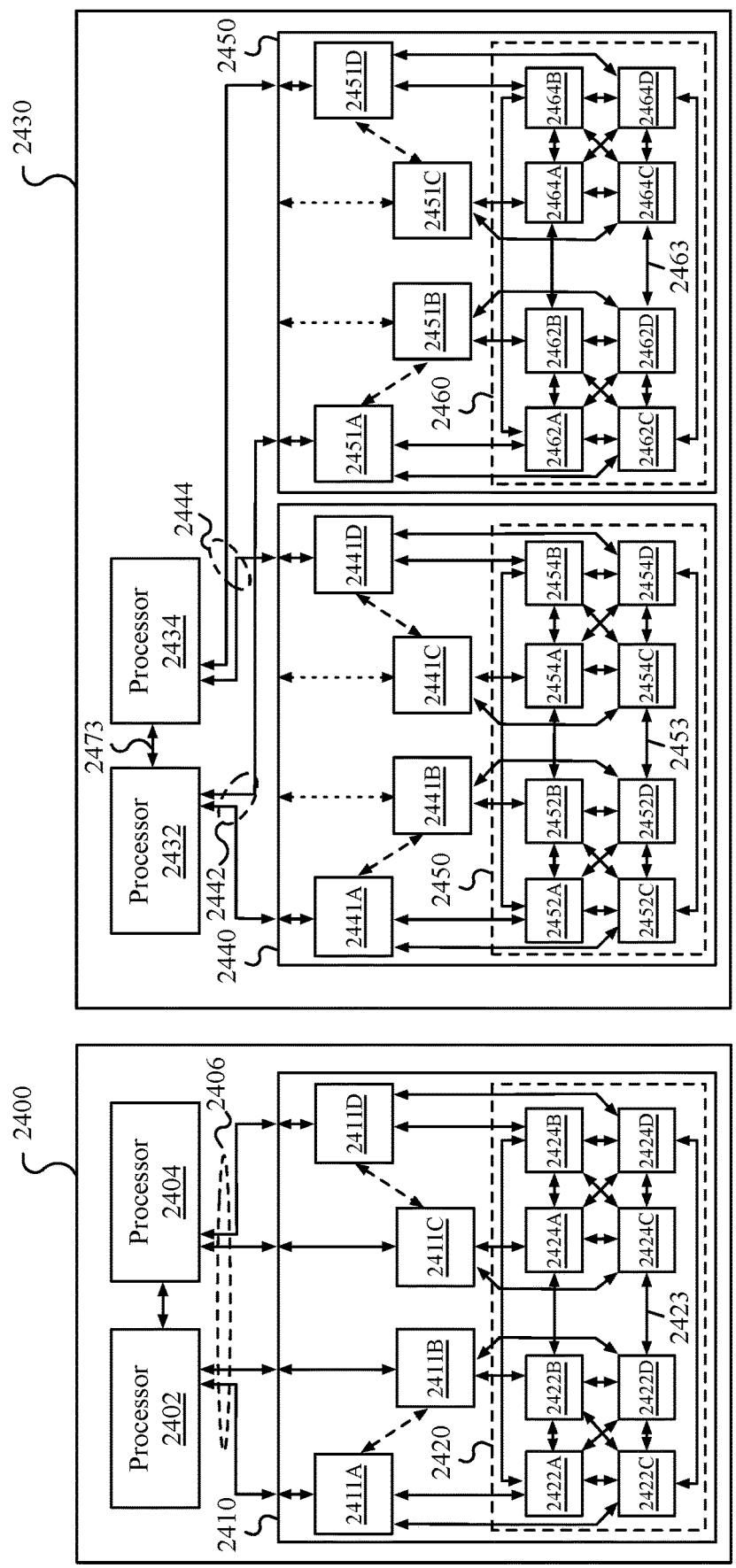
FIG. 24A-24B illustrate processing systems, according to embodiments described herein.

FIG. 24A-24B illustrate processing systems 2400, 2430, according to embodiments described herein. FIG. 24A illustrates processing system 2400 that performs inter-node communication. FIG. 24B illustrates processing system 2430 that performs inter-node and intra-node communication.

As shown in FIG. 24A, processing system 2400 includes two or more processors 2402, 2404, which in one embodiment are general-purpose multi-core processors, such as application processors or central processing units (CPUs). The processors 2402, 2404 couple with a parallel processor compute system 2410, which includes a parallel compute cluster 2420 and a set of platform interface switches 2411A-2411D. The platform interface switches 2411A-2411D enable the parallel compute cluster 2420 to interconnect with the processors 2402, 2402, which can be linked to the parallel processor compute system 2410 via a platform interconnect bus 2406. In one embodiment, the platform interconnect bus 2406 and the platform interface switches 2411A-2411D each support a version of the peripheral component interconnect express (PCIe) bus standard, including but not limited to PCIe 3.0, 3.1, 4.0, 5.0, etc.

In some embodiments the parallel compute cluster 2420 includes multiple general-purpose graphics processors (GPGPUs) 2422A-2422D, 2424A-2424D. In other embodiments, the parallel compute cluster 2420 can also include other types of parallel processors, such as MIC processors, FPGAs, or custom ASIC processors. In one embodiment, where the parallel compute cluster 2420 includes GPGPUs 2422A-2422D, 2424A-2424D, the GPUs of the parallel compute cluster 2420 can be interconnected via point to point interconnect links (e.g., 2423), such as but not limited to the Nvidia high speed signaling technology (NVHS) (e.g., NVLink). The point to point interconnect links can include multiple sets of differentials pairs, where multiple differential pairs can be combined to form a link. In one embodiment, performance metrics for data transmitted over each point to point link can be monitored and reported to the processors 2402, 2404, along with communication metrics for data transmitted over the platform interface switches 2411A-2411D. Performance metrics for transmitted data can include metrics for data transaction over each point to point link and for data transactions performed via the platform interface switches 2411A-2411D. In one embodiment, the performance metrics include raw throughput, effective throughput considering overhead, instantaneous latency, and average latency.

As shown in FIG. 24B, processing system 2430 includes two or more processors 2432, 2434, which can be similar to processors 2402, 2404 as in FIG. 24A. Processing system 2430 also includes two parallel processor compute systems 2440, 2460, which each can be similar to the parallel processor compute system 2410 as in FIG. 24A, with each parallel processor compute system 2440, 2460 including one or more platform interconnect busses 2442, 2444 to couple the parallel processor compute systems 2440, 2460 with the processor 2432, 2434. Parallel processor compute system 2440 includes a set of platform interface switches 2441A-2441D. Parallel processor compute system 2460 includes a set of platform interface switches 2461A-2461D. Platform interface switches 2441A-2441D couple processors 2432, 2434 with parallel compute cluster 2450. Platform interface switches 2461A-2461D couple processors 2432, 2434 with parallel compute cluster 2470. Parallel compute cluster 2450, in one embodiment, includes GPGPU 2452A-2452D and GPGPU 2454A-2454D. Parallel compute cluster 2470 includes GPGPU 2472A-2472B and GPGPU 2472A-2474D. GPGPU 2452A-2452D and GPGPU 2454A-2454D can communicate via point to point interconnects, such as point to point interconnect 2453. GPGPU 2472A-2472D and 2474A-2474D can communicate via point to point interconnects, such as point to point interconnect 2473. The GPGPUs can record data communication metrics and transmit such metrics to the processors 2432, 2434. Metrics for data transmission via the platform interface switches 2441A-2441D and 2461A-2461D can also be reported to the processor 2432, 2434. Such metrics can be used to manage QoS of intra-chassis and inter-chassis communication, to manage the bandwidth associated with communication within each chassis and between the various chassis (e.g., between parallel processor compute system 2440 and parallel processor compute system 2460), over the one or more platform interconnect busses 2442, 2444.

Figure 25:
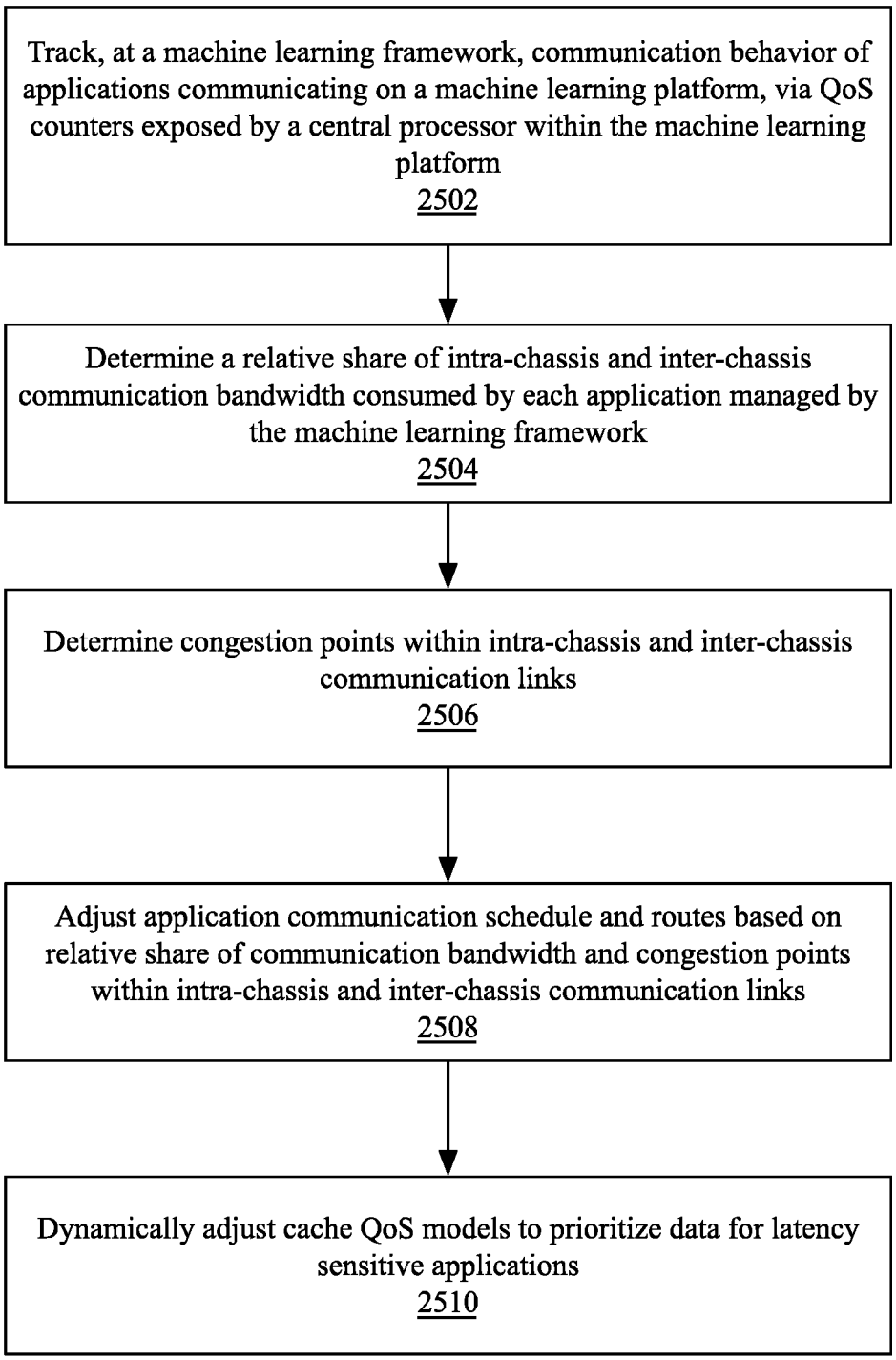
FIG. 25 illustrates a process to manage communication QoS between and within parallel processor compute nodes, according to an embodiment.

FIG. 25 illustrates a process 2500 to manage communication QoS between and within parallel processor compute nodes, according to an embodiment. The process 2500 can be performed by platform QoS logic that is configured to manage inter-process and intra-process communication between GPUs and CPUs, such as in processing system 2400 as in FIG. 24A and processing system 2430 as in FIG. 24B.

In one embodiment, the process 2500 includes to track, at a machine learning framework as described herein, a communication behavior of applications communicating on a machine learning platform, via QoS counters exposed by a central processor within the machine learning platform, as shown at block 2502.

The process 2500 can determine a relative share of intra-chassis and inter-chassis communication bandwidth consumed by each application managed by the machine learning framework, as shown at block 2504. The relative share of intra-chassis and inter-chassis communication can be determined via the monitoring of platform QoS counters exposed by the various processors within the system. The QoS counter data can be aggregated at one or more control processors of the system, which can adjust bandwidth allocation or scheduling priority for communication tasks associated with various applications executing on the system based on the priority associated with the application or the sensitivity of the application to latency. For example, when communication links between a parallel processor compute system and a processor, or between the parallel processor compute system and a parallel processor compute system in a different chassis, are congested, the communication library that managed data transmission within the system can prioritize intra-chassis communication within a data transmission period over inter-chassis communication. Alternatively, when inter-chassis communication techniques are congested, intra-chassis communication can be prioritized.

In one embodiment, the process 2500 additionally includes to determine congestion points within intra-chassis and inter-chassis communication links as described herein, as shown at block 2506. Congestion points can manifest when the data communication demand exceeds the available throughput for a given link. For example, the communication links used for inter-chassis communication may be lower bandwidth links relative to those used for intra-chassis communication depending on the protocols used in a given system implementation. The process 2500 can then adjust an application communication schedule and routes based on a relative share of communication bandwidth and congestion points within intra-chassis and inter-chassis communication links, as shown at block 2508. Adjusting an application communication schedule can include, for example, delaying scheduling of a set of inter-chassis messages during a period of inter-chassis congestion and scheduling transmission of intra-chassis messages instead. Adjusting the application communication schedule can also include delaying a set of intra-chassis messages during a period of intra-chassis congestion and scheduling inter-chassis messages instead. However, in the case of intra-chassis congestion, the adjustment can also include adjusting a route by which the intra-chassis message will be relayed. In one embodiment, adjustments can additionally include to dynamically adjust cache QoS models to prioritize data for latency sensitive applications, as shown at block 2510.

Figure 26:
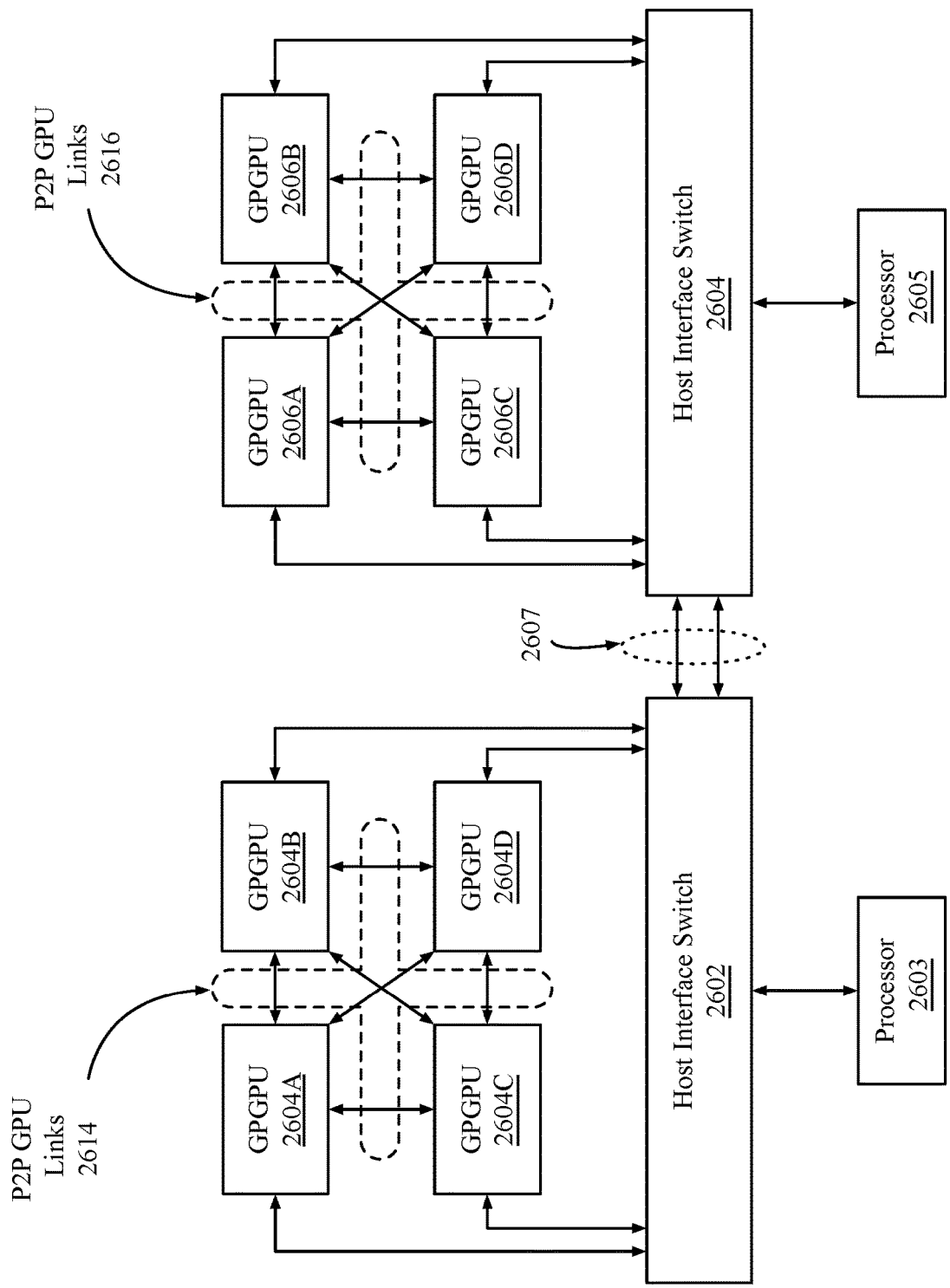
FIG. 26 illustrates an additional multi-chassis computing system, according to an embodiment.

FIG. 26 illustrates an additional multi-chassis computing system 2600, according to an embodiment. Each chassis of the multi-node compute system 2600 is similar to a chassis within, for example, processing system 2430 as in FIG. 24B. General purpose graphics processing units (GPGPUs) conduct intra-chassis and inter-chassis communication. For example, GPGPU 2604A-2604D each interconnect via a set of point to point GPU links 2614. GPGPU 2606A-2606D each interconnect via point to point GPU links 2616. GPGPU 2604A-2604D can each communicate with processor 2603 via a host interface switch 2602. GPGPU 2606A-2606D can communicate with processor 2605 via host interface switch 2604. GPGPU 2604A-2604D and 2606A-2606C may not be directly interconnected via point to point GPU links, but can communicate, in one embodiment, via an interconnect 2607 between host interface switch 2602 and host interface switch 2604, which may each be, for example, PCIe switches.

In one embodiment, the data throughput provided by host interface switch 2602 and host interface switch 2604, as well as the throughput over interconnect 2607, can be a lower bandwidth interconnect relative to point to point GPU links 2614 and point to point GPU links 2616. Such interconnects may be used under circumstances in which processor 2603 and processor 2605 do not include support for point to point GPU links 2614 and point to point GPU links 2616. In an alternate embodiment, inter-chassis communication can be accelerated via an enhanced host interface switch that enables a point to point GPU link, such as, but not limited to NVLink, to be implemented within a host interface switch as described herein. For example, in one embodiment, host interface switch 2602 and host interface switch 2604 can be implemented as NVLink switches, which can be used to interconnect GPUs within different chassis. In one embodiment, processor 2603 and processor 2605 can reside in a different chassis than the GPGPU 2604A-2604D or GPGPU 2606A-2606D. Host interface switch 2602 and host interface switch 2604 can facilitate inter-chassis interconnect between a processor chassis and a GPGPU chassis.

Figure 27:
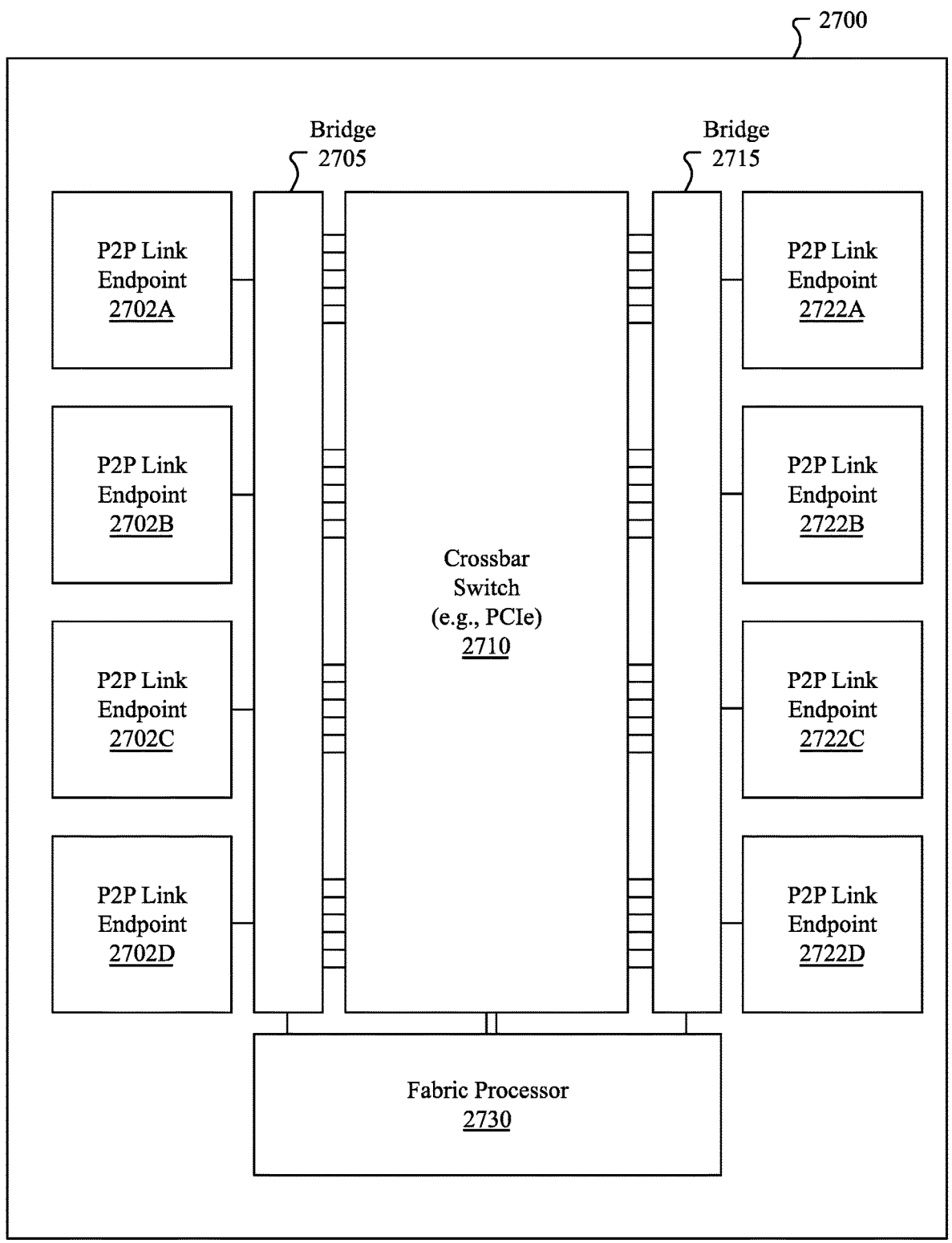
FIG. 27 illustrates a host interface switch, according to an embodiment

FIG. 27 illustrates a host interface switch 2700, according to an embodiment. In one embodiment, the host interface switch 2700 can be used to enabled a switched point to point interconnect for use in connecting multi-chassis GPU clusters. The illustrated host interface switch 2700 is exemplary of one embodiment, and is not limiting as to all embodiments. In one embodiment, the host interface switch 2700 can be used as host interface switch 2602 or host interface switch 2604 as in FIG. 26. For example, the illustrated host interface switch 2700 implements a switch for a point to point interconnect such as NVLink via the use of multiple NVLink to PCIe bridges 2705, 2515 and a high-bandwidth, low latency crossbar switch 2710, such as a PCIe crossbar switch implementing a PCIe 4.0 or PCIe 5.0 interconnect. A set of point to point link endpoints 2702A-2702D can couple with a bridge circuit 2705, which can electrically or logically bridge the point to point link with the crossbar switch 2710. In one embodiment, the data can be routed over the crossbar switch 2710 to a second connected bridge circuit 2715, which can electrically or logically bridge the protocol of the crossbar switch 2710 with the protocol of point to point link endpoints 2772A-2772D. Where the point to point endpoints 2702A-2702D, 2722A-2722D use NVHS technology, the endpoint signaling is configured as non-return-to-zero. In one embodiment, bridge 2705 and bridge 2715 are configured to convert the non-return to zero signaling of the point to point link endpoints to and from the differential signaling used by the crossbar switch 2710.

In one embodiment, the number of links used to bridge point to point endpoints 2702A-2702D and point to point endpoints 2722A-2722D with the crossbar switch 2710 can vary based on the protocol implemented at the crossbar switch 2710. For example, to avoid bridging bottlenecks, bridge 2705 and bridge 2715 can use a variable ratio of point to point links relative PCIe links when connecting to the crossbar switch 2710. For example a PCIe 4.0 interconnect can have a 16 GT/s (giga-transfers per second) transfer rate per lane, while an NVLink 2.0 interconnect can have a 25 GT/s transfer rate per lane. Accordingly, a more than one PCIe 4.0 lanes can be used for each NVLink lane within the NVLink to PCIe bridges 2705, 2515 to ensure the bridges to not present a transmission bottleneck. A fabric processor 2730 is also present. In one embodiment, the fabric processor 2730 couples with and configures each bridge 2705, 2715 and the crossbar switch 2710 according to power and performance requirements specified by the system.

Hardware Support for Persistent Deep Learning Communication

In current frameworks for machine learning, even when the communication graph between nodes is a static graph, the communication frameworks still perform communication between nodes as though the system uses a dynamic graph, increasing the overhead of communication tasks between nodes. For example, when communication operations are performed across multiple nodes, memory and network device resources are allocated, used, and deallocated for each operation. In some systems, bandwidth allocation for communication operations may be performed for each transaction. The efficiency of network communication operations may be increased of the network communication framework can be configured to assume a static node graph, allowing certain allocations can be made persistent.

One embodiment described herein enables persistent communication channels for networked inter-node communication for distributed machine learning. When a distributed machine learning training system is configured, the communication pattern between the nodes is specified in advance, enabling a list of communication operations and associated nodes is specified. The list of communication operations will be repeated throughout the distributed training process as forward and back propagation calculations are performed and gradients are distributed across nodes. Instead of paying the runtime costs associated with performing a communication operation over a network or communications fabric each time an operation is performed, a persistent machine learning communication graph can be requested. The persistent machine learning communications graph can enable allocation of runtime network resources to be performed as a one-time cost. The resource allocations are persisted for the duration of the distributed training session. When the distributed training session completes, the allocated resources can be deallocated.

Implementing such embodiments includes modifications to hardware and software within a fabric or network communication stack. For example, the software of a machine learning communications framework can indicate to the communication hardware the specific set of operations that should be made persistent, as it may not be desirable to make all operations persistent. For example, it may not be desirable for certain setup, check pointing, and error-correction operations to be made persistent. Additionally, it may be advantageous for some weight gradient or activation transfer functions to remain non-persistent. Thus, the communications framework and communications hardware can be modified to include support for the establishment of persistent communication sessions between specific nodes on the network and, for the duration of such sessions, a list of operations for which resource allocations should be performed in a persistent manner.

Figure 28A:
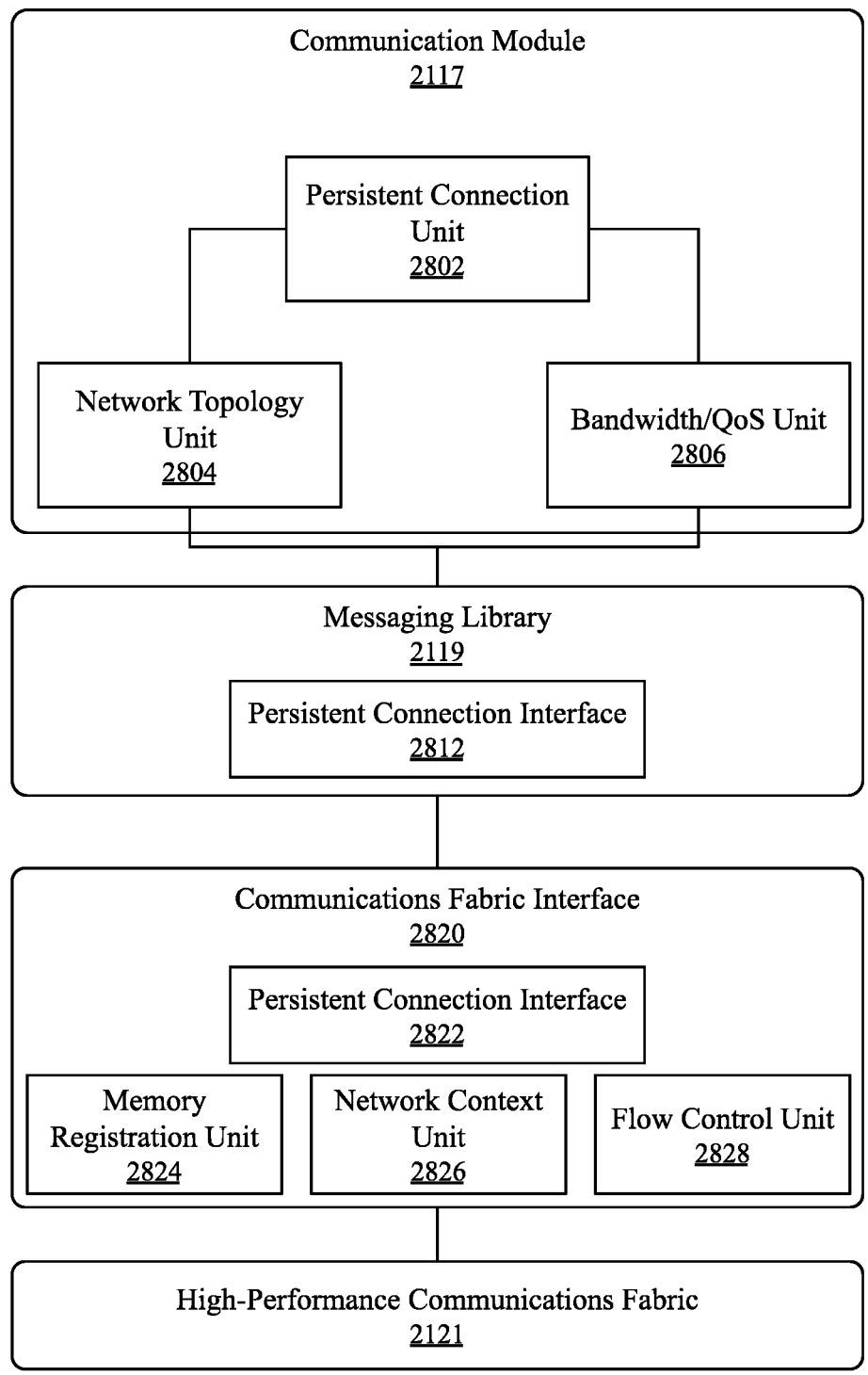
FIG. 28A-28C illustrates a system to enable persistent deep learning communication.
Figure 28B:
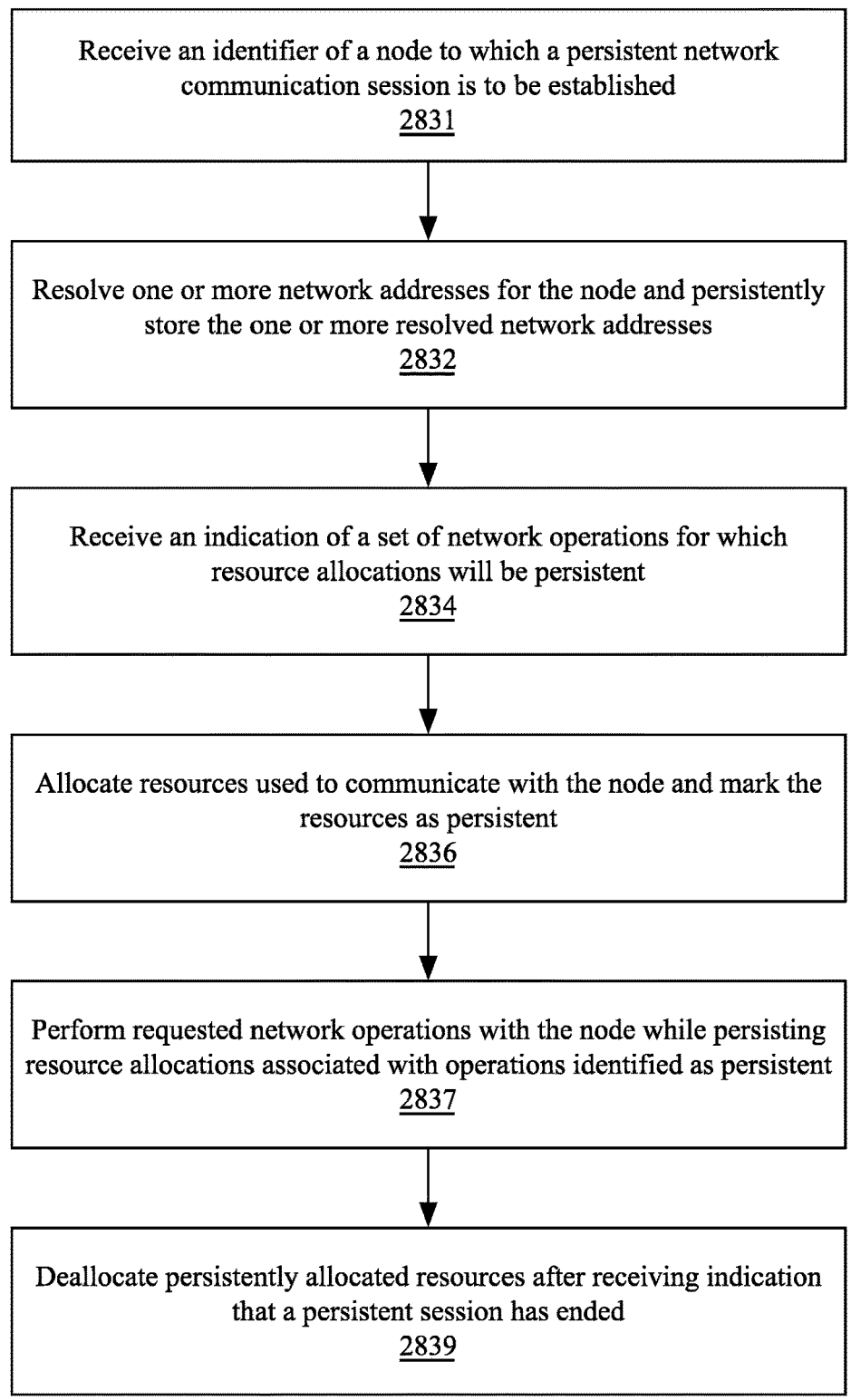
Figure 28C:
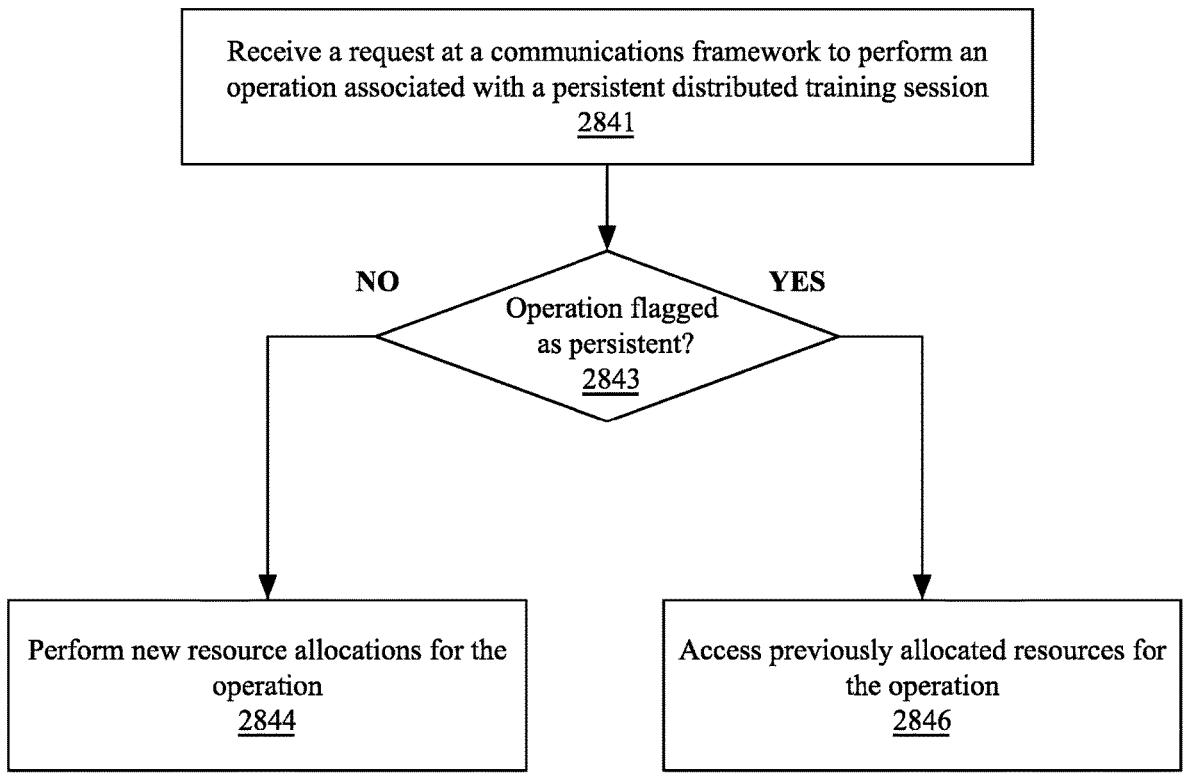

FIG. 28A-28C illustrates a system to enable persistent deep learning communication. FIG. 28A illustrates a persistent communication stack 2800, according to an embodiment. FIG. 28B illustrates operations of persistent deep learning communication logic 2830, according to an embodiment. FIG. 28C illustrates operations of resource management logic 2840 of a persistent deep learning communication system, according to an embodiment.

The persistent communication stack 2800 of FIG. 28A can be part of a machine learning scaling architecture as illustrated in FIG. 21A-21B. For example, in one embodiment communication module 2117 includes a persistent connection unit 2802, a network topology unit 2804, and a bandwidth/QoS unit 2806, which each can configure interactions of the communication module 2117 with the messaging library 2119 and the high-performance communication fabric 2121 as described herein.

In one embodiment, the persistent connection unit 2802 can setup communication buffers and a communication schedule once at the start of a network communication session and re-use communication contexts, instead of setting up and tearing down network connections repeatedly during distributed training. The persistent connection unit 2802 can interact with the network topology unit 2804 to associate a network topology with a given communication pattern. The network nodes associated with a distributed training operation can be identified, enumerated, and provided to the persistent connection unit 2802. The persistent connection unit 2802 can communicate with a persistent connection interface 2812 in the messaging library 2119. The persistent connection interface 2812 provides a mechanism by which resources of the messaging library 2119 can be indicated as persistent for a given communication session. When session resources are indicated to be persistent, data, contexts, and configurations created for messaging relay during a distributed training session will be allocated and maintained in a persistent manner, with resource allocations performed and maintained until the persistent session is indicated to be complete.

A communications fabric interface 2820 includes software and hardware elements that are used enable communication over the high-performance communications fabric 2121. In one embodiment, the communications fabric interface 2820 includes a persistent connection interface 2822, a memory registration unit 2824, a network context unit 2826, and a flow control unit 2828. The communications fabric interface 2820 can additionally include other components associated with fabric interfaces known in the art, such as control processors, memory, forwarding ASICs, and the like. The persistent connection interface 2822, in response to messages and/or commands received via the messaging library, can configure hardware and software resources associated with the high-performance communication fabric 2121 to be allocated in a persistent manner, such that resources that would be cyclically allocated and deallocated will be maintained for the duration of the communication session.

The specific resources and contexts that are made persistent can vary based on the type of communications fabric interface 2820. In one embodiment, the memory registration unit 2824 can persistently register memory for use in message transmission and receipt. Memory registration incudes pinning virtual memory addresses associated with memory buffers containing data to transfer or to contain received data. In one embodiment, memory registration includes performing physical address translation for virtual memory addresses associated with memory buffers. In one embodiment, the memory registration unit 2824 can store a record of persistently allocated memory buffers. In one embodiment, metadata for allocated buffers can indicate a given buffer is persistently allocated. De-allocation of those buffers can be bypassed and, during a subsequent network transfer within a session, previously allocated buffers can be re-used.

In one embodiment, the network context unit 2826 can persistently allocate network context information for use in message transmission and receipt over the high-performance communications fabric. For example, deallocation for persistently allocated context memory that is used to process data associated with a transmission protocol can be bypassed. Where memory would otherwise be re-allocated, previously allocated memory can be re-used. In one embodiment, the flow control unit 2828 can manage the rate of data transmission and receipt via the high-performance communications fabric 2121. In general, the network layers of the high-performance communication fabric 2121 make use of flow control to prevent buffer overflows at the receiver. In one embodiment, a credit-based flow control system is used to track the available slots within receive buffers. Credits can be sent back to a sender for received data when the received data is pulled from receive buffers. As the set of senders and receivers within a session are known beforehand, flow control data structures can be established as a one-time cost before the bulk of data transmission begins across nodes within a distributed training cluster.

As shown in FIG. 28B, persistent deep learning communication logic 2830 can configure the communication software and hardware to persist memory allocations, network context, and hardware context information for a network communication session performed during distributed training of a neural network. The logic 2830 can be implemented by a communication module 2117, messaging library 2119, and/or communications fabric interface 2820 as in FIG. 28A.

In one embodiment, the logic 2830 can receive an identifier of a node to which a persistent network communication session is to be established, as shown at block 2831. A persistent session can be established with one or more nodes, and a set of identifiers can be received that specifies each node associated with the persistent communication session. The logic 2830 can then resolve one or more network addresses for the node and persistently store the one or more resolved network addresses, as shown at block 2832. At block 2834, the logic 2830 can receive an indication of a set of network operations for which resource allocations will be persistent. It may not be desirable to make all operations persistent, as it may be optimal for some setup and error checking operations to be non-persistent. The logic 2830 can allocate resources used to communicate with the node and mark the resources as persistent, as shown at block 2836. The resources can be marked as persistent by storing identifiers for the resources in a data structure, or metadata for the resources can indicate that the resource is to be persistently allocated. As shown at block 2837, the logic 2830 can perform requested network operations with the identified node or nodes while persisting resource allocations associated with operations identified as persistent. At block 2837, the logic 2830 can deallocate persistently allocated resources after receiving indication that a persistent session has ended.

As shown in FIG. 28C, operations of resource management logic 2840 of a persistent deep learning communication system can include to receive a request at a communications framework to perform an operation associated with a persistent distributed training session, as shown at block 2841. If, as determined at block 2843, the operation is flagged as persistent, the logic 2840 can access previously allocated resources for the operation. If, as determined at block 2843, the operation is not flagged as persistent, the logic 2840 can perform new resource allocations for the operation, as shown at block 2844. In some embodiments, rather than being flagged as persistent, the operation can be listed in a data structure or database of operations that are to be persistent for a communication session.

Server-Less Accelerator Pooling for Inference

A significant challenge presented during machine learning inferencing is latency. While compute throughput is critical for machine learning training, inferencing operations have lower compute requirements, but are extremely latency sensitive, with the optimal timeframe to execute an inference generally measured in milliseconds. The latency sensitivity of inferencing operations results from the real-time nature of more inferencing deployments. Inferencing requests are performed continuously, for example, by autonomous driving and navigation systems, as well as by computer vision or remote sensing systems associated with autonomous driving and navigation systems. Additionally, digital assistant programs may be configured to perform machine learning inferencing in response to a user request. When inferencing is performed as part of an interactive user experience, any latency exhibited by the system may negatively impact user experience.

Large scale, user facing inferencing can be implemented as a cloud-based datacenter-based solution. When performing a machine learning operation in a datacenter, data can be collected and pooled from a large number of clients (e.g., consumer devices) and transmitted to a datacenter CPU server or CPU cluster. The data is transformed or modified into a format acceptable by a deployed machine learning framework or data model, and then processed on parallel processing clusters, such as a cluster of GPGPUs. In implementations in which GPU-to-GPU fabric performance exceeds that of GPU to host fabric performance, the CPU server/cluster can introduce a latency bottleneck into datacenter inferencing systems.

Some embodiments described herein enable server-less accelerator pooling for inferencing operations. In one embodiment, a pool of inferencing accelerators, which can be GPGPU accelerators, FPGA accelerators, custom ASICs, or another type of inferencing accelerator, can be coupled to a high-bandwidth and low latency switch fabric. The accelerator pools can be "server-less" pools, in that a primary CPU server and associated operating system is not present. Instead, a set of programmable network interfaces, low-power processors, and/or programmable fabric interfaces can be pre-configured by a fabric attached CPU server. Once the network, fabric interfaces, or low power processor system on an accelerator pool is configured, the CPU server can be removed from the critical path, with inferencing requests being directly received at and processed by the accelerator pool. In one embodiment, the accelerator pools can be virtualized, enabling device-level access as virtual devices within virtual server solutions implemented within a datacenter.

Figure 29A:
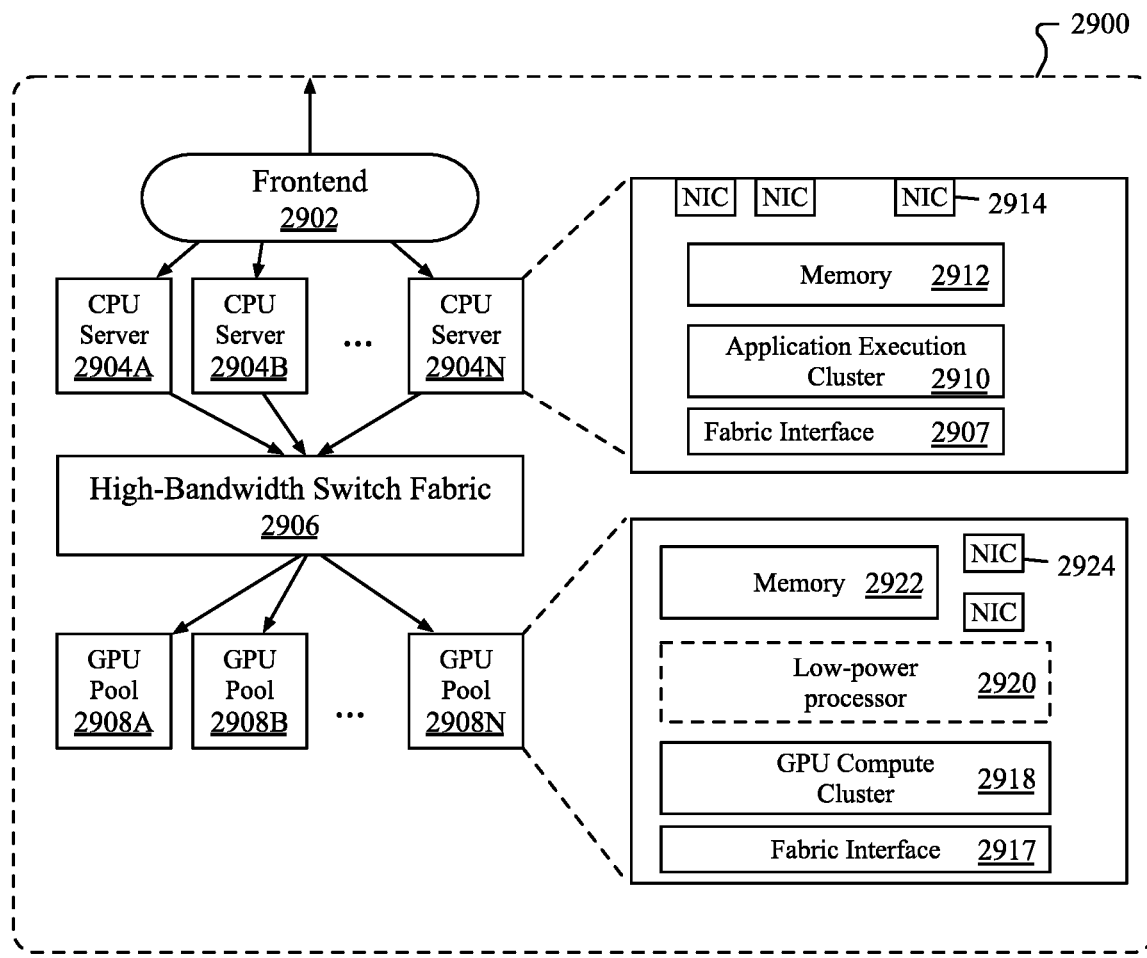
FIG. 29A-29C illustrate hardware and an associated software process to enable server-less accelerator pooling for inference, according to embodiments described herein.
Figure 29B:
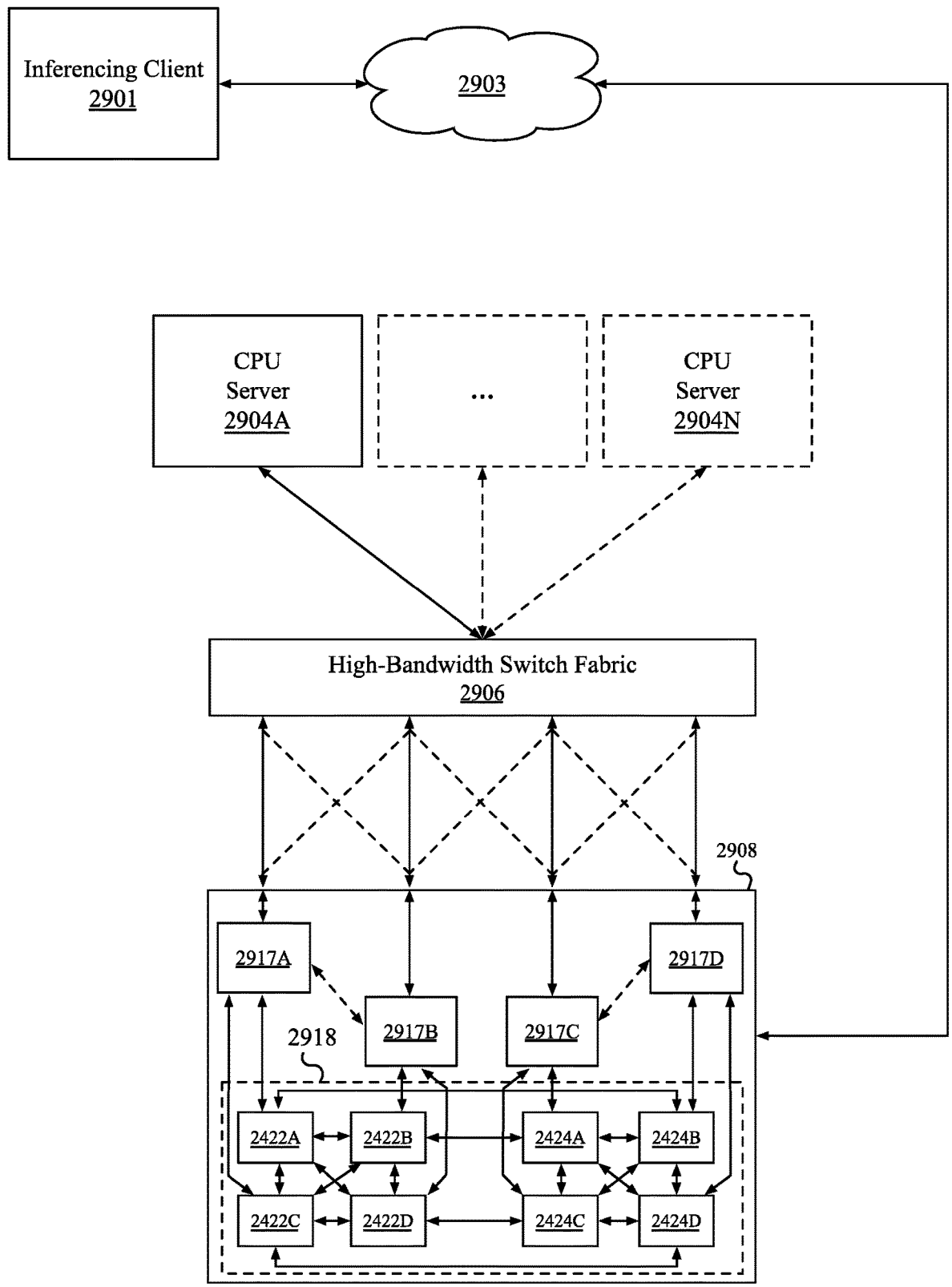
Figure 29C:
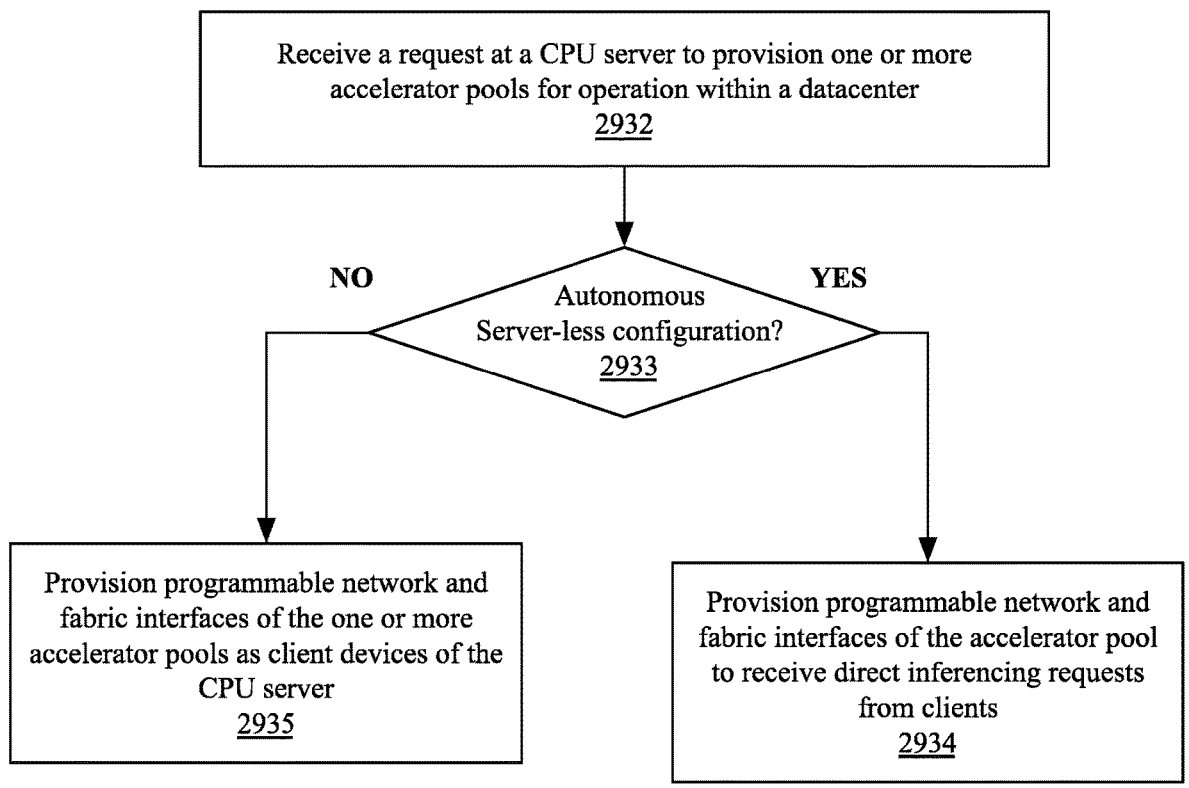

FIG. 29A-29C illustrate hardware and an associated software process to enable server-less accelerator pooling for inference, according to embodiments described herein. FIG. 29A illustrates a datacenter 2900 including server-less accelerator pools, according to an embodiment. FIG. 29B illustrates an example of CPU server and accelerator pool system, according to an embodiment. FIG. 29C illustrates a process 2930 for configuring server-less accelerator pools for inferencing, according to an embodiment.

As shown in FIG. 29A, a datacenter 2900 can include a frontend 2902 through which processing requests are received. The frontend 2902 can interface with a set of CPU servers 2904A-2904N. Each CPU server, for example, CPU server 2904N, includes a set of network interface controllers (e.g., NIC 2914), memory 2912, an application execution cluster 2910, and a fabric interface 2807. The network interface controllers, including NIC 2914, can be used to connect the CPU servers 2904A-2904B to the frontend 2902. In various embodiments, various types of network interface controllers can be used, including, but not limited to Ethernet, InfiniBand, Omni-Path Interconnect, or other high-speed networking protocols. The memory 2912 is high speed volatile or non-volatile random-access memory and can be any type of system memory described herein. The application execution cluster 2910 includes one or more multi-core server processors configured to execute applications, including virtual machines. The application execution cluster can execute machine learning applications that can leverage one or more pools of inferencing accelerators (e.g., GPU pool 2908A-2908N), or can configure the pools of inferencing accelerators to respond directly to requests received via the frontend 2902. The fabric interface 2907 in the CPU servers 2904A-2904N can enable the application execution cluster 2910 to connect with the high-bandwidth switch fabric 2906. The high-bandwidth switch fabric 2906 can be any high-speed interconnect described herein, such as but not limited to PCIe or NVHS/NVLink.

In one embodiment, the pool of inferencing accelerators are GPU accelerators within GPU pools 2908A-2908N. Each GPU pool can include, for example, as in GPU pool 2908N, memory 2922, one or more network interfaces (e.g., NIC 2924), one or more optional low-power processor 2920, a GPU compute cluster 2918, and a fabric interface 2917. The memory 2922 can be, in various embodiments, volatile or non-volatile system memory similar to memory 2912, or can be a pool of graphics memory, such as graphics DDR memory (e.g., GDDR5, GDDR5X, GDDR6, etc.). The network interface controllers (e.g., NIC 2924) can be network interface controllers known in the art, as with, for example, NIC 2914. In one embodiment, the network interface controllers of the GPU pools 2908A-2908N include additional programmable or processing elements to facilitate server-less operation of the GPU pool 2908A-2908N. For example, one of CPU servers 2904A-2904N can configure a set of addresses and static routes for the duration of an inferencing session. An optional low-power processor 2920 may be present in one or more of the GPU pools 2908A-2908N to facilitate the movement of data between the memory 2922 and the fabric interface 2917. Alternatively, the fabric interface 2917 can include programmable resources and/or processing resources to perform operations that would otherwise be performed by a server processor, such as one of the processors of the application execution cluster 2910 of the CPU servers 2904A-2904N.

As shown in FIG. 29B, a GPU-based accelerator pool 2908 can be structured in a similar manner as processing system 2400 as in FIG. 24A, with the processors 2402, 2404 of FIG. 24A removed from the chassis. Instead, a GPU compute cluster 2918 can include multiple general-purpose graphics processors (GPGPUs) 2422A-2422D, 2424A-2424D, which can be interconnected via a mesh of point to point interconnects, such as NVHS/NVLink (e.g., NVLink, NVLink 2.0, etc.). The GPU cluster 2918 can be interconnected with the high-bandwidth switch fabric 2906 via fabric interfaces 2917A-2917D. One of the CPU servers (e.g., CPU server 2904A) can provision the fabric interfaces 2917A-2917D, which can be programmable interfaces having processor logic.

The specific nature of the interaction between the CPU servers 2904A-2904N and the GPU pool 2908 can vary across embodiments. In one embodiment, the GPU pool 2908 can be configured to couple the GPGPUs 2422A-2422D, 2424A-2424D as device clients of one of the CPU servers 2904A-2904N as though the GPGPUs were located within the chassis of the respective coupled CPU server. In one embodiment, a single CPU server (e.g., CPU server 2904A) can configure the GPU pool 2908 as a standalone compute processor that can directly receive inferencing requests via the high-bandwidth switch fabric 2904, or via a network interface controller (e.g., NIC 2924).

Once the CPU server 2904A configures the GPU pool 2908, the CPU server 2904A can be remove from the critical inferencing path. The GPU pool 2908 can then directly receive inferencing request for processing. For example, an inferencing client 2901, such as an autonomous vehicle, speech processing client, virtual assistant, etc., can send formatted data directly to the GPU pool 2908 for processing via a network 2903 (e.g., Internet), bypassing the CPU servers 2904A-2904N.

In one embodiment, to enable reduced latency for datacenter inferencing implementations, the GPU pool 2908 can be located at the edge of the datacenter, rather than at the datacenter core. In one embodiment, server-less GPU pools, having lower total cost of ownership and lower power requirements, can be placed closer to sources of inferencing requests than existing server/GPU pool deployments.

As shown in FIG. 29C a process 2930 for configuring server-less accelerator pools for inferencing can be implemented by a CPU server. Once an accelerator pool is configured, the CPU server can be removed from the inferencing critical path. Alternatively, a single CPU server can be coupled to multiple accelerator pools. While GPU pools are illustrated in FIG. 29A-29B, accelerator pools can be configured to use various types of machine learning optimized processing elements, including but not limited to GPGPUs, FPGAs, ASICs, or other types of computing elements that are optimized for machine learning compute.

In one embodiment, as shown at block 2932, the process 2930 includes for a CPU server to receive a request to provision one or more accelerator pools for operation within a datacenter. The CPU server can determine, at block 2933, whether the accelerator pool will have an autonomous server-less pool configuration. For an autonomous server-less pool configuration, the CPU server can provision programmable network and fabric interfaces of the accelerator pools to directly receive inferencing requests from clients, as shown at block 2934. To receive direct inferencing requests at the accelerator pool is to receive inferencing requests from client devices, bypassing the use of the CPU server and associated CPU server operating system. If a direct server-less configuration is not requested, the CPU server can provision the programmable network and fabric interfaces of the one or more accelerator pools as client devices of the CPU server, as shown at block 2935. In this configuration, multiple accelerator pools can be connected to a single CPU server via the high-bandwidth switch fabric. The multiple accelerator pools can then operate as accelerator clients of the CPU server, allowing a single CPU server to directly utilize a greater number of accelerators. The overhead associated with configuring the programmable network interfaces for specific workloads is amortized over long running workloads, as the accelerator pools are likely to remain in a provisioned configuration for a period of time. Such configuration enables a reduction in the number of CPU servers within a datacenter, with the reduced number of CPU servers potentially replaced by accelerator pools.

Handling Abrupt Hardware Failures on an Autonomous Self Driving Vehicle

In a distributed machine learning system, should a graphics processing unit within the system fail, an alternate emergency routing of neural network operations can be enabled. The communication framework that enables communication between compute nodes and GPUs within each compute node can be configured with alternate communication graphs. Should a CPU or GPU within the distributed training network fail, the compute operations of the neural network can be rebalanced across functional portions of the distributed training network, with the model or parameter data associated with the failed portion re-distributed to other nodes. However, it is critical that inferencing systems, including distributed inferencing systems, be capable of recovering from abrupt hardware failures, particularly when those failures occur within an autonomous self-driving vehicle (ASDV) during operation. Should a hardware failure occur within an ASDV inferencing system, particularly when a passenger is present, the system may be required to recover in a manner that preserves the safety of the vehicle passenger, while considering the safety of passengers in other nearby vehicles. Accordingly, multiple layers of hardware fail-safes may be required to enable the vehicle to, at the least, navigate to a safe location and come to a safe stop. In vehicles in which driver control is possible, the option is available for the system to signal to the driver to take control of the vehicle. In fully autonomous vehicles in which passenger control is possible, the machine learning system must be able to navigate to a safe stop.

Described herein is hardware and software to enable an emergency mode for an inferencing system to handle or recover from an abrupt software of hardware failure. In one embodiment, a cascaded failure recovery technique is enabled in which error recovery is attempted at the software level. If software efforts cannot return the inferencing system to at least partial functionality, hardware-based measures can be taken.

Figure 30A:
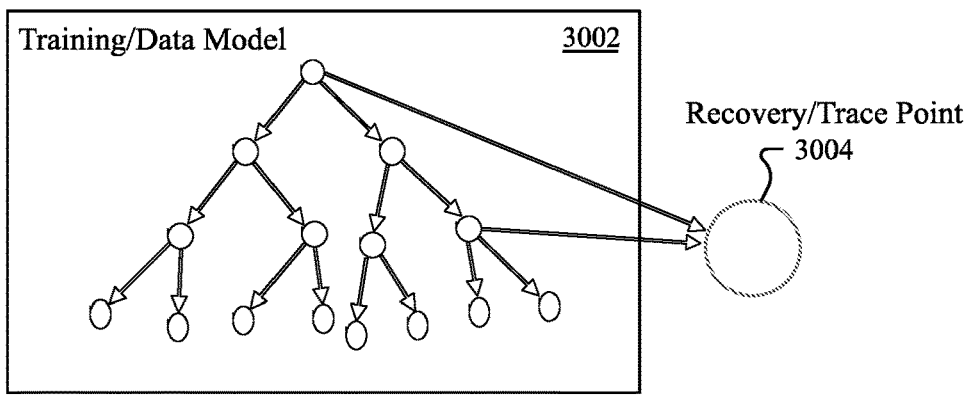
FIG. 30A shows generation of a recovery point for a training or data model, according to an embodiment.

If a software failure is detected, for example, corruption within the software stack, the system will attempt to rebuild the data model based on checkpoints that are captured to preserve the current operating state of the data models. This technique may be of particular use of any aspect of the current data model has been adjusted relative to a stored data model, for example, if any form of re-training of the neural network has been performed or is currently in progress. As shown in FIG. 30A, portions of the training or data model 3002 can be preserved as a recovery/trace point 3004 that can be used to rebuild the data model in the event of software or data corruption, for example, due to software faults or one-time hardware failure events. The recovery/trace point 3004 can be used to rebuild or recover data, for example, if processing operations are required to be migrated to a different processor or node within an inferencing or re-training compute system.

Figure 30B:
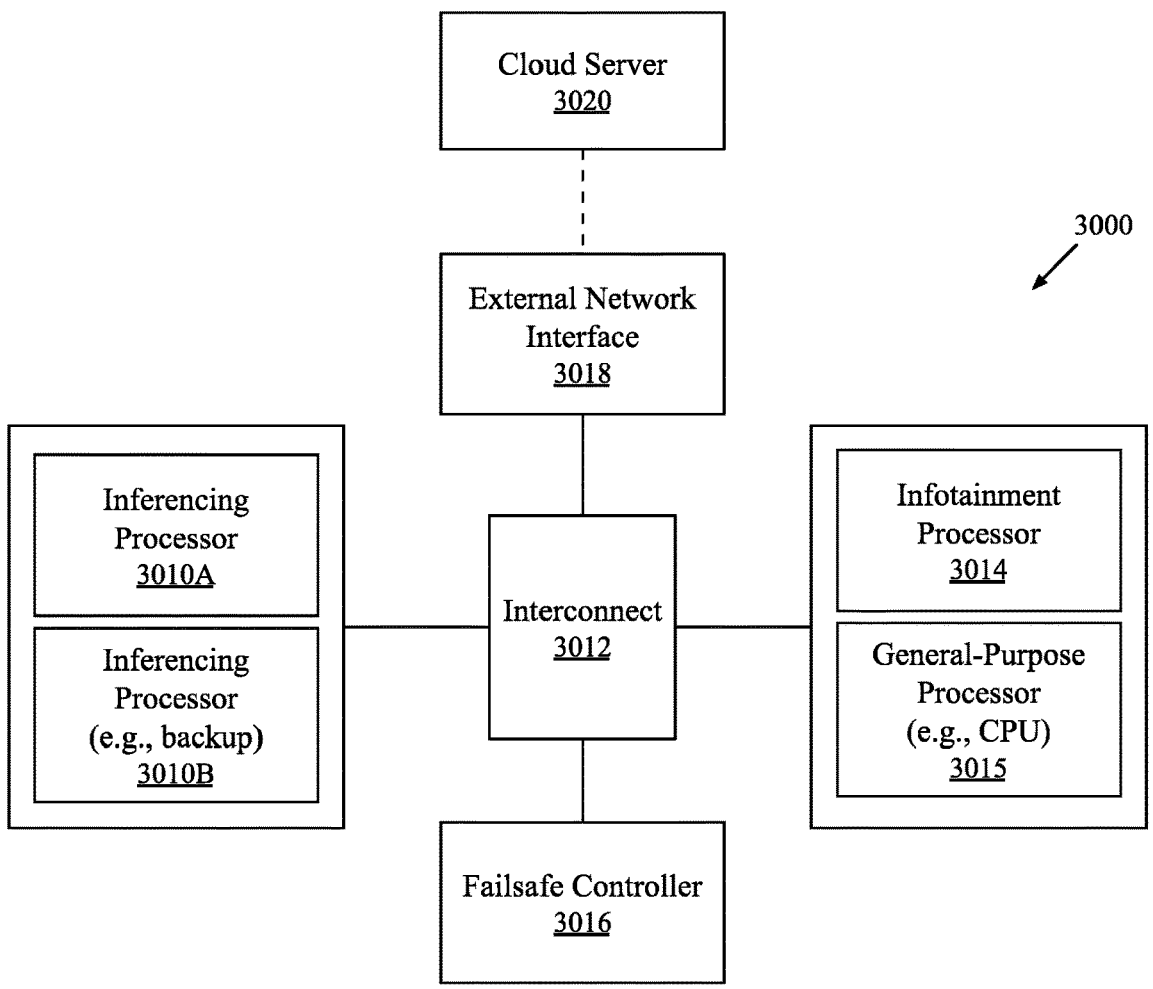
Figure 31:
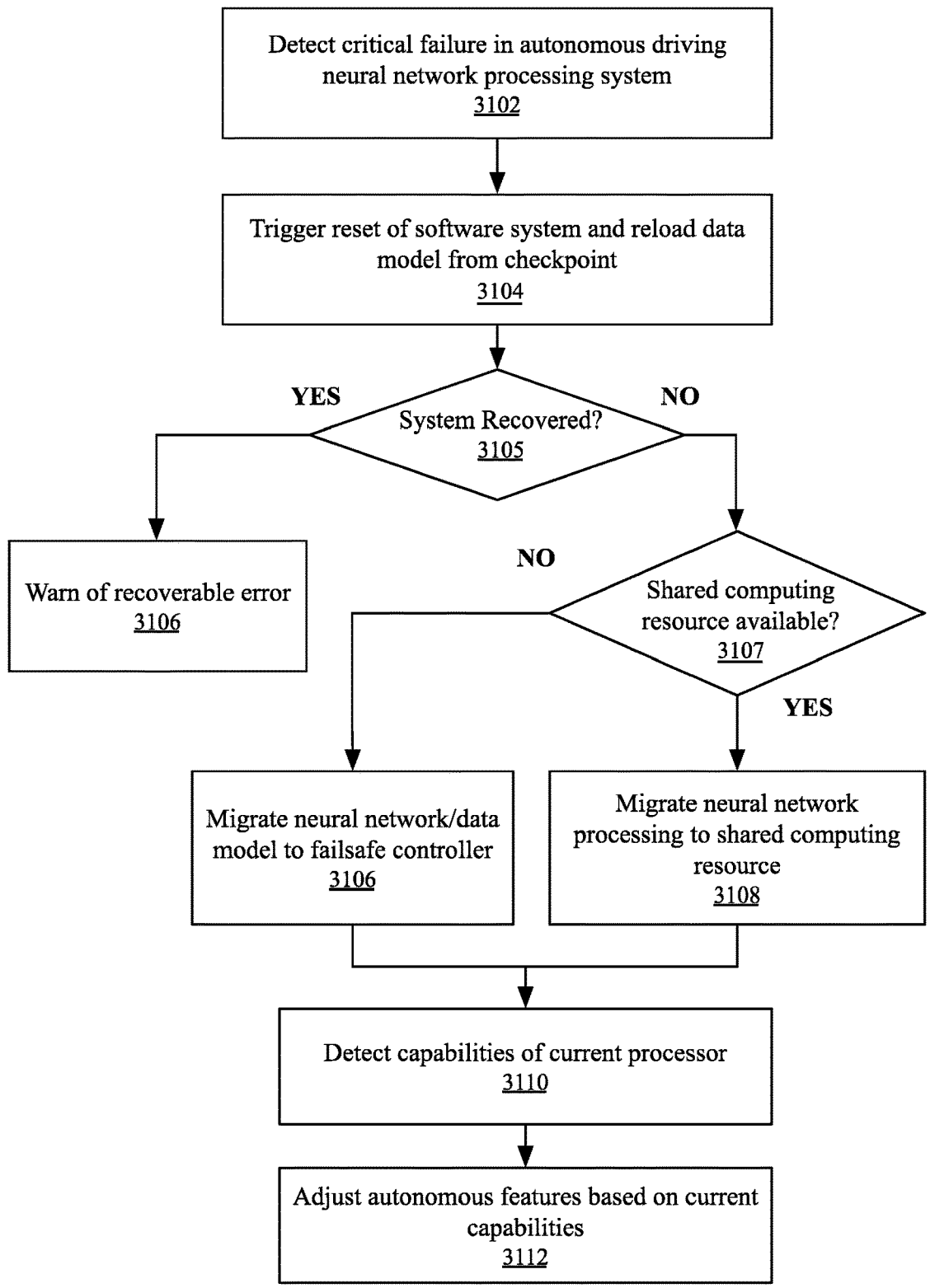
FIG. 31B shows computational logic associated with an additional algorithm to handle an abrupt hardware failure on an ASDV, according to an embodiment.

FIG. 30B illustrates a machine learning processing system 3000 having multiple redundancies, according to an embodiment. The machine learning processing system 3000, in one embodiment, is a deployed processing system for use in, for example, an at least semi-autonomous self-driving vehicle. The machine learning processing system 3000 includes a set of inferencing processor 3010A-3010B, where a first inferencing processor 3010A is a primary processor and a second inferencing processor 3010B is reserved as a backup processor. The inferencing processors 3010A-3010B can each be present on a system-on-a chip integrated circuit and have access to a shared memory and storage system.

The inferencing processors 3010A-3010B couple with an interconnect 3012. The interconnect can also be connected with an external network interface 3018, a failsafe controller 3016, and infotainment processor 3014, and a general-purpose processor 3015, such as an application processor or central processing unit (CPU). The external network interface 3018 can be a wireless data interface such as an LTE or GSM interface. The external network interface 3018 can enable communication with a cloud server 3020. The infotainment processor 3014 can be a graphics processor that is dedicated to proving graphics rendering functionality to enable a virtual cockpit, virtual gauge system, mapping and navigation system, and/or multimedia interface for the ASDV. The general-purpose processor 3015 can be an application processor that is used to execute applications provided by the ASDV, and can work in concert with the infotainment processor 3014. The failsafe controller 3016, in one embodiment, can be a microcontroller or low-power processor that can perform a subset of functions provided by the inferencing processors 3010A-3010B, infotainment processor 3014, and/or general-purpose processor 3015. The failsafe controller can temporarily substitute for such processors should a software or hardware error render those processors inoperable. Additionally, the failsafe controller 3016 can coordinate handoff of processing operations between compatible processors in the event of a hardware failure.

Handling abrupt hardware failures on an autonomous self-driving vehicle can be performed as a multi-staged process. Recovery/trace points 3004, as in FIG. 30A, can be regularly transmitted to a cloud server 3020 via the external network interface. Additionally, the cloud server 3020 can maintain an emergency algorithm for safe driving that can be retrieved via the external network interface 3018 in the event of a critical loss of data or hardware functionality, to allow the machine learning processing system 3000, at the least, to navigate the ASDV to a safe stop in a safe position, such as on the side of a road and out of the way of the flow of traffic.

Computational logic 3100 associated with an additional algorithm to handle an abrupt hardware failure on an ASDV is shown in FIG. 31B. In one embodiment, the computational logic 3100, which can be provided by firmware executing on the failsafe controller 3016 of FIG. 31B, can monitor the operation of the various software and hardware processes within a machine learning processing system, such as the machine learning processing system 3000 as in FIG. 30B.

In one embodiment, the failsafe controller can detect a critical failure in an element of the autonomous driving neural network processing system, as shown at block 3102. The failsafe controller can then trigger a reset of a software system on the failed element and attempt to reload the data model from a previously preserved checkpoint, as shown at block 3104. The previously preserved checkpoint can be loaded from local storage. If local storage is not available, a previously preserved checkpoint can be loaded from a cloud server via an external network interface. In one embodiment, reloading the data model from the cloud server can also include pre-fetching an algorithm for safe driving for potential use later in the recovery process. If the failsafe controller determines at block 3105 that the system has recovered as a result of the software system reset performed at block 3104, the failsafe controller can warn of a recoverable error at block 3106. The warning can be displayed to an operator of the ASDV, recording in a logging system, and/or reported to a cloud server. Repeated recoverable errors may indicate an impending critical hardware error.

If the system is not recovered at block 3105, the failsafe controller can determine, at block 3107, if any shared computing resources to the failed system are present. If a shared resource is available, as determined at block 3107, the failsafe controller can migrate neural network processing to the shared computing resource, as shown at block 3108. In the event a shared computing resource is not available, as determined at block 3107, the failsafe controller can migrate the neural network or data model to the failsafe controller, which can be configured with sufficient processing functionality simply to navigate and drive the ASDV to a safe stop at a safe location out of the flow of traffic.

The specific capabilities of the processor to which neural network processing has been migrated can be determined at block 3110. In response to the detected capabilities, the failsafe controller, or current primary processor, can adjust the autonomous features based on the current capabilities, as shown at block 3112. If an equivalent computing resource is available, for example, inferencing processor 3010B in the event of the failure of inferencing processor 3010A, operations can continue as normal, although a failed component warning can be given and the ASDV can be flagged for service. In the event a non-equivalent shared computing resource is available, migration can still be performed, although operations may continue at a potentially degraded level of service. For example, with reference to FIG. 30, if a hardware error causes the failure of inferencing processor 3010A and inferencing processor 3010B, operations can continue with the general-purpose processor 3015 and/or the infotainment processor 3014 performing some of the inferencing operations, although overall system functionality may be limited. For example, a low maximum speed may be imposed on the ASDV due to the reduced level of compute throughput available. Multimedia or infotainment features may be limited in such operational mode. Additionally, autonomous operation may be limited to navigating the ASDV to a safe location for recovery. In one embodiment, the algorithm for safe driving previously retrieved from the cloud server 3020 can be loaded on the general-purpose processor 3015 and/or infotainment processor 3014, where the algorithm has been specifically optimized to operate on backup processing hardware.

Figure 32:
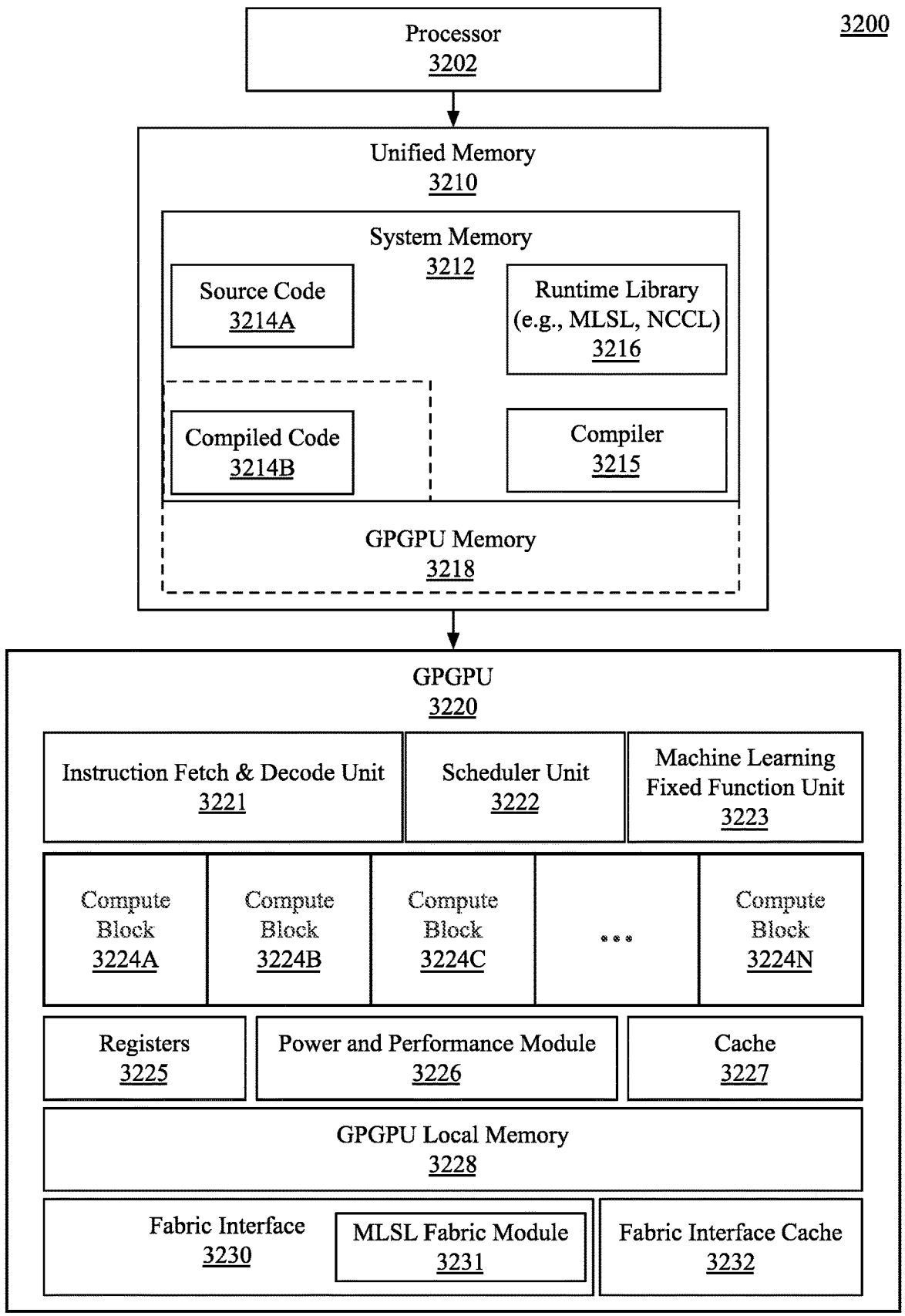
FIG. 32 is a block diagram of a data processing system, according to embodiments described herein.

FIG. 32 is a block diagram of a data processing system 3200, according to embodiments described herein. The data processing system 3200 is a heterogeneous processing system having a processor 3202, unified memory 3210, and a GPGPU 3220 including machine learning acceleration logic. The processor 3202 and the GPGPU 3220 can be any of the processors and GPGPU/parallel processors as described herein. The processor 3202 can execute instructions for a compiler 3215 stored in system memory 3212. The compiler 3215 executes on the processor 3202 to compile source code 3214A into compiled code 3214B. The compiled code 3214B can include code that may be executed by the processor 3202 and/or code that may be executed by the GPGPU 3220. During compilation, the compiler 3215 can perform operations to insert metadata, including hints as to the level of data parallelism present in the compiled code 3214B and/or hints regarding the data locality associated with threads to be dispatched based on the compiled code 3214B. The compiler 3215 can include the information necessary to perform such operations or the operations can be performed with the assistance of a runtime library 3216, such as the machine learning scaling library (MLSL) described herein. The runtime library 3216 can also facilitate the compiler 3215 in the compilation of the source code 3214A and includes instructions that are linked at runtime with the compiled code 3214B to facilitate execution of the compiled instructions on the GPGPU 3220.

The unified memory 3210 represents a unified address space that may be accessed by the processor 3202 and the GPGPU 3220. The unified memory includes system memory 3212 as well as GPGPU memory 3218. The GPGPU memory 3218 includes GPGPU local memory 3228 within the GPGPU 3220 and can also include some or all of system memory 3212. For example, compiled code 3214B stored in system memory 3212 can also be mapped into GPGPU memory 3218 for access by the GPGPU 3220.

The GPGPU 3220 includes multiple compute blocks 3224A-3224N, which each include one or more parallel processing clusters. The GPGPU 3220 also includes a set of registers 3224, cache memory 3226, and a power and performance module 3225 that can be used as shared resources for the compute blocks 3224A-3224N. The power and performance module 3225 can be configured to adjust power delivery and clock frequencies for the compute blocks 3224A-3224N to power gate idle components within the compute blocks 3224A-3224N under heavy workloads. The GPGPU 3220 includes GPGPU local memory 3228, which is physical memory that shares a graphics card or multi-chip module with the GPGPU 3220.

In one embodiment, the GPGPU 3220 includes graphics and compute acceleration logic including an instruction fetch and decode unit 3221, a scheduler unit 3222, and a machine learning fixed function unit 3223. The fetch and decode unit 3221 is a fetch and decode unit includes logic to fetch and decode instructions to be computed by the GPGPU 3220. In one embodiment, the executed instructions can sequence and/or serialize, via the scheduler unit 3222, a set of operations and/or micro-operations to be performed via compute block 3224A-3224N and/or the machine learning fixed function unit 3223.

In one embodiment, the machine learning fixed function unit 3223 is an application specific integrated circuit explicitly and exclusively configured to perform a large number of parallel matrix multiplication operations. In one embodiment, the machine learning fixed function unit 3223 is configured to perform matrix multiplications for convolution filters having non power-of-two filter sizes. In one embodiment, the machine learning fixed function unit 3223 is a field programmable gate array (FPGA) that provides fixed function logic that can updated between workloads.

In some embodiments, the GPGPU 3220 includes an integrated fabric interface 3230 and fabric interface cache 3232. In one embodiment, the integrated fabric interface 3230 additionally includes an MLSL fabric module 3231 that enables the fabric interface to provide hardware acceleration for certain MLSL operations. The fabric interface 3230 can be a variant of the high-performance communications fabric 1521 of FIG. 15B. The fabric interface 3230 has an address space that is mapped to at least a portion of the GPGPU local memory 3228 and in one embodiment can participate in the unified memory 3210 shared by the processor 3202 and the GPGPU 3220. The fabric interface cache 3232 is used to cache data received from or to be transmitted to the communication fabric that enables data communication between compute nodes. In one embodiment when computation results are computed by the GPGPU 3220 and stored within the GPGPU local memory 3228, the fabric interface 3230 can transmit the data to other compute nodes from the GPGPU local memory 3228. In such embodiment, data is not required to be transmitted to the system memory 3212 unless the data is required for use by an application executing on the processor 3202.

The MLSL fabric module 3231 is configured to facilitate low latency transmission of data between nodes. In one embodiment, the MLSL fabric module 3231 can receive a set of addresses within the GPGPU local memory 3228 that are associated with data objects managed by the MLSL runtime (e.g., runtime library 3216). For example, an address range for an output buffer to store activation data to be generated by the GPGPU 3220 can be provided to the MLSL fabric module 3231. The MLSL fabric module 3231 can then be configured to monitor the address range for updates. When the address range receives a write of the activation data output by the GPGPU 3220, the MLSL fabric module 3231 can schedule a transfer directly to the fabric interface 3230 to transfer the output activation data. The MLSL fabric module 3231 can also be used to implement the fine-grained communication and point to point hardware communication techniques described herein.

The protocol supported by the fabric interface 3230 can vary. In one embodiment, the fabric interface 3230 is high-speed Ethernet interface. In one embodiment, the fabric interface 3230 is an Omni-Path interconnect interface. In one embodiment, the fabric interface 3230 is an InfiniBand interface. In one embodiment, the fabric interface 3230 is a version of the NVLink interface. Other fabric interface technologies may also be supported.

It is to be appreciated that a lesser or more equipped system than the example described above may be preferred for certain implementations. Therefore, the configuration of the data processing system 3200 may vary across implementations depending upon numerous factors, such as price constraints, performance requirements, technological improvements, or other circumstances. The embodiments described herein are may find extensive use within high-performance computing and machine learning training environments. Accordingly, the present description anticipates the data processing system 3200, and other data processing and computing systems described herein to be implemented as a high-performance server or server array within a distributed computing system. Such distributed computing system can be implemented within a datacenter or server farm. However, embodiments are not limited to such implementation, and the techniques described herein may also find use in a large-scale distributed compute system of lower performance devices, such as but not limited to mobile or handheld devices, tablet computing devices, or connected consumer electronic devices.

Additional Exemplary Graphics Processing System

Details of the embodiments described above can be incorporated within graphics processing systems and devices described below. The graphics processing system and devices of FIG. 33 through FIG. 37 illustrate systems and graphics processing hardware that can implement any and all of the techniques described above.

Figure 33:
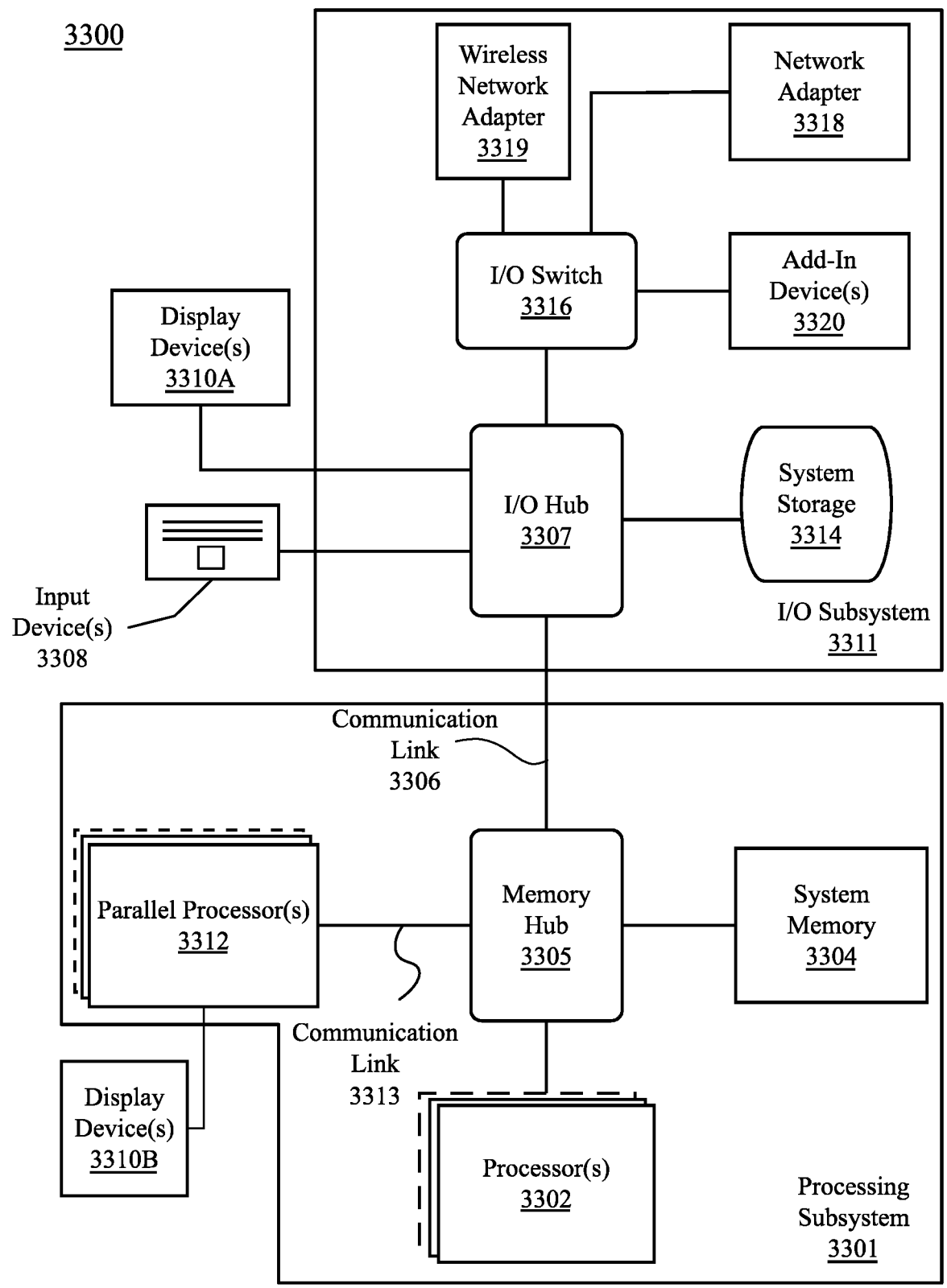
FIG. 33 is a block diagram illustrating a computer system configured to implement one or more aspects of the embodiments described herein.

FIG. 33 is a block diagram illustrating a computing system 3300 configured to implement one or more aspects of the embodiments described herein. The computing system 3300 includes a processing subsystem 3301 having one or more processor(s) 3302 and a system memory 3304 communicating via an interconnection path that may include a memory hub 3305. The memory hub 3305 may be a separate component within a chipset component or may be integrated within the one or more processor(s) 3302. The memory hub 3305 couples with an I/O subsystem 3311 via a communication link 3306. The I/O subsystem 3311 includes an I/O hub 3307 that can enable the computing system 3300 to receive input from one or more input device(s) 3308. Additionally, the I/O hub 3307 can enable a display controller, which may be included in the one or more processor(s) 3302, to provide outputs to one or more display device(s) 3310A. In one embodiment the one or more display device(s) 3310A coupled with the I/O hub 3307 can include a local, internal, or embedded display device.

In one embodiment the processing subsystem 3301 includes one or more parallel processor(s) 3312 coupled to memory hub 3305 via a bus or other communication link 3313. The communication link 3313 may be one of any number of standards based communication link technologies or protocols, such as, but not limited to PCI Express, or may be a vendor specific communications interface or communications fabric. In one embodiment the one or more parallel processor(s) 3312 form a computationally focused parallel or vector processing system that an include a large number of processing cores and/or processing clusters, such as a many integrated core (MIC) processor. In one embodiment the one or more parallel processor(s) 3312 form a graphics processing subsystem that can output pixels to one of the one or more display device(s) 3310A coupled via the I/O hub 3307. The one or more parallel processor(s) 3312 can also include a display controller and display interface (not shown) to enable a direct connection to one or more display device(s) 3310B.

Within the I/O subsystem 3311, a system storage unit 3314 can connect to the I/O hub 3307 to provide a storage mechanism for the computing system 3300. An I/O switch 3316 can be used to provide an interface mechanism to enable connections between the I/O hub 3307 and other components, such as a network adapter 3318 and/or wireless network adapter 3319 that may be integrated into the platform, and various other devices that can be added via one or more add-in device(s) 3320. The network adapter 3318 can be an Ethernet adapter or another wired network adapter. The wireless network adapter 3319 can include one or more of a Wi-Fi, Bluetooth, near field communication (NFC), or other network device that includes one or more wireless radios.

The computing system 3300 can include other components not explicitly shown, including USB or other port connections, optical storage drives, video capture devices, and the like, may also be connected to the I/O hub 3307. Communication paths interconnecting the various components in FIG. 33 may be implemented using any suitable protocols, such as PCI (Peripheral Component Interconnect) based protocols (e.g., PCI-Express), or any other bus or point to point communication interfaces and/or protocol(s), such as the NV-Link high-speed interconnect, or interconnect protocols known in the art.

In one embodiment, the one or more parallel processor(s) 3312 incorporate circuitry optimized for graphics and video processing, including, for example, video output circuitry, and constitutes a graphics processing unit (GPU). In another embodiment, the one or more parallel processor(s) 3312 incorporate circuitry optimized for general purpose processing, while preserving the underlying computational architecture, described in greater detail herein. In yet another embodiment, components of the computing system 3300 may be integrated with one or more other system elements on a single integrated circuit. For example, the one or more parallel processor(s), 3312 memory hub 3305, processor(s) 3302, and I/O hub 3307 can be integrated into a system on chip (SoC) integrated circuit. Alternatively, the components of the computing system 3300 can be integrated into a single package to form a system in package (SIP) configuration. In one embodiment at least a portion of the components of the computing system 3300 can be integrated into a multi-chip module (MCM), which can be interconnected with other multi-chip modules into a modular computing system.

It will be appreciated that the computing system 3300 shown herein is illustrative and that variations and modifications are possible. The connection topology, including the number and arrangement of bridges, the number of processor(s) 3302, and the number of parallel processor(s) 3312, may be modified as desired. For instance, in some embodiments, system memory 3304 is connected to the processor(s) 3302 directly rather than through a bridge, while other devices communicate with system memory 3304 via the memory hub 3305 and the processor(s) 3302. In other alternative topologies, the parallel processor(s) 3312 are connected to the I/O hub 3307 or directly to one of the one or more processor(s) 3302, rather than to the memory hub 3305. In other embodiments, the I/O hub 3307 and memory hub 3305 may be integrated into a single chip. Some embodiments may include two or more sets of processor(s) 3302 attached via multiple sockets, which can couple with two or more instances of the parallel processor(s) 3312.

Some of the particular components shown herein are optional and may not be included in all implementations of the computing system 3300. For example, any number of add-in cards or peripherals may be supported, or some components may be eliminated. Furthermore, some architectures may use different terminology for components similar to those illustrated in FIG. 33. For example, the memory hub 3305 may be referred to as a Northbridge in some architectures, while the I/O hub 3307 may be referred to as a Southbridge.

Figure 34A:
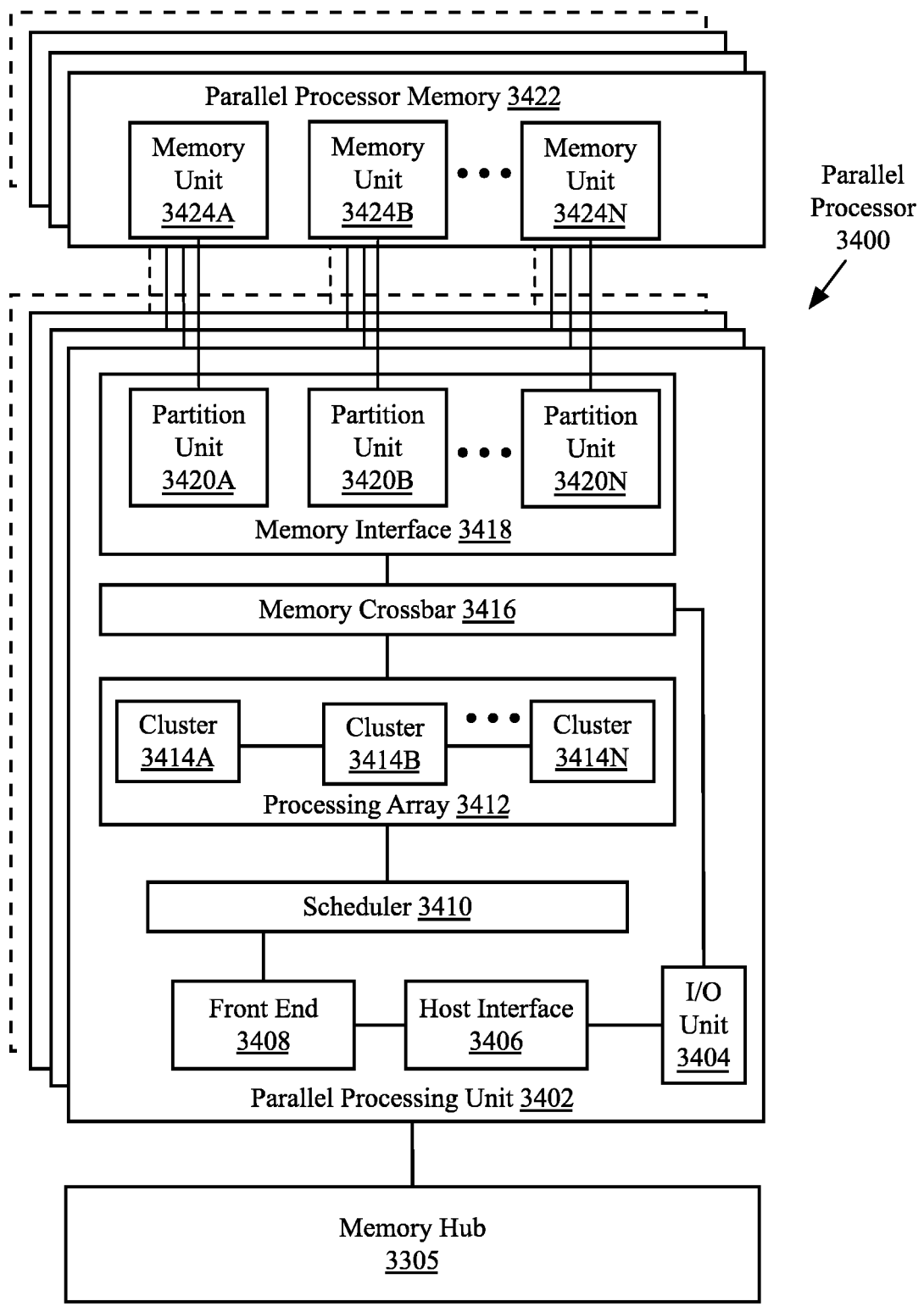
FIG. 34A-34D illustrate parallel processor components, according to an embodiment.

FIG. 34A illustrates a parallel processor 3400, according to an embodiment. The various components of the parallel processor 3400 may be implemented using one or more integrated circuit devices, such as programmable processors, application specific integrated circuits (ASICs), or field programmable gate arrays (FPGA). The illustrated parallel processor 3400 is a variant of the one or more parallel processor(s) 3312 shown in FIG. 33, according to an embodiment.

In one embodiment the parallel processor 3400 includes a parallel processing unit 3402. The parallel processing unit includes an I/O unit 3404 that enables communication with other devices, including other instances of the parallel processing unit 3402. The I/O unit 3404 may be directly connected to other devices. In one embodiment the I/O unit 3404 connects with other devices via the use of a hub or switch interface, such as memory hub 3305. The connections between the memory hub 3305 and the I/O unit 3404 form a communication link 3313. Within the parallel processing unit 3402, the I/O unit 3404 connects with a host interface 3406 and a memory crossbar 3416, where the host interface 3406 receives commands directed to performing processing operations and the memory crossbar 3416 receives commands directed to performing memory operations.

When the host interface 3406 receives a command buffer via the I/O unit 3404, the host interface 3406 can direct work operations to perform those commands to a front end 3408. In one embodiment the front end 3408 couples with a scheduler 3410, which is configured to distribute commands or other work items to a processing cluster array 3412. In one embodiment the scheduler 3410 ensures that the processing cluster array 3412 is properly configured and in a valid state before tasks are distributed to the processing clusters of the processing cluster array 3412. In one embodiment the scheduler 3410 is implemented via firmware logic executing on a microcontroller. The microcontroller implemented scheduler 3410 is configurable to perform complex scheduling and work distribution operations at coarse and fine granularity, enabling rapid preemption and context switching of threads executing on the processing array 3412. In one embodiment, the host software can prove workloads for scheduling on the processing array 3412 via one of multiple graphics processing doorbells. The workloads can then be automatically distributed across the processing array 3412 by the scheduler 3410 logic within the scheduler microcontroller.

The processing cluster array 3412 can include up to "N" processing clusters (e.g., cluster 3414A, cluster 3414B, through cluster 3414N). Each cluster 3414A-3414N of the processing cluster array 3412 can execute a large number of concurrent threads. The scheduler 3410 can allocate work to the clusters 3414A-3414N of the processing cluster array 3412 using various scheduling and/or work distribution algorithms, which may vary depending on the workload arising for each type of program or computation. The scheduling can be handled dynamically by the scheduler 3410, or can be assisted in part by compiler logic during compilation of program logic configured for execution by the processing cluster array 3412. In one embodiment, different clusters 3414A-3414N of the processing cluster array 3412 can be allocated for processing different types of programs or for performing different types of computations.

The processing cluster array 3412 can be configured to perform various types of parallel processing operations. In one embodiment the processing cluster array 3412 is configured to perform general-purpose parallel compute operations. For example, the processing cluster array 3412 can include logic to execute processing tasks including filtering of video and/or audio data, performing modeling operations, including physics operations, and performing data transformations.

In one embodiment the processing cluster array 3412 is configured to perform parallel graphics processing operations. In embodiments in which the parallel processor 3400 is configured to perform graphics processing operations, the processing cluster array 3412 can include additional logic to support the execution of such graphics processing operations, including, but not limited to texture sampling logic to perform texture operations, as well as tessellation logic and other vertex processing logic. Additionally, the processing cluster array 3412 can be configured to execute graphics processing related shader programs such as, but not limited to vertex shaders, tessellation shaders, geometry shaders, and pixel shaders. The parallel processing unit 3402 can transfer data from system memory via the I/O unit 3404 for processing. During processing the transferred data can be stored to on-chip memory (e.g., parallel processor memory 3422) during processing, then written back to system memory.

In one embodiment, when the parallel processing unit 3402 is used to perform graphics processing, the scheduler 3410 can be configured to divide the processing workload into approximately equal sized tasks, to better enable distribution of the graphics processing operations to multiple clusters 3414A-3414N of the processing cluster array 3412. In some embodiments, portions of the processing cluster array 3412 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 3414A-3414N may be stored in buffers to allow the intermediate data to be transmitted between clusters 3414A-3414N for further processing.

During operation, the processing cluster array 3412 can receive processing tasks to be executed via the scheduler 3410, which receives commands defining processing tasks from front end 3408. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 3410 may be configured to fetch the indices corresponding to the tasks or may receive the indices from the front end 3408. The front end 3408 can be configured to ensure the processing cluster array 3412 is configured to a valid state before the workload specified by incoming command buffers (e.g., batch-buffers, push buffers, etc.) is initiated.

Each of the one or more instances of the parallel processing unit 3402 can couple with parallel processor memory 3422. The parallel processor memory 3422 can be accessed via the memory crossbar 3416, which can receive memory requests from the processing cluster array 3412 as well as the I/O unit 3404. The memory crossbar 3416 can access the parallel processor memory 3422 via a memory interface 3418. The memory interface 3418 can include multiple partition units (e.g., partition unit 3420A, partition unit 3420B, through partition unit 3420N) that can each couple to a portion (e.g., memory unit) of parallel processor memory 3422. In one implementation, the number of partition units 3420A-3420N is configured to be equal to the number of memory units, such that a first partition unit 3420A has a corresponding first memory unit 3424A, a second partition unit 3420B has a corresponding memory unit 3424B, and an Nth partition unit 3420N has a corresponding Nth memory unit 3424N. In other embodiments, the number of partition units 3420A-3420N may not be equal to the number of memory devices.

In various embodiments, the memory units 3424A-3424N can include various types of memory devices, including dynamic random-access memory (DRAM) or graphics random access memory, such as synchronous graphics random access memory (SGRAM), including graphics double data rate (GDDR) memory. In one embodiment, the memory units 3424A-3424N may also include 3D stacked memory, including but not limited to high bandwidth memory (HBM). Persons skilled in the art will appreciate that the specific implementation of the memory units 3424A-3424N can vary, and can be selected from one of various conventional designs. Render targets, such as frame buffers or texture maps may be stored across the memory units 3424A-3424N, allowing partition units 3420A-3420N to write portions of each render target in parallel to efficiently use the available bandwidth of parallel processor memory 3422. In some embodiments, a local instance of the parallel processor memory 3422 may be excluded in favor of a unified memory design that utilizes system memory in conjunction with local cache memory.

In one embodiment, any one of the clusters 3414A-3414N of the processing cluster array 3412 can process data that will be written to any of the memory units 3424A-3424N within parallel processor memory 3422. The memory crossbar 3416 can be configured to transfer the output of each cluster 3414A-3414N to any partition unit 3420A-3420N or to another cluster 3414A-3414N, which can perform additional processing operations on the output. Each cluster 3414A-3414N can communicate with the memory interface 3418 through the memory crossbar 3416 to read from or write to various external memory devices. In one embodiment the memory crossbar 3416 has a connection to the memory interface 3418 to communicate with the I/O unit 3404, as well as a connection to a local instance of the parallel processor memory 3422, enabling the processing units within the different processing clusters 3414A-3414N to communicate with system memory or other memory that is not local to the parallel processing unit 3402. In one embodiment the memory crossbar 3416 can use virtual channels to separate traffic streams between the clusters 3414A-3414N and the partition units 3420A-3420N.

While a single instance of the parallel processing unit 3402 is illustrated within the parallel processor 3400, any number of instances of the parallel processing unit 3402 can be included. For example, multiple instances of the parallel processing unit 3402 can be provided on a single add-in card, or multiple add-in cards can be interconnected. The different instances of the parallel processing unit 3402 can be configured to inter-operate even if the different instances have different numbers of processing cores, different amounts of local parallel processor memory, and/or other configuration differences. For example, in one embodiment some instances of the parallel processing unit 3402 can include higher precision floating-point units relative to other instances. Systems incorporating one or more instances of the parallel processing unit 3402 or the parallel processor 3400 can be implemented in a variety of configurations and form factors, including but not limited to desktop, laptop, or handheld personal computers, servers, workstations, game consoles, and/or embedded systems.

Figure 34B:
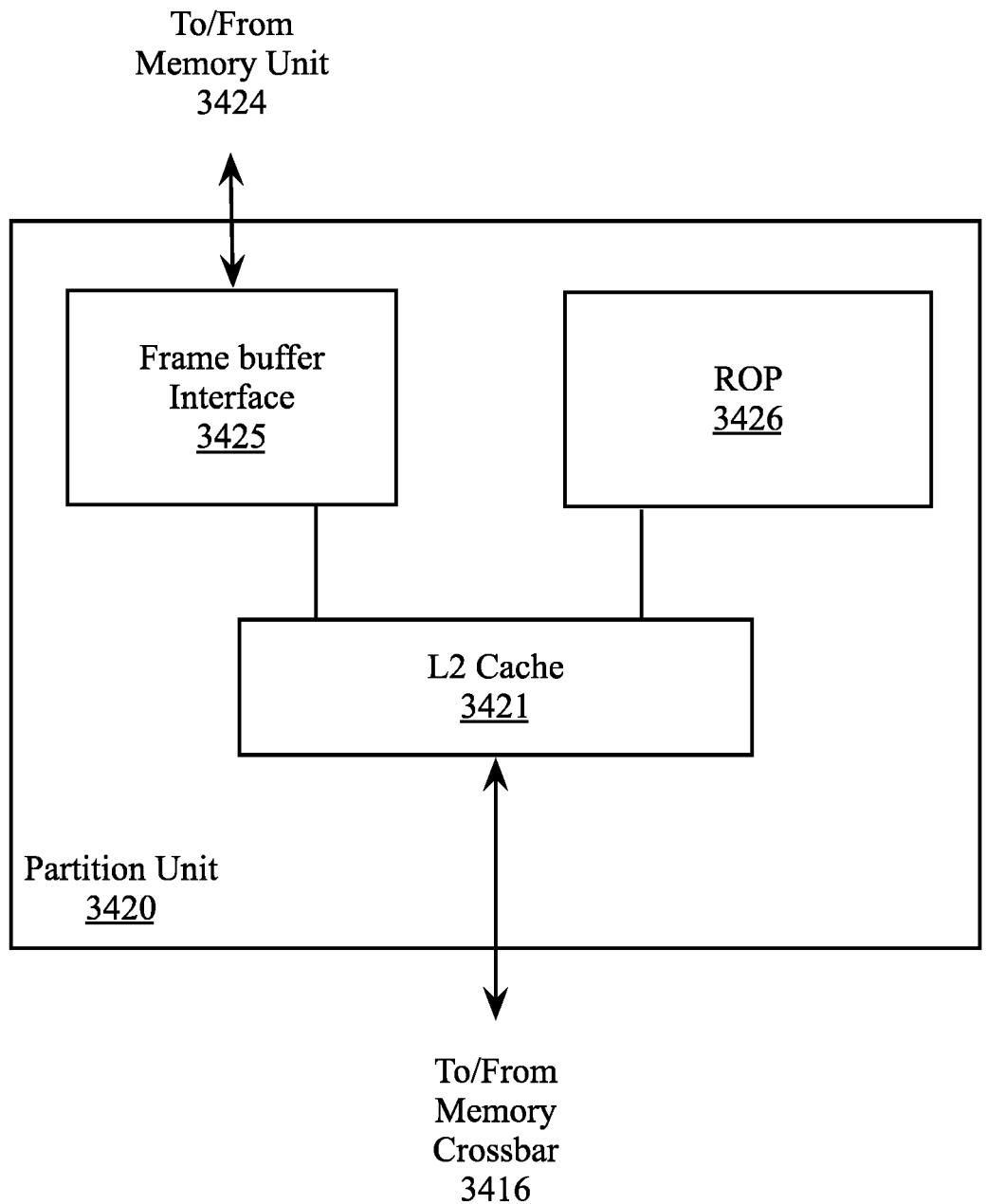

FIG. 34B is a block diagram of a partition unit 3420, according to an embodiment. In one embodiment the partition unit 3420 is an instance of one of the partition units 3420A-3420N of FIG. 34A. As illustrated, the partition unit 3420 includes an L2 cache 3421, a frame buffer interface 3425, and a ROP 3426 (raster operations unit). The L2 cache 3421 is a read/write cache that is configured to perform load and store operations received from the memory crossbar 3416 and ROP 3426. Read misses and urgent write-back requests are output by L2 cache 3421 to frame buffer interface 3425 for processing. Updates can also be sent to the frame buffer via the frame buffer interface 3425 for processing. In one embodiment the frame buffer interface 3425 interfaces with one of the memory units in parallel processor memory, such as the memory units 3424A-3424N of FIG. 34 (e.g., within parallel processor memory 3422).

In graphics applications, the ROP 3426 is a processing unit that performs raster operations such as stencil, z test, blending, and the like. The ROP 3426 then outputs processed graphics data that is stored in graphics memory. In some embodiments the ROP 3426 includes compression logic to compress depth or color data that is written to memory and decompress depth or color data that is read from memory. The compression logic can be lossless compression logic that makes use of one or more of multiple compression algorithms. The type of compression that is performed by the ROP 3426 can vary based on the statistical characteristics of the data to be compressed. For example, in one embodiment, delta color compression is performed on depth and color data on a per-tile basis.

In some embodiments, the ROP 3426 is included within each processing cluster (e.g., cluster 3414A-3414N of FIG. 34) instead of within the partition unit 3420. In such embodiment, read and write requests for pixel data are transmitted over the memory crossbar 3416 instead of pixel fragment data. The processed graphics data may be displayed on a display device, such as one of the one or more display device(s) 3310 of FIG. 33, routed for further processing by the processor(s) 3302, or routed for further processing by one of the processing entities within the parallel processor 3400 of FIG. 34A.

Figure 34C:
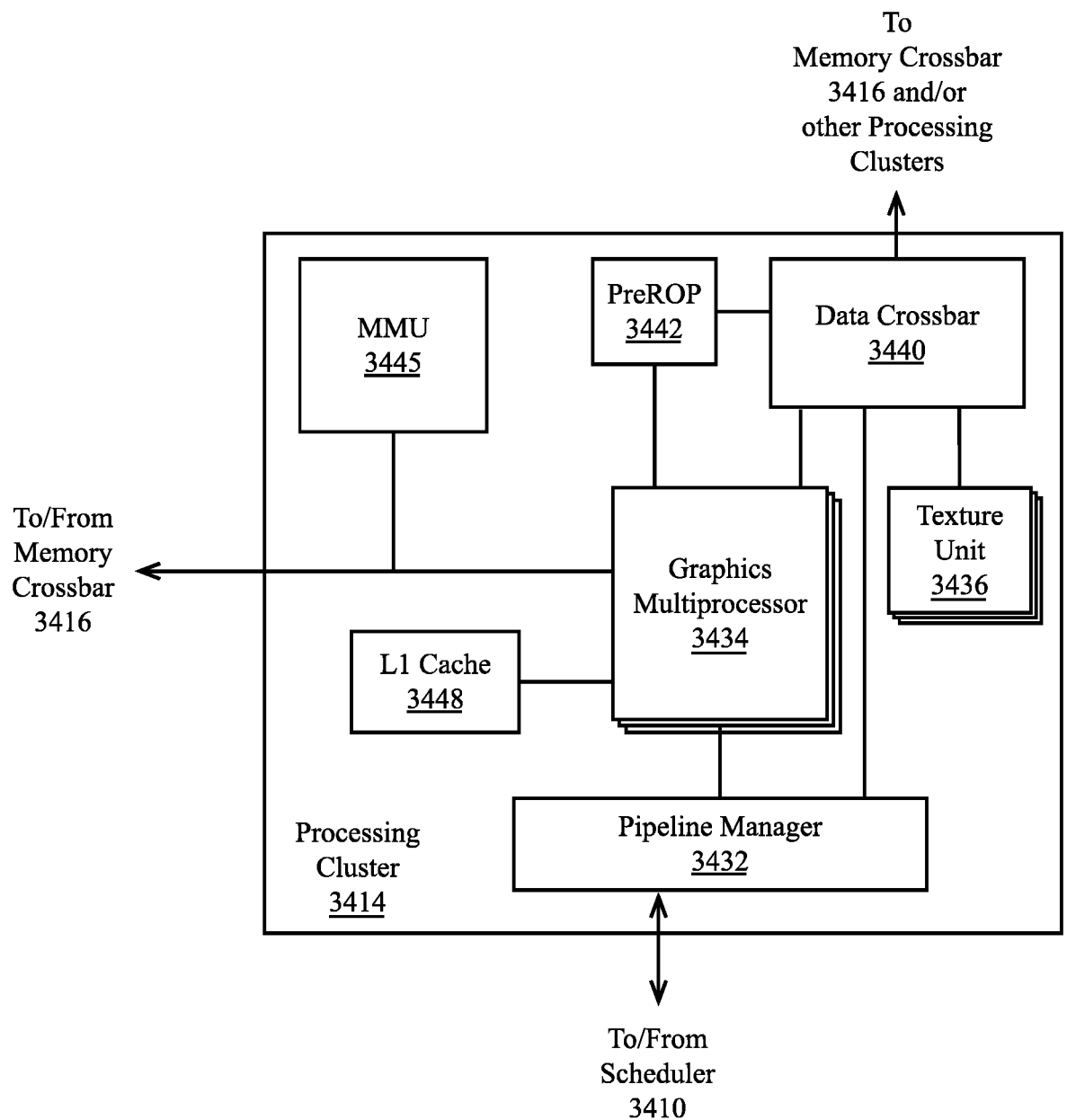

FIG. 34C is a block diagram of a processing cluster 3414 within a parallel processing unit, according to an embodiment. In one embodiment, the processing cluster is an instance of one of the processing clusters 3414A-3414N of FIG. 34. The processing cluster 3414 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 3414 can be controlled via a pipeline manager 3432 that distributes processing tasks to SIMT parallel processors. The pipeline manager 3432 receives instructions from the scheduler 3410 of FIG. 34 and manages execution of those instructions via a graphics multiprocessor 3434 and/or a texture unit 3436. The illustrated graphics multiprocessor 3434 is an exemplary instance of a SIMT parallel processor. However, various types of SIMT parallel processors of differing architectures may be included within the processing cluster 3414. One or more instances of the graphics multiprocessor 3434 can be included within a processing cluster 3414. The graphics multiprocessor 3434 can process data and a data crossbar 3440 can be used to distribute the processed data to one of multiple possible destinations, including other shader units. The pipeline manager 3432 can facilitate the distribution of processed data by specifying destinations for processed data to be distributed vis the data crossbar 3440.

Each graphics multiprocessor 3434 within the processing cluster 3414 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 3414 constitutes a thread. A set of threads executing across the set of parallel processing engines is a thread group. A thread group executes the same program on different input data. Each thread within a thread group can be assigned to a different processing engine within a graphics multiprocessor 3434. A thread group may include fewer threads than the number of processing engines within the graphics multiprocessor 3434. When a thread group includes fewer threads than the number of processing engines, one or more of the processing engines may be idle during cycles in which that thread group is being processed. A thread group may also include more threads than the number of processing engines within the graphics multiprocessor 3434. When the thread group includes more threads than the number of processing engines within the graphics multiprocessor 3434, processing can be performed over consecutive clock cycles. In one embodiment multiple thread groups can be executed concurrently on a graphics multiprocessor 3434.

In one embodiment the graphics multiprocessor 3434 includes an internal cache memory to perform load and store operations. In one embodiment, the graphics multiprocessor 3434 can forego an internal cache and use a cache memory (e.g., L1 cache 3448) within the processing cluster 3414. Each graphics multiprocessor 3434 also has access to L2 caches within the partition units (e.g., partition units 3420A-3420N of FIG. 34) that are shared among all processing clusters 3414 and may be used to transfer data between threads. The graphics multiprocessor 3434 may also access off-chip global memory, which can include one or more of local parallel processor memory and/or system memory. Any memory external to the parallel processing unit 3402 may be used as global memory. Embodiments in which the processing cluster 3414 includes multiple instances of the graphics multiprocessor 3434 can share common instructions and data, which may be stored in the L1 cache 3448.

Each processing cluster 3414 may include an MMU 3445 (memory management unit) that is configured to map virtual addresses into physical addresses. In other embodiments, one or more instances of the MMU 3445 may reside within the memory interface 3418 of FIG. 34. The MMU 3445 includes a set of page table entries (PTEs) used to map a virtual address to a physical address of a tile and optionally a cache line index. The MMU 3445 may include address translation lookaside buffers (TLB) or caches that may reside within the graphics multiprocessor 3434 or the L1 cache or processing cluster 3414. The physical address is processed to distribute surface data access locality to allow efficient request interleaving among partition units. The cache line index may be used to determine whether a request for a cache line is a hit or miss.

In graphics and computing applications, a processing cluster 3414 may be configured such that each graphics multiprocessor 3434 is coupled to a texture unit 3436 for performing texture mapping operations, e.g., determining texture sample positions, reading texture data, and filtering the texture data. Texture data is read from an internal texture L1 cache (not shown) or in some embodiments from the L1 cache within graphics multiprocessor 3434 and is fetched from an L2 cache, local parallel processor memory, or system memory, as needed. Each graphics multiprocessor 3434 outputs processed tasks to the data crossbar 3440 to provide the processed task to another processing cluster 3414 for further processing or to store the processed task in an L2 cache, local parallel processor memory, or system memory via the memory crossbar 3416. A preROP 3442 (pre-raster operations unit) is configured to receive data from graphics multiprocessor 3434, direct data to ROP units, which may be located with partition units as described herein (e.g., partition units 3420A-3420N of FIG. 34). The preROP 3442 unit can perform optimizations for color blending, organize pixel color data, and perform address translations.

It will be appreciated that the core architecture described herein is illustrative and that variations and modifications are possible. Any number of processing units, e.g., graphics multiprocessor 3434, texture units 3436, preROPs 3442, etc., may be included within a processing cluster 3414. Further, while only one processing cluster 3414 is shown, a parallel processing unit as described herein may include any number of instances of the processing cluster 3414. In one embodiment, each processing cluster 3414 can be configured to operate independently of other processing clusters 3414 using separate and distinct processing units, L1 caches, etc.

Figure 34D:
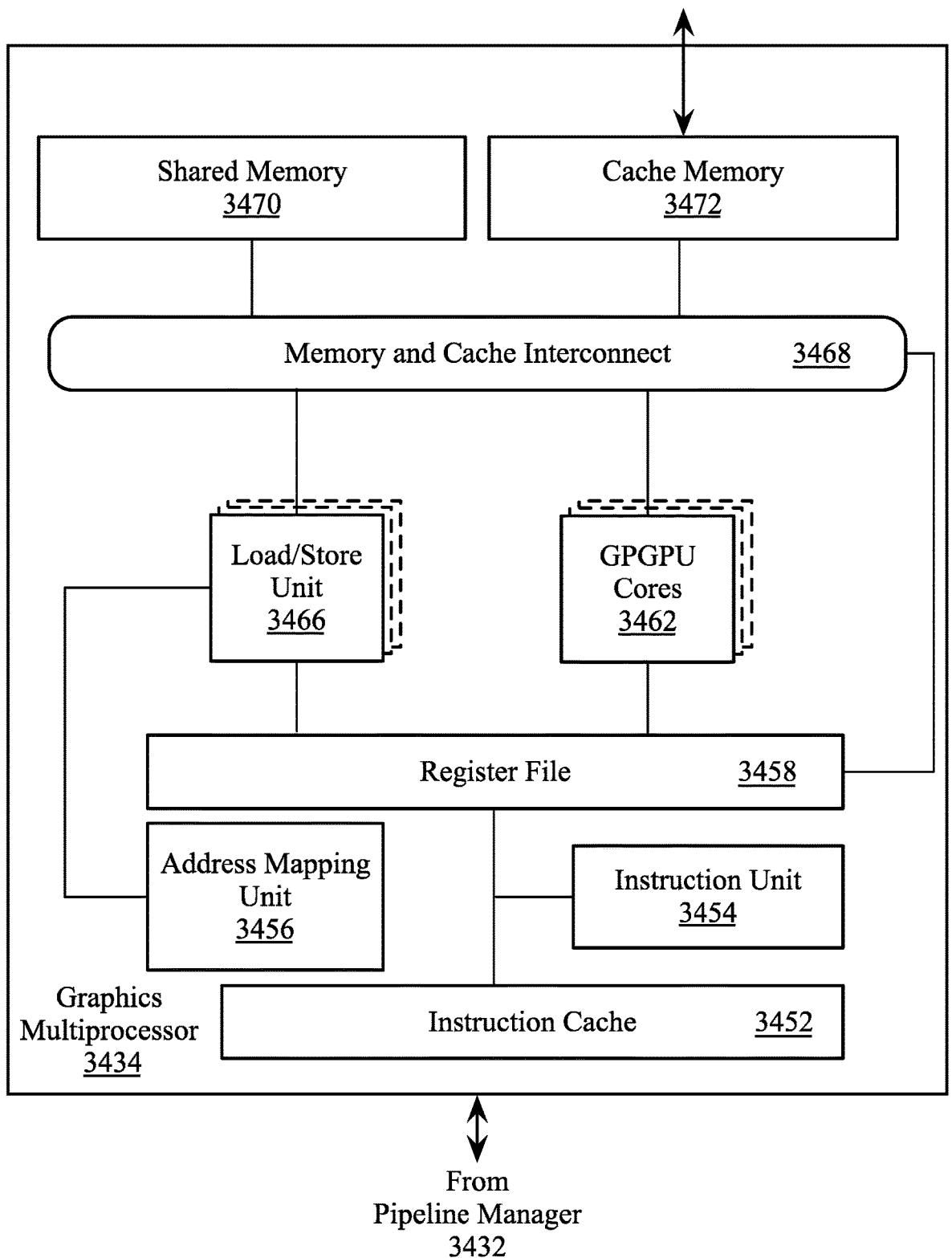

FIG. 34D shows a graphics multiprocessor 3434, according to one embodiment. In such embodiment, the graphics multiprocessor 3434 couples with the pipeline manager 3432 of the processing cluster 3414. The graphics multiprocessor 3434 has an execution pipeline including but not limited to an instruction cache 3452, an instruction unit 3454, an address mapping unit 3456, a register file 3458, one or more general purpose graphics processing unit (GPGPU) cores 3462, and one or more load/store units 3466. The GPGPU cores 3462 and load/store units 3466 are coupled with cache memory 3472 and shared memory 3470 via a memory and cache interconnect 3468.

In one embodiment, the instruction cache 3452 receives a stream of instructions to execute from the pipeline manager 3432. The instructions are cached in the instruction cache 3452 and dispatched for execution by the instruction unit 3454. The instruction unit 3454 can dispatch instructions as thread groups (e.g., warps), with each thread of the thread group assigned to a different execution unit within GPGPU core 3462. An instruction can access any of a local, shared, or global address space by specifying an address within a unified address space. The address mapping unit 3456 can be used to translate addresses in the unified address space into a distinct memory address that can be accessed by the load/store units 3466.

The register file 3458 provides a set of registers for the functional units of the graphics multiprocessor 3434. The register file 3458 provides temporary storage for operands connected to the data paths of the functional units (e.g., GPGPU cores 3462, load/store units 3466) of the graphics multiprocessor 3434. In one embodiment, the register file 3458 is divided between each of the functional units such that each functional unit is allocated a dedicated portion of the register file 3458. In one embodiment, the register file 3458 is divided between the different warps being executed by the graphics multiprocessor 3434.

The GPGPU cores 3462 can each include floating point units (FPUs) and/or integer arithmetic logic units (ALUs) that are used to execute instructions of the graphics multiprocessor 3434. The GPGPU cores 3462 can be similar in architecture or can differ in architecture, according to embodiments. For example, in one embodiment, a first portion of the GPGPU cores 3462 include a single precision FPU and an integer ALU while a second portion of the GPGPU cores include a double precision FPU. In one embodiment, the FPUs can implement the IEEE 754-2008 standard for floating point arithmetic or enable variable precision floating point arithmetic. The graphics multiprocessor 3434 can additionally include one or more fixed function or special function units to perform specific functions such as copy rectangle or pixel blending operations. In one embodiment one or more of the GPGPU cores can also include fixed or special function logic.

In one embodiment, the GPGPU cores 3462 include SIMD logic capable of performing a single instruction on multiple sets of data. In one embodiment GPGPU cores 3462 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can executed via a single SIMD instruction. For example and in one embodiment, eight SIMT threads that perform the same or similar operations can be executed in parallel via a single SIMD8 logic unit.

The memory and cache interconnect 3468 is an interconnect network that connects each of the functional units of the graphics multiprocessor 3434 to the register file 3458 and to the shared memory 3470. In one embodiment, the memory and cache interconnect 3468 is a crossbar interconnect that allows the load/store unit 3466 to implement load and store operations between the shared memory 3470 and the register file 3458. The register file 3458 can operate at the same frequency as the GPGPU cores 3462, thus data transfer between the GPGPU cores 3462 and the register file 3458 is very low latency. The shared memory 3470 can be used to enable communication between threads that execute on the functional units within the graphics multiprocessor 3434. The cache memory 3472 can be used as a data cache for example, to cache texture data communicated between the functional units and the texture unit 3436. The shared memory 3470 can also be used as a program managed cached. Threads executing on the GPGPU cores 3462 can programmatically store data within the shared memory in addition to the automatically cached data that is stored within the cache memory 3472.

Figure 35A:
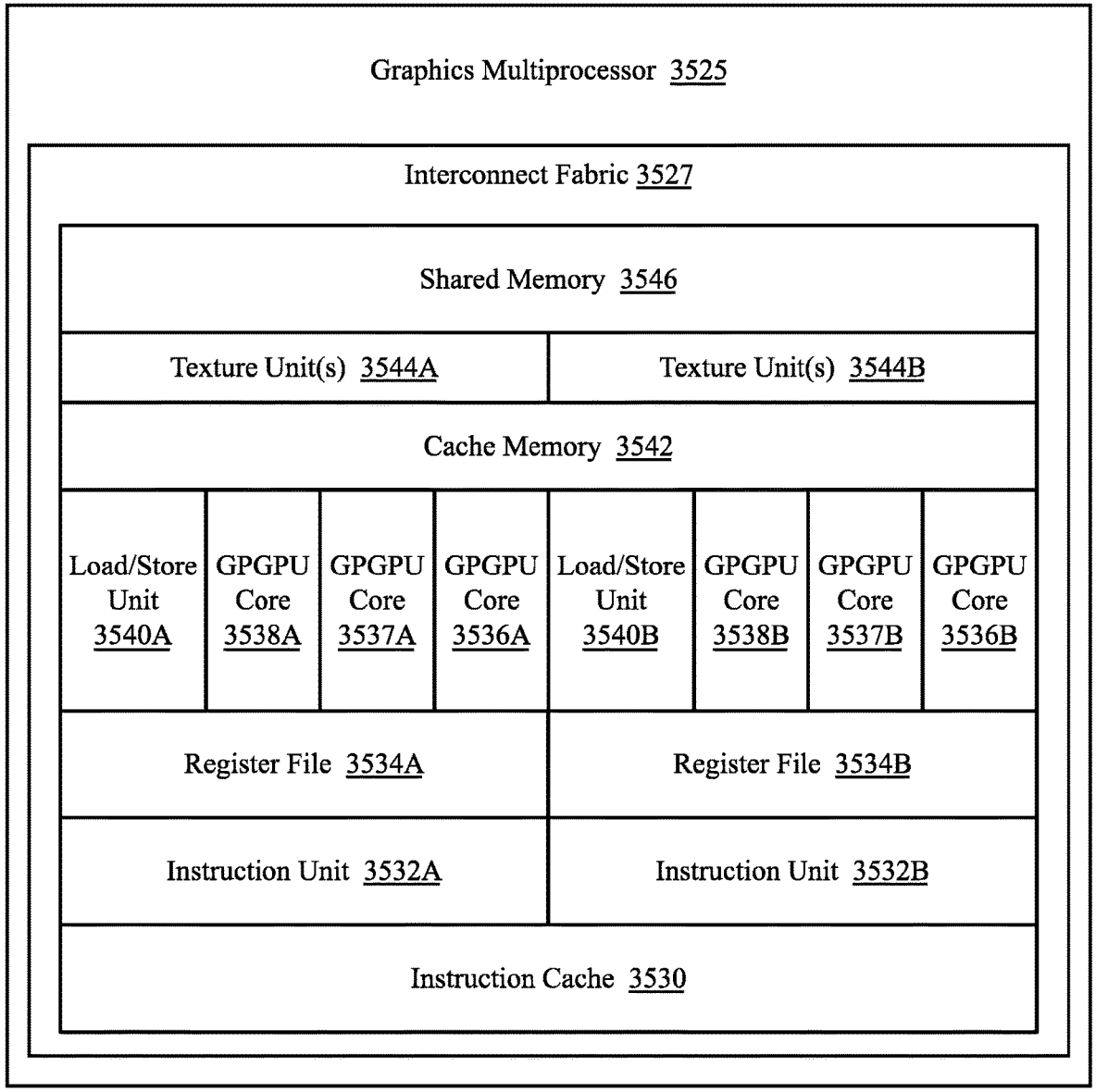
FIGS. 35A-35B are block diagrams of graphics multiprocessors, according to embodiments.
Figure 35B:
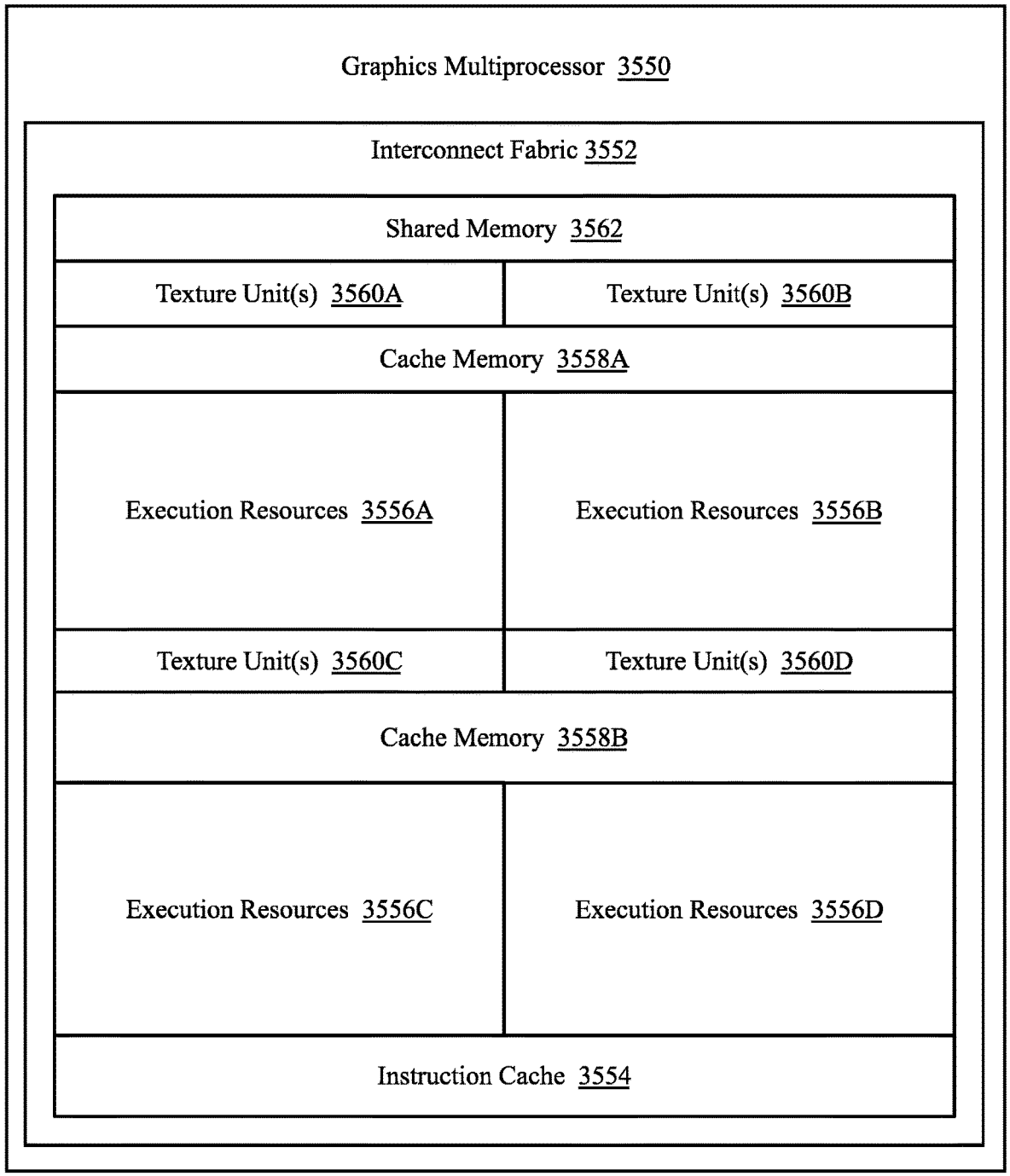

FIGS. 35A-35B illustrate additional graphics multiprocessors, according to embodiments. The illustrated graphics multiprocessors 3525, 3550 are variants of the graphics multiprocessor 3434 of FIG. 34C. The illustrated graphics multiprocessors 3525, 3550 can be configured as a streaming multiprocessor (SM) capable of simultaneous execution of a large number of execution threads.

FIG. 35A shows a graphics multiprocessor 3525 according to an additional embodiment. The graphics multiprocessor 3525 includes multiple additional instances of execution resource units relative to the graphics multiprocessor 3434 of FIG. 34D. For example, the graphics multiprocessor 3525 can include multiple instances of the instruction unit 3532A-3532B, register file 3534A-3534B, and texture unit(s) 3544A-3544B. The graphics multiprocessor 3525 also includes multiple sets of graphics or compute execution units (e.g., GPGPU core 3536A-3536B, GPGPU core 3537A-3537B, GPGPU core 3538A-3538B) and multiple sets of load/store units 3540A-3540B. In one embodiment the execution resource units have a common instruction cache 3530, texture and/or data cache memory 3542, and shared memory 3546.

The various components can communicate via an interconnect fabric 3527. In one embodiment the interconnect fabric 3527 includes one or more crossbar switches to enable communication between the various components of the graphics multiprocessor 3525. In one embodiment the interconnect fabric 3527 is a separate, high-speed network fabric layer upon which each component of the graphics multiprocessor 3525 is stacked. The components of the graphics multiprocessor 3525 communicate with remote components via the interconnect fabric 3527. For example, the GPGPU cores 3536A-3536B, 3537A-3537B, and 35378A-3538B can each communicate with shared memory 3546 via the interconnect fabric 3527. The interconnect fabric 3527 can arbitrate communication within the graphics multiprocessor 3525 to ensure a fair bandwidth allocation between components.

FIG. 35B shows a graphics multiprocessor 3550 according to an additional embodiment. The graphics processor includes multiple sets of execution resources 3556A-3556D, where each set of execution resource includes multiple instruction units, register files, GPGPU cores, and load store units, as illustrated in FIG. 354D and FIG. 35A. The execution resources 3556A-3556D can work in concert with texture unit(s) 3560A-3560D for texture operations, while sharing an instruction cache 3554, and shared memory 3562. In one embodiment the execution resources 3556A-3556D can share an instruction cache 3554 and shared memory 3562, as well as multiple instances of a texture and/or data cache memory 3558A-3558B. The various components can communicate via an interconnect fabric 3552 similar to the interconnect fabric 3527 of FIG. 35A.

Persons skilled in the art will understand that the architecture described in FIGS. 33, 34A-34D, and 35A-35B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 3402 of FIG. 34, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 36A:
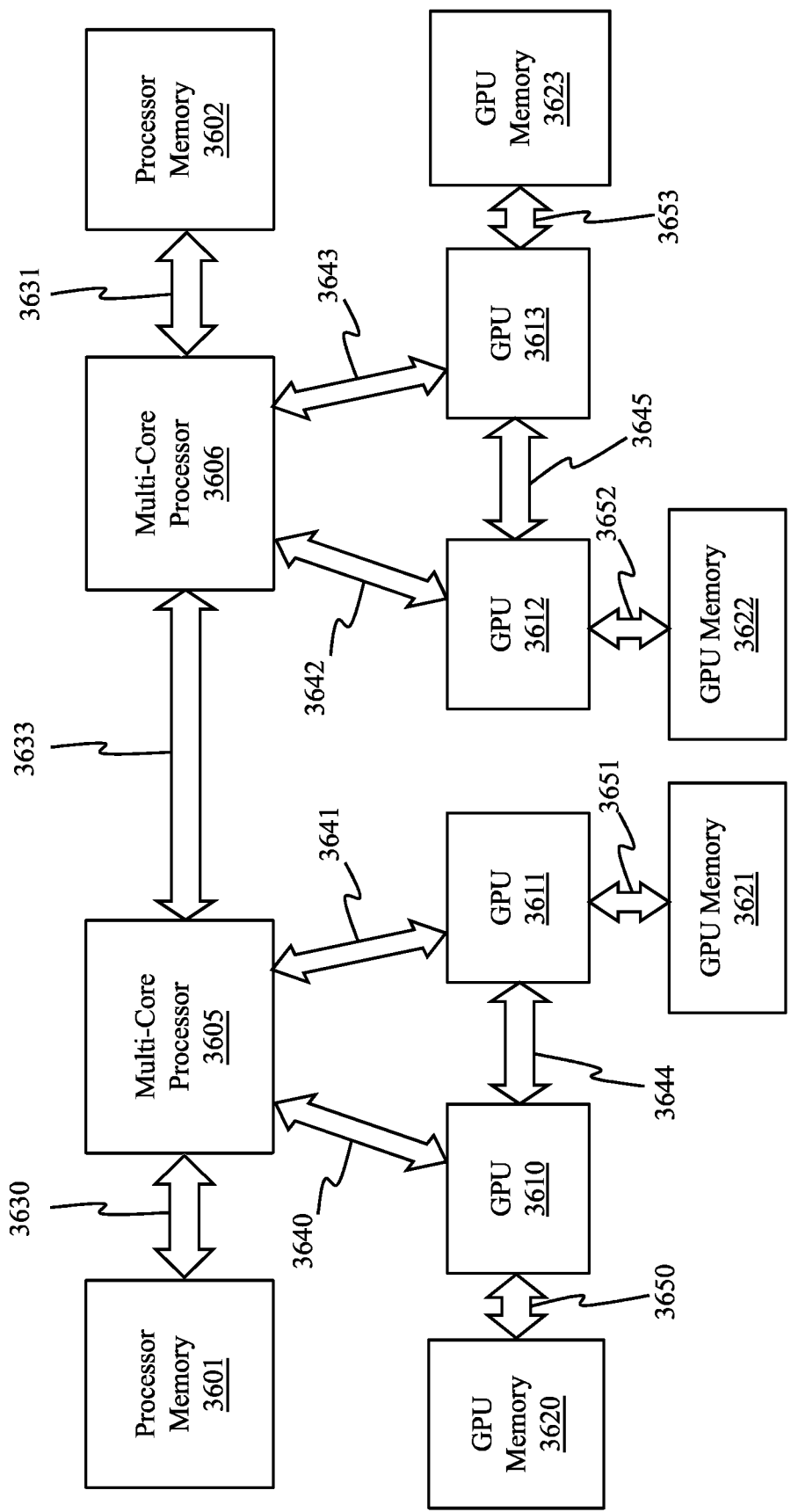
FIG. 36A-36G illustrate an exemplary architecture in which a plurality of GPUs is communicatively coupled to a plurality of multi-core processors.

FIG. 36A illustrates an exemplary architecture in which a plurality of GPUs 3610-3613 is communicatively coupled to a plurality of multi-core processors 3605-3606 over high-speed links 3640-3643 (e.g., buses, point to point interconnects, etc.). In one embodiment, the high-speed links 3640-3643 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 3610-3613 are interconnected over high-speed links 3644-3645, which may be implemented using the same or different protocols/links than those used for high-speed links 3640-3643. Similarly, two or more of the multi-core processors 3605-3606 may be connected over high speed link 3633 which may be symmetric multi-processor (SMP) buses operating at 20 GB/s, 30 GB/s, 120 GB/s or higher. Alternatively, all communication between the various system components shown in FIG. 36A may be accomplished using the same protocols/links (e.g., over a common interconnection fabric). As mentioned, however, the underlying principles of the invention are not limited to any particular type of interconnect technology.

In one embodiment, each multi-core processor 3605-3606 is communicatively coupled to a processor memory 3601-3602, via memory interconnects 3630-3631, respectively, and each GPU 3610-3613 is communicatively coupled to GPU memory 3620-3623 over GPU memory interconnects 3650-3653, respectively. The memory interconnects 3630-3631 and 3650-3653 may utilize the same or different memory access technologies. By way of example, and not limitation, the processor memories 3601-3602 and GPU memories 3620-3623 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 3605-3606 and GPUs 3610-3613 may be physically coupled to a particular memory 3601-3602, 3620-3623, respectively, a unified memory architecture may be implemented in which the same virtual system address space (also referred to as the "effective address" space) is distributed among all of the various physical memories. For example, processor memories 3601-3602 may each comprise 64 GB of the system memory address space and GPU memories 3620-3623 may each comprise 32 GB of the system memory address space (resulting in a total of 256 GB addressable memory in this example).

Figure 36B:
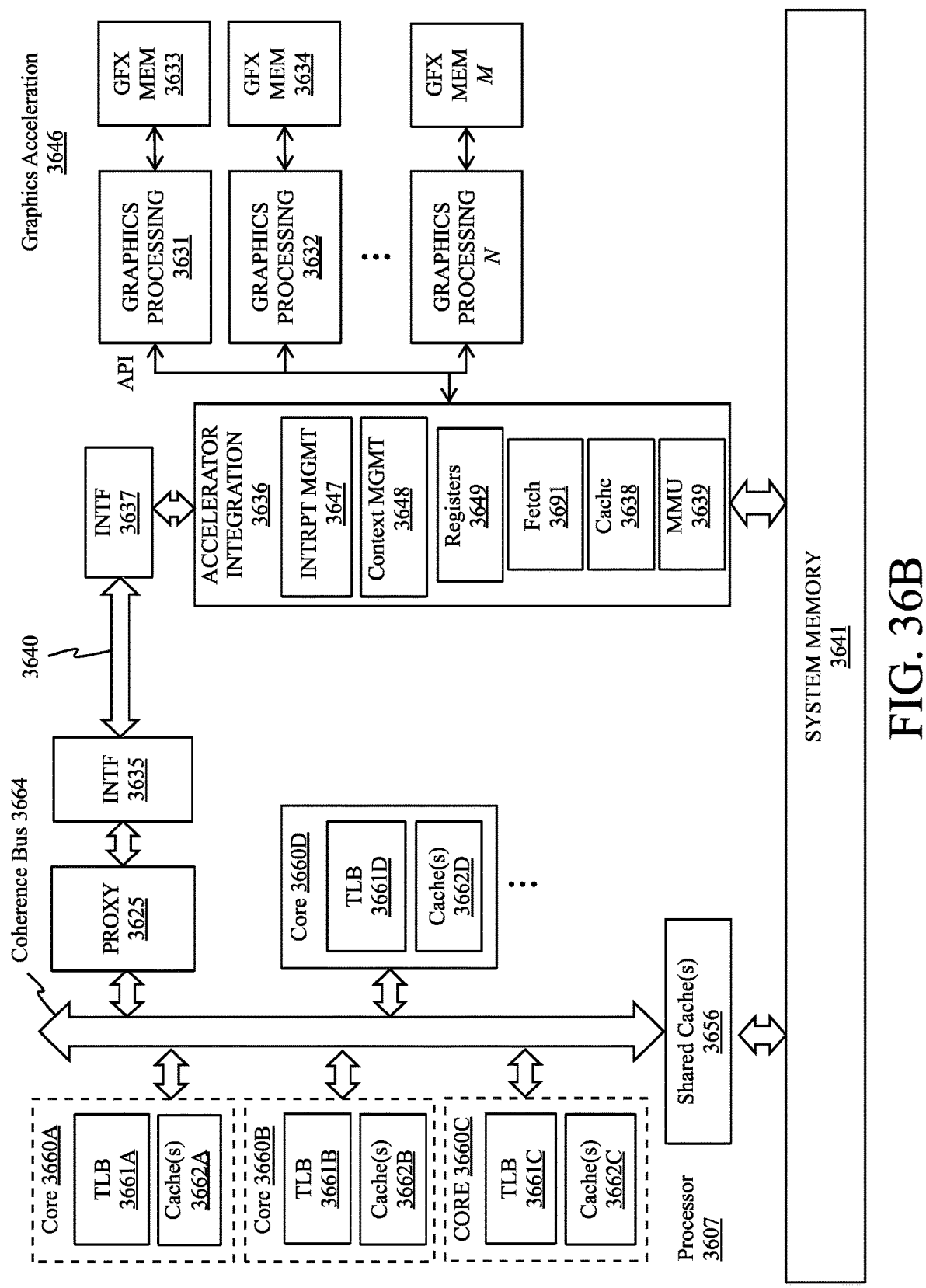

FIG. 36B illustrates additional details for an interconnection between a multi-core processor 3607 and a graphics acceleration module 3646 in accordance with one embodiment. The graphics acceleration module 3646 may include one or more GPU chips integrated on a line card which is coupled to the processor 3607 via the high-speed link 3640. Alternatively, the graphics acceleration module 3646 may be integrated on the same package or chip as the processor 3607.

The illustrated processor 3607 includes a plurality of cores 3660A-3660D, each with a translation lookaside buffer 3661A-3661D and one or more caches 3662A-3662D. The cores may include various other components for executing instructions and processing data which are not illustrated to avoid obscuring the underlying principles of the invention (e.g., instruction fetch units, branch prediction units, decoders, execution units, reorder buffers, etc.). The caches 3662A-3662D may comprise level 1 (L1) and level 2 (L2) caches. In addition, one or more shared caches 3626 may be included in the caching hierarchy and shared by sets of the cores 3660A-3660D. For example, one embodiment of the processor 3607 includes 24 cores, each with its own L1 cache, twelve shared L2 caches, and twelve shared L3 caches. In this embodiment, one of the L2 and L3 caches are shared by two adjacent cores. The processor 3607 and the graphics accelerator integration module 3646 connect with system memory 3641, which may include processor memories 3601-3602

Coherency is maintained for data and instructions stored in the various caches 3662A-3662D, 3656 and system memory 3641 via inter-core communication over a coherence bus 3664. For example, each cache may have cache coherency logic/circuitry associated therewith to communicate to over the coherence bus 3664 in response to detected reads or writes to particular cache lines. In one implementation, a cache snooping protocol is implemented over the coherence bus 3664 to snoop cache accesses. Cache snooping/coherency techniques are well understood by those of skill in the art and will not be described in detail here to avoid obscuring the underlying principles of the invention.

In one embodiment, a proxy circuit 3625 communicatively couples the graphics acceleration module 3646 to the coherence bus 3664, allowing the graphics acceleration module 3646 to participate in the cache coherence protocol as a peer of the cores. In particular, an interface 3635 provides connectivity to the proxy circuit 3625 over high-speed link 3640 (e.g., a PCIe bus, NVLink, etc.) and an interface 3637 connects the graphics acceleration module 3646 to the link 3640.

In one implementation, an accelerator integration circuit 3636 provides cache management, memory access, context management, and interrupt management services on behalf of a plurality of graphics processing engines 3631, 3632, N of the graphics acceleration module 3646. The graphics processing engines 3631, 3632, N may each comprise a separate graphics processing unit (GPU). Alternatively, the graphics processing engines 3631, 3632, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 3631-3632, N or the graphics processing engines 3631-3632, N may be individual GPUs integrated on a common package, line card, or chip.

In one embodiment, the accelerator integration circuit 3636 includes a memory management unit (MMU) 3639 for performing various memory management functions such as virtual-to-physical memory translations (also referred to as effective-to-real memory translations) and memory access protocols for accessing system memory 3641. The MMU 3639 may also include a translation lookaside buffer (TLB) (not shown) for caching the virtual/effective to physical/real address translations. In one implementation, a cache 3638 stores commands and data for efficient access by the graphics processing engines 3631-3632, N. In one embodiment, the data stored in cache 3638 and graphics memories 3633-3634, N is kept coherent with the core caches 3662A-3662D, 3656 and system memory 3611. As mentioned, this may be accomplished via proxy circuit 3625 which takes part in the cache coherency mechanism on behalf of cache 3638 and memories 3633-3634, N (e.g., sending updates to the cache 3638 related to modifications/accesses of cache lines on processor caches 3662A-3662D, 3656 and receiving updates from the cache 3638).

A set of registers 3649 store context data for threads executed by the graphics processing engines 3631-3632, N and a context management circuit 3648 manages the thread contexts. For example, the context management circuit 3648 may perform save and restore operations to save and restore contexts of the various threads during contexts switches (e.g., where a first thread is saved and a second thread is stored so that the second thread can be execute by a graphics processing engine). For example, on a context switch, the context management circuit 3648 may store current register values to a designated region in memory (e.g., identified by a context pointer). It may then restore the register values when returning to the context. In one embodiment, an interrupt management circuit 3647 receives and processes interrupts received from system devices.

In one implementation, virtual/effective addresses from a graphics processing engine 3631 are translated to real/physical addresses in system memory 3611 by the MMU 3639. One embodiment of the accelerator integration circuit 3636 supports multiple (e.g., 4, 8, 16) graphics accelerator modules 3646 and/or other accelerator devices. The graphics accelerator module 3646 may be dedicated to a single application executed on the processor 3607 or may be shared between multiple applications. In one embodiment, a virtualized graphics execution environment is presented in which the resources of the graphics processing engines 3631-3632, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 3646 and provides address translation and system memory cache services. In addition, the accelerator integration circuit 3636 may provide virtualization facilities for the host processor to manage virtualization of the graphics processing engines, interrupts, and memory management.

Because hardware resources of the graphics processing engines 3631-3632, N are mapped explicitly to the real address space seen by the host processor 3607, any host processor can address these resources directly using an effective address value. One function of the accelerator integration circuit 3636, in one embodiment, is the physical separation of the graphics processing engines 3631-3632, N so that they appear to the system as independent units.

As mentioned, in the illustrated embodiment, one or more graphics memories 3633-3634, M are coupled to each of the graphics processing engines 3631-3632, N, respectively. The graphics memories 3633-3634, M store instructions and data being processed by each of the graphics processing engines 3631-3632, N. The graphics memories 3633-3634, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 3640, biasing techniques are used to ensure that the data stored in graphics memories 3633-3634, M is data which will be used most frequently by the graphics processing engines 3631-3632, N and preferably not used by the cores 3660A-3660D (at least not frequently). Similarly, the biasing mechanism attempts to keep data needed by the cores (and preferably not the graphics processing engines 3631-3632, N) within the caches 3662A-3662D, 3656 of the cores and system memory 3611.

Figure 36C:
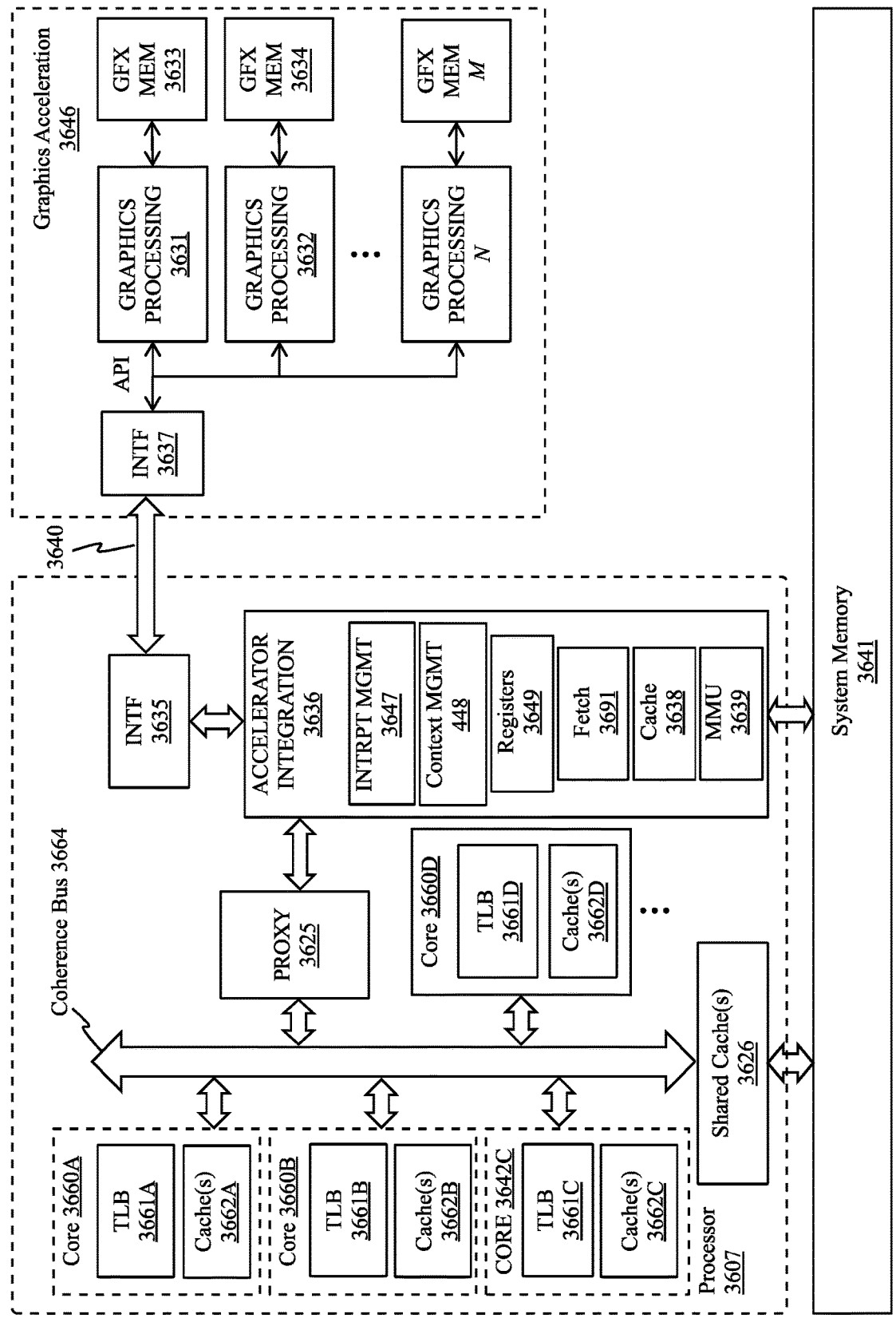

FIG. 36C illustrates another embodiment in which the accelerator integration circuit 3636 is integrated within the processor 3607. In this embodiment, the graphics processing engines 3631-3632, N communicate directly over the high-speed link 3640 to the accelerator integration circuit 3636 via interface 3637 and interface 3635 (which, again, may be utilize any form of bus or interface protocol). The accelerator integration circuit 3636 may perform the same operations as those described with respect to FIG. 36B, but potentially at a higher throughput given its close proximity to the coherency bus 3662 and caches 3662A-3662D, 3626.

One embodiment supports different programming models including a dedicated-process programming model (no graphics acceleration module virtualization) and shared programming models (with virtualization). The latter may include programming models which are controlled by the accelerator integration circuit 3636 and programming models which are controlled by the graphics acceleration module 3646.

In one embodiment of the dedicated process model, graphics processing engines 3631-3632, N are dedicated to a single application or process under a single operating system. The single application can funnel other application requests to the graphics engines 3631-3632, N, providing virtualization within a VM/partition.

In the dedicated-process programming models, the graphics processing engines 3631-3632, N, may be shared by multiple VM/application partitions. The shared models require a system hypervisor to virtualize the graphics processing engines 3631-3632, N to allow access by each operating system. For single-partition systems without a hypervisor, the graphics processing engines 3631-3632, N are owned by the operating system. In both cases, the operating system can virtualize the graphics processing engines 3631-3632, N to provide access to each process or application.

For the shared programming model, the graphics acceleration module 3646 or an individual graphics processing engine 3631-3632, N selects a process element using a process handle. In one embodiment, process elements are stored in system memory 3611 and are addressable using the effective address to real address translation techniques described herein. The process handle may be an implementation-specific value provided to the host process when registering its context with the graphics processing engine 3631-3632, N (that is, calling system software to add the process element to the process element linked list). The lower 16-bits of the process handle may be the offset of the process element within the process element linked list.

Figure 36D:
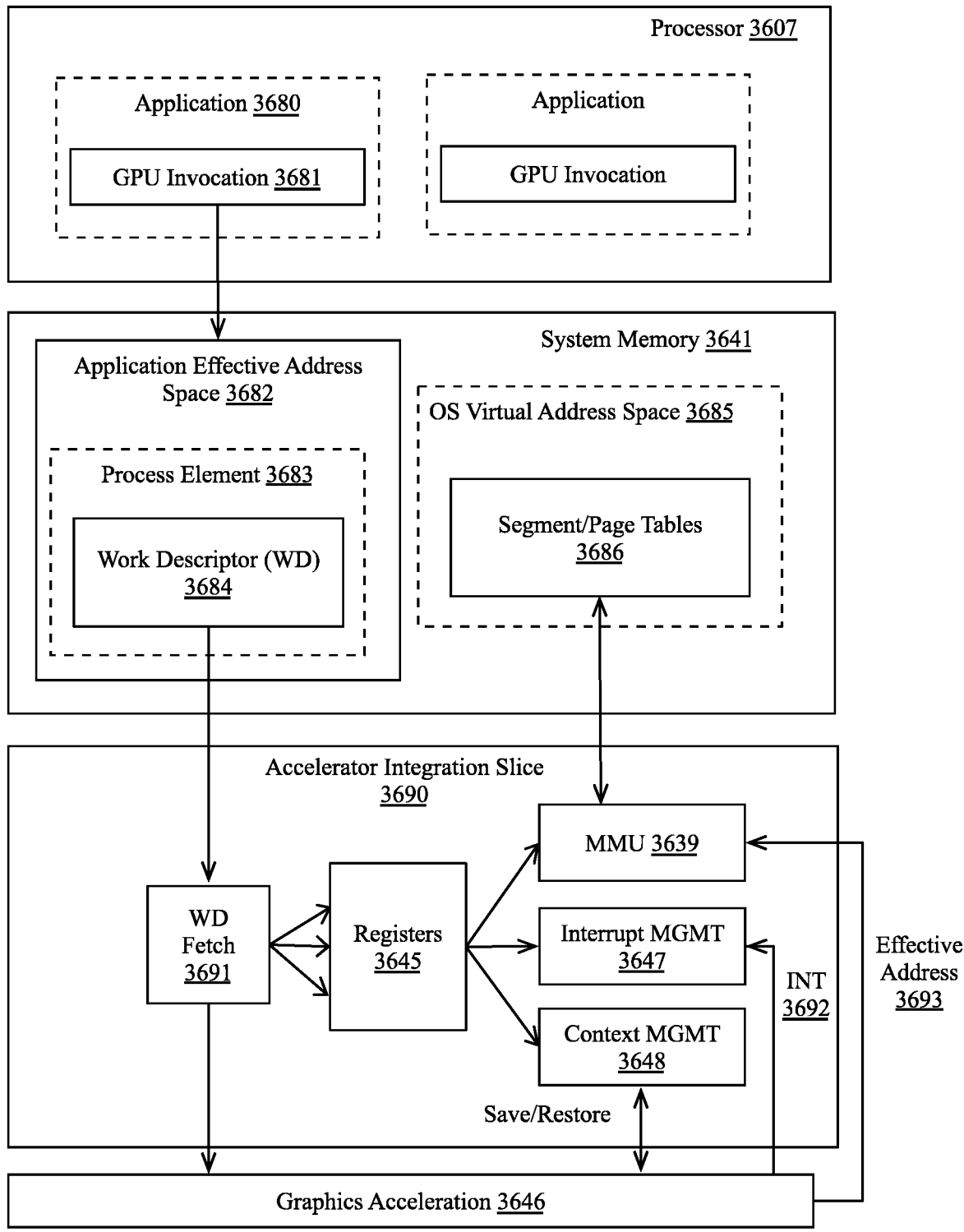

FIG. 36D illustrates an exemplary accelerator integration slice 3690. As used herein, a "slice" comprises a specified portion of the processing resources of the accelerator integration circuit 3636. Application effective address space 3682 within system memory 3611 stores process elements 3683. In one embodiment, the process elements 3683 are stored in response to GPU invocations 3681 from applications 3680 executed on the processor 3607. A process element 3683 contains the process state for the corresponding application 3680. A work descriptor (WD) 3684 contained in the process element 3683 can be a single job requested by an application or may contain a pointer to a queue of jobs. In the latter case, the WD 3684 is a pointer to the job request queue in the application's address space 3682.

The graphics acceleration module 3646 and/or the individual graphics processing engines 3631-3632, N can be shared by all or a subset of the processes in the system. Embodiments of the invention include an infrastructure for setting up the process state and sending a WD 3684 to a graphics acceleration module 3646 to start a job in a virtualized environment.

In one implementation, the dedicated-process programming model is implementation-specific. In this model, a single process owns the graphics acceleration module 3646 or an individual graphics processing engine 3631. Because the graphics acceleration module 3646 is owned by a single process, the hypervisor initializes the accelerator integration circuit 3636 for the owning partition and the operating system initializes the accelerator integration circuit 3636 for the owning process at the time when the graphics acceleration module 3646 is assigned.

In operation, a WD fetch unit 3691 in the accelerator integration slice 3690 fetches the next WD 3684 which includes an indication of the work to be done by one of the graphics processing engines of the graphics acceleration module 3646. Data from the WD 3684 may be stored in registers 3649 and used by the MMU 3639, interrupt management circuit 3647 and/or context management circuit 3646 as illustrated. For example, one embodiment of the MMU 3639 includes segment/page walk circuitry for accessing segment/page tables 3686 within the OS virtual address space 3685. The interrupt management circuit 3647 may process interrupt events 3692 received from the graphics acceleration module 3646. When performing graphics operations, an effective address 3693 generated by a graphics processing engine 3631-3632, N is translated to a real address by the MMU 3639.

In one embodiment, the same set of registers 3649 are duplicated for each graphics processing engine 3631-3632, N and/or graphics acceleration module 3646 and may be initialized by the hypervisor or operating system. Each of these duplicated registers may be included in an accelerator integration slice 3690. Exemplary registers that may be initialized by the hypervisor are shown in Table 2.

TABLE 2

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 3.

TABLE 3

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 3684 is specific to a particular graphics acceleration module 3646 and/or graphics processing engine 3631-3632, N. It contains all the information a graphics processing engine 3631-3632, N requires to do its work or it can be a pointer to a memory location where the application has set up a command queue of work to be completed.

Figure 36E:
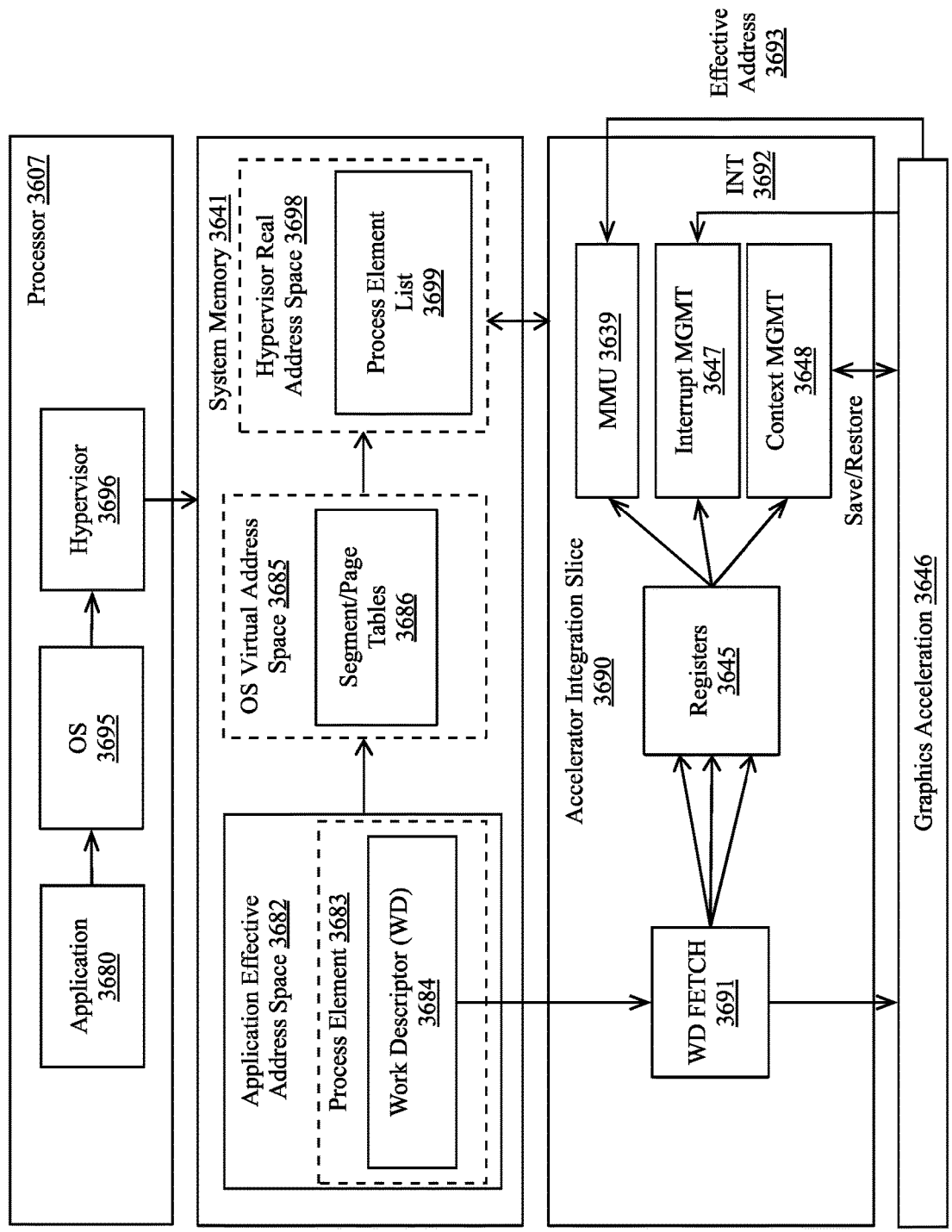

FIG. 36E illustrates additional details for one embodiment of a shared model. This embodiment includes a hypervisor real address space 3698 in which a process element list 3699 is stored. The hypervisor real address space 3698 is accessible via a hypervisor 3696 which virtualizes the graphics acceleration module engines for the operating system 3695.

The shared programming models allow for all or a subset of processes from all or a subset of partitions in the system to use a graphics acceleration module 3646. There are two programming models where the graphics acceleration module 3646 is shared by multiple processes and partitions: time-sliced shared and graphics directed shared.

In this model, the system hypervisor 3696 owns the graphics acceleration module 3646 and makes its function available to all operating systems 3695. For a graphics acceleration module 3646 to support virtualization by the system hypervisor 3696, the graphics acceleration module 3646 may adhere to the following requirements: 1) An application's job request must be autonomous (that is, the state does not need to be maintained between jobs), or the graphics acceleration module 3646 must provide a context save and restore mechanism. 2) An application's job request is guaranteed by the graphics acceleration module 3646 to complete in a specified amount of time, including any translation faults, or the graphics acceleration module 3646 provides the ability to preempt the processing of the job. 3) The graphics acceleration module 3646 must be guaranteed fairness between processes when operating in the directed shared programming model.

In one embodiment, for the shared model, the application 3680 is required to make an operating system 3695 system call with a graphics acceleration module 3646 type, a work descriptor (WD), an authority mask register (AMR) value, and a context save/restore area pointer (CSRP). The graphics acceleration module 3646 type describes the targeted acceleration function for the system call. The graphics acceleration module 3646 type may be a system-specific value. The WD is formatted specifically for the graphics acceleration module 3646 and can be in the form of a graphics acceleration module 3646 command, an effective address pointer to a user-defined structure, an effective address pointer to a queue of commands, or any other data structure to describe the work to be done by the graphics acceleration module 3646. In one embodiment, the AMR value is the AMR state to use for the current process. The value passed to the operating system is similar to an application setting the AMR. If the accelerator integration circuit 3636 and graphics acceleration module 3646 implementations do not support a User Authority Mask Override Register (UAMOR), the operating system may apply the current UAMOR value to the AMR value before passing the AMR in the hypervisor call. The hypervisor 3696 may optionally apply the current Authority Mask Override Register (AMOR) value before placing the AMR into the process element 3683. In one embodiment, the CSRP is one of the registers 3649 containing the effective address of an area in the application's address space 3682 for the graphics acceleration module 3646 to save and restore the context state. This pointer is optional if no state is required to be saved between jobs or when a job is preempted. The context save/restore area may be pinned system memory.

Upon receiving the system call, the operating system 3695 may verify that the application 3680 has registered and been given the authority to use the graphics acceleration module 3646. The operating system 3695 then calls the hypervisor 3696 with the information shown in Table 4.

TABLE 4

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 3696 verifies that the operating system 3695 has registered and been given the authority to use the graphics acceleration module 3646. The hypervisor 3696 then puts the process element 3683 into the process element linked list for the corresponding graphics acceleration module 3646 type. The process element may include the information shown in Table 5.

TABLE 5

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)
8 Interrupt vector table, derived from the hypervisor call parameters.
9 A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of registers 3649 of the accelerator integration slice 3690.

Figure 36F:
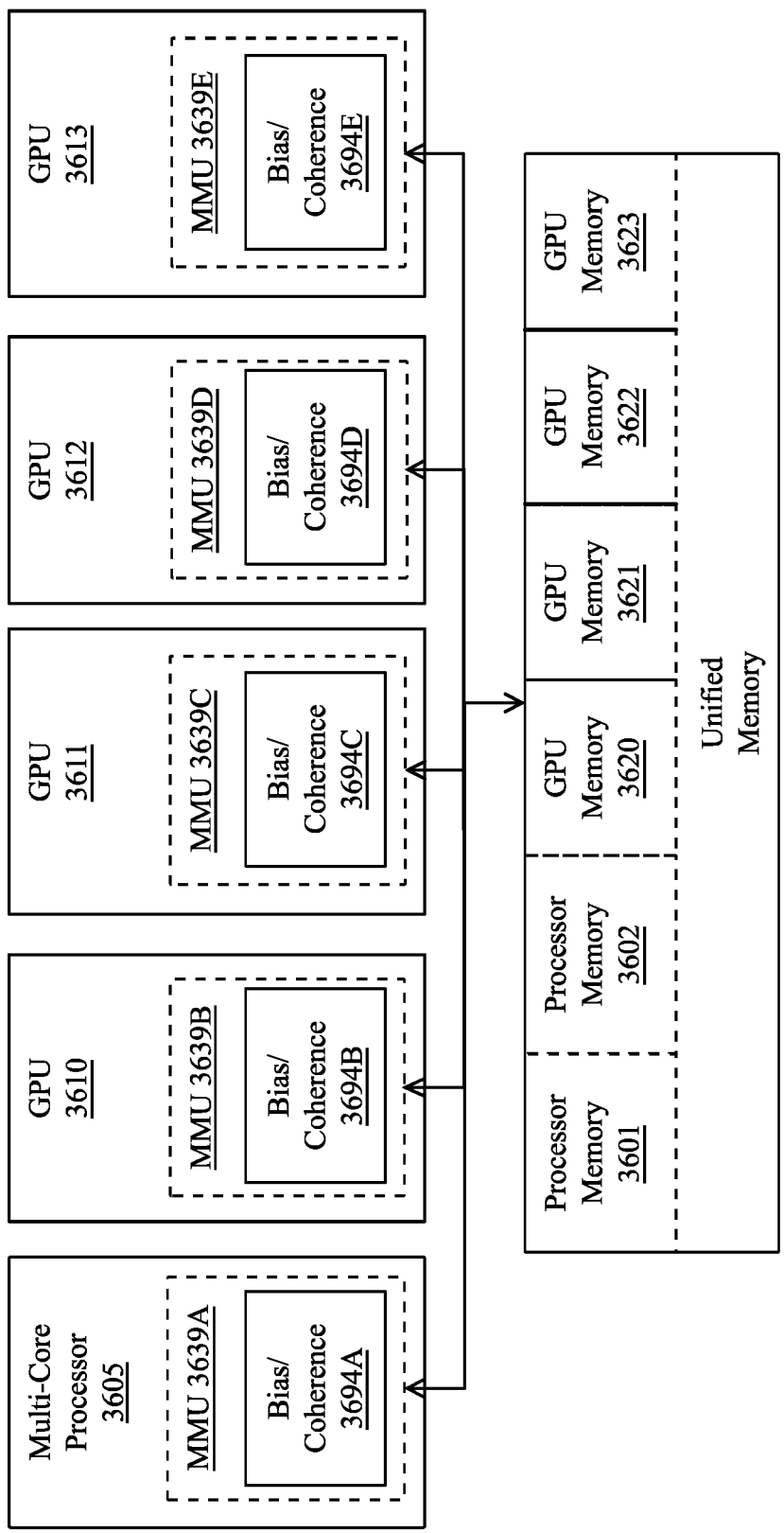

As illustrated in FIG. 36F, one embodiment of the invention employs a unified memory addressable via a common virtual memory address space used to access the physical processor memories 3601-3602 and GPU memories 3620-3623. In this implementation, operations executed on the GPUs 3610-3613 utilize the same virtual/effective memory address space to access the processors memories 3601-3602 and vice versa, thereby simplifying programmability. In one embodiment, a first portion of the virtual/effective address space is allocated to the processor memory 3601, a second portion to the second processor memory 3602, a third portion to the GPU memory 3620, and so on. The entire virtual/effective memory space (sometimes referred to as the effective address space) is thereby distributed across each of the processor memories 3601-3602 and GPU memories 3620-3623, allowing any processor or GPU to access any physical memory with a virtual address mapped to that memory.

In one embodiment, bias/coherence management circuitry 3694A-3694E within one or more of the MMUs 3639A-3639E ensures cache coherence between the caches of the host processors (e.g., 3605) and the GPUs 3610-3613 and implements biasing techniques indicating the physical memories in which certain types of data should be stored. While multiple instances of bias/coherence management circuitry 3694A-3694E are illustrated in FIG. 36F, the bias/coherence circuitry may be implemented within the MMU of one or more host processors 3605 and/or within the accelerator integration circuit 3636.

One embodiment allows GPU-attached memory 3620-3623 to be mapped as part of system memory, and accessed using shared virtual memory (SVM) technology, but without suffering the typical performance drawbacks associated with full system cache coherence. The ability to GPU-attached memory 3620-3623 to be accessed as system memory without onerous cache coherence overhead provides a beneficial operating environment for GPU offload. This arrangement allows the host processor 3605 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 3620-3623 without cache coherence overheads can be critical to the execution time of an offloaded computation. In cases with substantial streaming write memory traffic, for example, cache coherence overhead can significantly reduce the effective write bandwidth seen by a GPU 3610-3613. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 3620-3623, with or without a bias cache in the GPU 3610-3613 (e.g., to cache frequently/recently used entries of the bias table). Alternatively, the entire bias table may be maintained within the GPU.

In one implementation, the bias table entry associated with each access to the GPU-attached memory 3620-3623 is accessed prior the actual access to the GPU memory, causing the following operations. First, local requests from the GPU 3610-3613 that find their page in GPU bias are forwarded directly to a corresponding GPU memory 3620-3623. Local requests from the GPU that find their page in host bias are forwarded to the processor 3605 (e.g., over a high-speed link as discussed above). In one embodiment, requests from the processor 3605 that find the requested page in host processor bias complete the request like a normal memory read. Alternatively, requests directed to a GPU-biased page may be forwarded to the GPU 3610-3613. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 3605 bias to GPU bias, but is not required for the opposite transition.

In one embodiment, cache coherency is maintained by temporarily rendering GPU-biased pages uncacheable by the host processor 3605. To access these pages, the processor 3605 may request access from the GPU 3610 which may or may not grant access right away, depending on the implementation. Thus, to reduce communication between the processor 3605 and GPU 3610 it is beneficial to ensure that GPU-biased pages are those which are required by the GPU but not the host processor 3605 and vice versa.

Figure 36G:
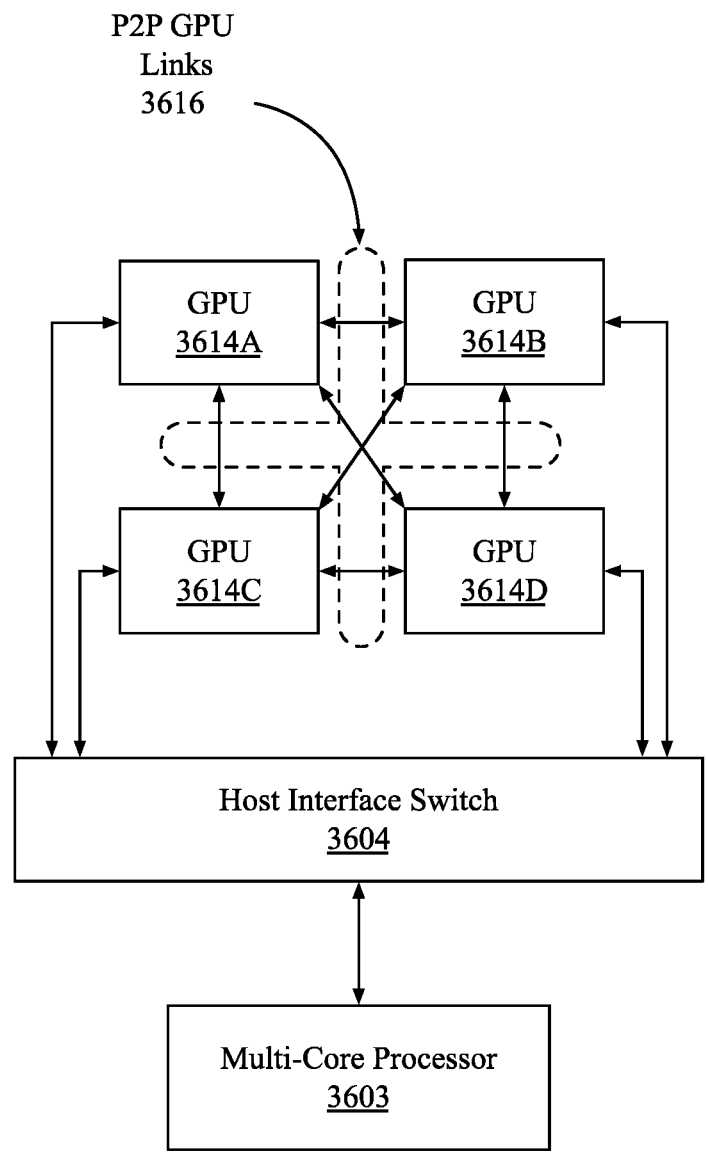

FIG. 36G illustrates a multi-GPU computing system, according to an embodiment. The multi-GPU computing system can include a processor 3603 coupled to multiple GPUs 3614A-3614D via a host interface switch 3604. The host interface switch 3604, in one embodiment, is a PCI express switch device that couples the processor 3603 to a PCI express bus over which the processor 3603 can communicate with the set of GPUs 3614A-3614D. The GPUs 3614A-3614D can interconnect via a set of high-speed point to point GPU to GPU links 3616. The high-speed GPU to GPU links can connect to each of the GPUs 3614A-3614D via a dedicated GPU link. The P2P GPU links 3616 enable direct communication between each of the GPUs 3614A-3614D without requiring communication over the host interface bus to which the processor 3603 is connected. With GPU-to-GPU traffic directed to the P2P GPU links, the host interface bus remains available for system memory access or to communicate with other instances of the multi-GPU computing system 3600, for example, via one or more network devices. While in the illustrated embodiment the GPUs 3614A-3614D connect to the processor 3603 via the host interface switch 3604, in one embodiment the processor 3603 includes direct support for the P2P GPU links 3616 and can connect directly to the GPUs 3614A-3614D.

Graphics Processing Pipeline

Figure 37:
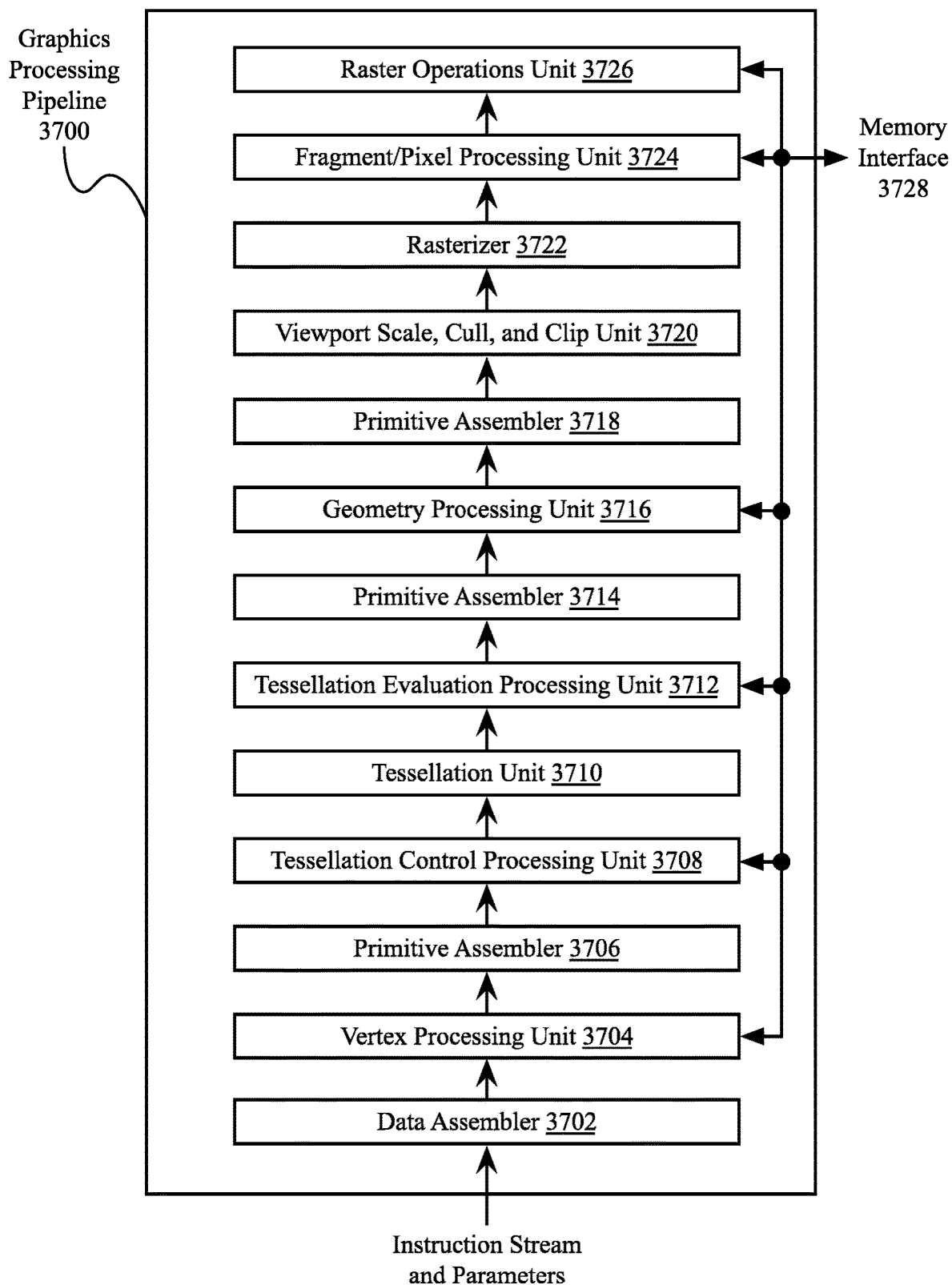
FIG. 37 illustrates a graphics processing pipeline, according to an embodiment.

FIG. 37 illustrates a graphics processing pipeline 3700, according to an embodiment. In one embodiment, a graphics processor can implement the illustrated graphics processing pipeline 3700. The graphics processor can be included within the parallel processing subsystems as described herein, such as the parallel processor 3400 of FIG. 34, which, in one embodiment, is a variant of the parallel processor(s) 3312 of FIG. 33. The various parallel processing systems can implement the graphics processing pipeline 3700 via one or more instances of the parallel processing unit (e.g., parallel processing unit 3402 of FIG. 34) as described herein. For example, a shader unit (e.g., graphics multiprocessor 3434 of FIG. 35) may be configured to perform the functions of one or more of a vertex processing unit 3704, a tessellation control processing unit 3708, a tessellation evaluation processing unit 3712, a geometry processing unit 3716, and a fragment/pixel processing unit 3724. The functions of data assembler 3702, primitive assemblers 3706, 3714, 3718, tessellation unit 3710, rasterizer 3722, and raster operations unit 3726 may also be performed by other processing engines within a processing cluster (e.g., processing cluster 3414 of FIG. 35) and a corresponding partition unit (e.g., partition unit 3420A-3420N of FIG. 34). The graphics processing pipeline 3700 may also be implemented using dedicated processing units for one or more functions. In one embodiment, one or more portions of the graphics processing pipeline 3700 can be performed by parallel processing logic within a general-purpose processor (e.g., CPU). In one embodiment, one or more portions of the graphics processing pipeline 3700 can access on-chip memory (e.g., parallel processor memory 3422 as in FIG. 34) via a memory interface 3728, which may be an instance of the memory interface 3418 of FIG. 34.

In one embodiment, the data assembler 3702 is a processing unit that collects vertex data for surfaces and primitives. The data assembler 3702 then outputs the vertex data, including the vertex attributes, to the vertex processing unit 3704. The vertex processing unit 3704 is a programmable execution unit that executes vertex shader programs, lighting and transforming vertex data as specified by the vertex shader programs. The vertex processing unit 3704 reads data that is stored in cache, local or system memory for use in processing the vertex data and may be programmed to transform the vertex data from an object-based coordinate representation to a world space coordinate space or a normalized device coordinate space.

A first instance of a primitive assembler 3706 receives vertex attributes from the vertex processing unit 3704. The primitive assembler 3706 readings stored vertex attributes as needed and constructs graphics primitives for processing by tessellation control processing unit 3708. The graphics primitives include triangles, line segments, points, patches, and so forth, as supported by various graphics processing application programming interfaces (APIs).

The tessellation control processing unit 3708 treats the input vertices as control points for a geometric patch. The control points are transformed from an input representation from the patch (e.g., the patch's bases) to a representation that is suitable for use in surface evaluation by the tessellation evaluation processing unit 3712. The tessellation control processing unit 3708 can also compute tessellation factors for edges of geometric patches. A tessellation factor applies to a single edge and quantifies a view-dependent level of detail associated with the edge. A tessellation unit 3710 is configured to receive the tessellation factors for edges of a patch and to tessellate the patch into multiple geometric primitives such as line, triangle, or quadrilateral primitives, which are transmitted to a tessellation evaluation processing unit 3712. The tessellation evaluation processing unit 3712 operates on parameterized coordinates of the subdivided patch to generate a surface representation and vertex attributes for each vertex associated with the geometric primitives.

A second instance of a primitive assembler 3714 receives vertex attributes from the tessellation evaluation processing unit 3712, reading stored vertex attributes as needed, and constructs graphics primitives for processing by the geometry processing unit 3716. The geometry processing unit 3716 is a programmable execution unit that executes geometry shader programs to transform graphics primitives received from primitive assembler 3714 as specified by the geometry shader programs. In one embodiment, the geometry processing unit 3716 is programmed to subdivide the graphics primitives into one or more new graphics primitives and calculate parameters used to rasterize the new graphics primitives.

In some embodiments, the geometry processing unit 3716 can add or delete elements in the geometry stream. The geometry processing unit 3716 outputs the parameters and vertices specifying new graphics primitives to primitive assembler 3718. The primitive assembler 3718 receives the parameters and vertices from the geometry processing unit 3716 and constructs graphics primitives for processing by a viewport scale, cull, and clip unit 3720. The geometry processing unit 3716 reads data that is stored in parallel processor memory or system memory for use in processing the geometry data. The viewport scale, cull, and clip unit 3720 performs clipping, culling, and viewport scaling and outputs processed graphics primitives to a rasterizer 3722.

The rasterizer 3722 can perform depth culling and other depth-based optimizations. The rasterizer 3722 also performs scan conversion on the new graphics primitives to generate fragments and output those fragments and associated coverage data to the fragment/pixel processing unit 3724. The fragment/pixel processing unit 3724 is a programmable execution unit that is configured to execute fragment shader programs or pixel shader programs. The fragment/pixel processing unit 3724 transforming fragments or pixels received from rasterizer 3722, as specified by the fragment or pixel shader programs. For example, the fragment/pixel processing unit 3724 may be programmed to perform operations included but not limited to texture mapping, shading, blending, texture correction and perspective correction to produce shaded fragments or pixels that are output to a raster operations unit 3726. The fragment/pixel processing unit 3724 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 3726 is a processing unit that performs raster operations including, but not limited to stencil, z test, blending, and the like, and outputs pixel data as processed graphics data to be stored in graphics memory (e.g., parallel processor memory 3422 as in FIG. 34, and/or system memory 3304 as in FIG. 33, to be displayed on the one or more display device(s) 3310 or for further processing by one of the one or more processor(s) 3302 or parallel processor(s) 3312. In some embodiments, the raster operations unit 3726 is configured to compress z or color data that is written to memory and decompress z or color data that is read from memory.

Embodiments described herein can be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware. In general, the terms "logic," "module," "component," "engine," "mechanism," "tool," "circuit," and "circuitry" are referenced interchangeably throughout this document and may include, by way of example, software, hardware, firmware, or any combination thereof.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of non-transitory machine-readable media suitable for storing machine-executable instructions.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides a system to configure distributed training of a neural network, the system comprising memory to store a library to facilitate data transmission during distributed training of the neural network; a network interface to enable transmission and receipt of configuration data associated with a set of worker nodes, the worker nodes configured to perform distributed training of the neural network; and a processor to execute instructions provided by the library, the instructions to cause the processor to create one or more groups of the worker nodes, the one or more groups of worker nodes to be created based on a communication pattern for messages to be transmitted between the worker nodes during distributed training of the neural network.

One embodiment provides for a non-transitory machine-readable medium storing instructions which, when executed by one or more processors, cause the one or more processors to perform operations comprising tracking, at a machine learning framework, communication behavior of applications communicating on a machine learning platform via quality of service (QoS) counters exposed by one of the one or more processors of the machine learning platform; determining a relative share of intra-chassis and inter-chassis communication bandwidth consumed by each application managed by the machine learning framework; determining congestion points within intra-chassis and inter-chassis communication links; adjusting an application communication schedule based on a relative share of communication bandwidth and congestion points within intra-chassis and inter-chassis communication links; and dynamically adjusting cache QoS models of the one or more processors to prioritize data associated with a latency sensitive application.

One embodiment provides for a multi-chassis computing device comprising a general-purpose processing unit in a first chassis and a first set of graphics processing units in a second chassis. The second chassis includes a host interface switch to couple the second chassis with the first chassis, the host interface switch to enable communication between the general-purpose processing unit and the first set of graphics processing units, the first set of graphics processing units to communicate via a point to point interconnect, wherein the host interface switch enables switched communication between the first set of graphics processing units and the general-purpose processing unit via the point to point interconnect.

One embodiment provides for a method of establishing a persistent communication session for distributed machine learning on multiple compute nodes, the method comprising receiving an identifier of a node to which a persistent network communication session is to be established, the persistent network communication session to be established during distributed training of a neural network resolving one or more network addresses for the node and persistently store the one or more resolved network addresses receiving an indication of a set of network operations for which resource allocations will be persistent allocating resources used to communicate with the node and mark the resources as persistent and performing requested network operations with the node while persisting resource allocations associated with operations identified as persistent.

The foregoing description and drawings are to be regarded in an illustrative rather than a restrictive sense. Persons skilled in the art will understand that various modifications and changes may be made to the embodiments described herein without departing from the broader spirit and scope of the invention as set forth in the appended claims.

What is claimed is:

1. A non-transitory machine-readable medium storing instructions which, when executed by one or more processors, cause the one or more processors to perform operations comprising:
    tracking, at a machine learning framework, communication behavior of applications communicating on a machine learning platform via quality of service (QoS) counters exposed by one or more of the one or more processors of the machine learning platform;

determining a relative share of intra-chassis and inter-chassis communication bandwidth consumed by each application managed by the machine learning framework;

determining congestion points within intra-chassis and inter-chassis communication links; and adjusting an application communication schedule based on a relative share of communication bandwidth and congestion points within intra-chassis and inter-chassis communication links, wherein adjusting the application communication schedule includes scheduling an inter-chassis message in place of an intra-chassis message in response to determining existence of intra-chassis congestion.

2. The non-transitory machine-readable medium as in claim 1, the operations additionally comprising dynamically adjusting cache QoS models of the one or more processors to prioritize data associated with a latency sensitive application.

3. The non-transitory machine-readable medium as in claim 2, wherein prioritizing data associated with the latency sensitive application includes lowering a probability of eviction for the data.

4. The non-transitory machine-readable medium as in claim 1, the operations additionally comprising adjusting a communication route for an application message between the one or more processors of the machine learning platform.

5. The non-transitory machine-readable medium as in claim 4, wherein adjusting the communication route for an application message between the one or more processors of the machine learning platform includes determining the existence of intra-chassis congestion and adjusting the communication route for the application message based on the intra-chassis congestion.

6. The non-transitory machine-readable medium as in claim 1, the operations additionally comprising scheduling an intra-chassis message in place of an inter-chassis message in response to determining existence of inter-chassis congestion.

7. A method comprising:

tracking, at a machine learning framework, communication behavior of applications communicating on a machine learning platform via quality of service (QoS) counters exposed by one or more processors of the machine learning platform;

determining a relative share of intra-chassis and inter-chassis communication bandwidth consumed by each application managed by the machine learning framework;

determining congestion points within intra-chassis and inter-chassis communication links; and adjusting an application communication schedule based on a relative share of communication bandwidth and congestion points within intra-chassis and inter-chassis communication links, wherein adjusting the application communication schedule includes scheduling an inter-chassis message in place of an intra-chassis message in response to determining existence of intra-chassis congestion.

8. The method as in claim 7, further comprising dynamically adjusting cache QoS models of the one or more processors to prioritize data associated with a latency sensitive application.

9. The method as in claim 8, wherein prioritizing data associated with the latency sensitive application includes lowering a probability of eviction for the data.

10. The method as in claim 7, further comprising adjusting a communication route for an application message between the one or more processors of the machine learning platform.

11. The method as in claim 10, wherein adjusting the communication route for an application message between the one or more processors of the machine learning platform includes determining the existence of intra-chassis congestion and adjusting the communication route for the application message based on the intra-chassis congestion.

12. The method as in claim 7, further comprising scheduling an intra-chassis message in place of an inter-chassis message in response to determining existence of inter-chassis congestion.

13. A data processing system comprising:

a memory device; and one or more processors coupled with the memory device, wherein the one or more processors are configured to execute instructions stored on the memory device and the instructions cause the one or more processors to perform operations comprising:

tracking, at a machine learning framework, communication behavior of applications communicating on a machine learning platform via quality of service (QoS) counters exposed by one or more of the one or more processors of the machine learning platform;

determining a relative share of intra-chassis and inter-chassis communication bandwidth consumed by each application managed by the machine learning framework;

determining congestion points within intra-chassis and inter-chassis communication links; and adjusting an application communication schedule based on a relative share of communication bandwidth and congestion points within intra-chassis and inter-chassis communication links, wherein adjusting the application communication schedule includes scheduling an inter-chassis message in place of an intra-chassis message in response to determining existence of intra-chassis congestion.

14. The data processing system as in claim 13, further comprising dynamically adjusting cache QoS models of the one or more processors to prioritize data associated with a latency sensitive application.

15. The data processing system as in claim 14, wherein prioritizing data associated with the latency sensitive application includes lowering a probability of eviction for the data.

16. The data processing system as in claim 13, further comprising adjusting a communication route for an application message between the one or more processors of the machine learning platform.

17. The data processing system as in claim 16, wherein adjusting the communication route for an application message between the one or more processors of the machine learning platform includes determining the existence of intra-chassis congestion and adjusting the communication route for the application message based on the intra-chassis congestion.

18. The data processing system as in claim 13, further comprising scheduling an intra-chassis message in place of an inter-chassis message in response to determining existence of inter-chassis congestion.

19. The data processing system as in claim 13, further comprising a first chassis including a first set of graphics processors of the one or more processors and a second chassis including a second set of graphics processors of the one or more processors, wherein the inter-chassis communication links enable communication between the first chassis and the second chassis.

\* \* \* \* \*